(12) United States Patent
Mar et al.

(10) Patent No.: US 10,080,200 B2
(45) Date of Patent: Sep. 18, 2018

(54) INTELLIGENT DEPLOYMENT CASCADE CONTROL DEVICE BASED ON AN FDD-OFDMA INDOOR SMALL CELL IN MULTI-USER AND INTERFERENCE ENVIRONMENTS

(71) Applicant: YUAN ZE UNIVERSITY, Taoyuan (TW)

(72) Inventors: Jeich Mar, Taoyuan (TW); Guan-Yi Liu, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 12 days.

(21) Appl. No.: 15/336,117

(22) Filed: Oct. 27, 2016

(65) Prior Publication Data

US 2018/0124713 A1 May 3, 2018

(51) Int. Cl.
*H04W 52/24* (2009.01)
*H04W 72/08* (2009.01)
(Continued)

(52) U.S. Cl.
CPC ........ *H04W 52/243* (2013.01); *G06N 3/0436* (2013.01); *G06N 5/048* (2013.01);
(Continued)

(58) Field of Classification Search
CPC ............... H04W 52/243; H04W 24/02; H04W 28/0268; H04W 52/50; H04W 72/087;
(Continued)

(56) References Cited

U.S. PATENT DOCUMENTS

2008/0132281 A1* 6/2008 Kim .................. H04B 7/063
455/562.1
2008/0165873 A1* 7/2008 Ghosh ................ H04L 1/0068
375/261

FOREIGN PATENT DOCUMENTS

WO WO 2009085872 A1 * 7/2009 ........... H04L 1/0026

OTHER PUBLICATIONS

Çalhan et al., An Adaptive Neuro-Fuzzy Based Vertical Handoff Decision Algorithm for Wireless Heterogeneous Networks, IEEE, pp. 2271-2276, (2010).*
(Continued)

*Primary Examiner* — Brook Kebede
(74) *Attorney, Agent, or Firm* — WPAT, PC

(57) ABSTRACT

The invention presents an intelligent deployment cascade control (IDCC) device for frequency division duplexing (FDD)-orthogonal frequency division multiplexing access (OFDMA) indoor small cell to enable easy installation, multi-user (MU)service reliability, optimum throughput, power saving, minimum interference and good cell coverage. The proposed IDCC device is designed with a cascade architecture, which mainly contains five units including a resource allocator, a minimum throughput/cell edge CQI converter, an adaptive neural fuzzy inference system (ANFIS) based initial transmit power setting controller (ITPSC) in the first cascade unit, an ANFIS based channel quality index (CQI) decision controller (CQIDC) in the second cascade unit and an ANFIS based self-optimization power controller (SOPC) in the third cascade unit. The SOPC consists of three parts, namely the transmit power adjustment estimator (TPAE), transmission power assignment and self-optimization power controller protection mechanism.

10 Claims, 42 Drawing Sheets

(51) Int. Cl.
    *H04W 28/02* (2009.01)
    *H04W 52/50* (2009.01)
    *H04W 24/02* (2009.01)
    *G06N 3/04* (2006.01)
    *G06N 5/04* (2006.01)
    *H04W 16/00* (2009.01)
    *H04L 5/00* (2006.01)
    *H04W 84/04* (2009.01)

(52) U.S. Cl.
    CPC ........... *H04L 5/0058* (2013.01); *H04W 16/00* (2013.01); *H04W 24/02* (2013.01); *H04W 28/0268* (2013.01); *H04W 52/50* (2013.01); *H04W 72/087* (2013.01); *H04W 84/045* (2013.01)

(58) Field of Classification Search
    CPC ... H04L 1/0068; H04L 1/0075; H04L 1/1607; H04L 5/0007; H04L 5/0053; H04L 27/2636; G06N 3/0436; G06N 5/048
    USPC .......................................................... 706/2
    See application file for complete search history.

(56) References Cited

OTHER PUBLICATIONS

Necmi et al., Channel estimation using an adaptive neuro fuzzy inference system in the OFDM-IDMA system, Turkish Journal of Electrical Engineering & Computer Sciences, pp. 352-364, Dec. 20, 2015.*

* cited by examiner

INTELLIGENT DEPLOYMENT CASCADE CONTROL DEVICE BASED ON AN FDD-OFDMA INDOOR SMALL CELL IN MULTI-USER AND INTERFERENCE ENVIRONMENTS

TECHNICAL FIELD

The invention presents an adaptive neural fuzzy inference system (ANFIS) based intelligent deployment cascade control (IDCC) device for frequency division duplexing (FDD)-orthogonal frequency division multiplexing access (OFDMA) indoor small cell operated in the multi-user (MU) and interference environments to self-optimize the MU service reliability (SR), throughput, minimum transmit power and interference for multimedia call services. The proposed IDCC device is designed with a cascade architecture, which mainly contains five units including a resource allocator, a minimum throughput/cell edge CQI converter, an adaptive neural fuzzy inference system (ANFIS) based initial transmit power setting controller (ITPSC) in the first cascade unit, an ANFIS based channel quality index (CQI) decision controller (CQIDC) in the second cascade unit and an ANFIS based self-optimization power controller (SOPC) in the third cascade unit. The SOPC consists of three parts, namely the transmit power adjustment estimator (TPAE), transmission power assignment and self-optimization power controller protection mechanism.

BACKGROUND

Currently, the macrocells are deployed by operators. Since the deployment of femtocells can be in orders of magnitude more numerous than traditional cellular deployments and a network operator may not be able to control the femtocells directly. The femtocells are self-deployed by users rather than operators. Therefore, the femtocell base station's (BS) self-optimization deployment control software must have the characteristics of easy operation to make the BS with the least human action to satisfy the required performance, which are stated hereinafter. The user just needs to plug-and-play and the BS of the femtocell can automatically configure the system parameters in the MU and interference indoor environments. In addition, the self-optimization control software deployed the eNode B (eNB) of femtocell in an interference environment can self-optimization control the transmit power of the BS to save energy, reduce co-channel interference for the adjacent cell, and meet the requirement of service reliability. User input settings include service reliability, the cell edge throughput corresponding to the cell edge CQI and cell radius to match the size of the room coverage. A research report forecasts the global small cell market to grow from $690.0 million in 2014 to $4.8 billion by 2019, at a Compound Annual Growth Rate of 41.7%. Thus, the short distance femtocell technology in the future development of next-generation wireless communication networks and applications will play a very important role.

A previous study has proposed a coverage adaptation approach for femtocell deployment in order to minimize the increase of core network mobility signaling. The information on mobility events of passing and indoor users are used to optimize the femtocell coverage. An approach based on genetic algorithm was presented in to automatically optimize the coverage of a group of femtocells in an enterprise environment. The algorithm is able to dynamically update the pilot powers of the femtocells as per the time varying global traffic distribution and interference levels. The algorithm in a decentralized femtocell deployment has not been considered. A research report has proposed an adaptive neural fuzzy inference system (ANFIS)-assisted power control scheme for a multi-rate multimedia direct-sequence code-division multiple-access (DS-CDMA) system to precisely predict the channel variations and thus compensate for the effect of signal fading in advance. The author in the above study also provides a procedure for determining the transmission rate based upon the output of the signal-to-interference-plus-noise ratio (SINR) increment of the ANFIS power control mechanisms at the sample period. The fuzzy membership functions of ANFIS power control mechanisms use seven Gaussian functions, so that there are 49 fuzzy inference rules. The ANFIS power control mechanisms use two input variables, including SINR error e(n) and SINR error change Δe(n), to track the set point of target SINR. In the present technique, the target SINR value is set to a fix value of 1.5 dB, let the power control process is not flexible enough. The input parameters of ANFIS power control mechanism totally depend on SINR control efficiency. The power cannot be controlled by channel environment. The technology has not considered the performance of multi-user (MU) service reliability (SR).

SUMMARY

In view of the disadvantages of prior art, the primary object of the present invention is to present an adaptive neural fuzzy inference system (ANFIS) based intelligent deployment cascade control (IDCC) device for frequency division duplexing (FDD)-orthogonal frequency division multiplexing access (OFDMA) indoor small cell operated in the multi-user (MU) and interference environments. The proposed IDCC device is designed with a cascade architecture, which mainly contains five units including a resource allocator, a minimum throughput/cell edge CQI converter, an adaptive neural fuzzy inference system (ANFIS) based initial transmit power setting controller (ITPSC) in the first cascade unit, an ANFIS based channel quality index (CQI) decision controller (CQIDC) in the second cascade unit and an ANFIS based self-optimization power controller (SOPC) in the third cascade unit. The SOPC consists of three parts, namely the transmit power adjustment estimator (TPAE), transmission power assignment and self-optimization power controller protection mechanism. In the experimental example, it assumes that the number of indoor users is three, the system bandwidth of the femtocell is set as 20 MHz and the required minimum throughputs for each of users are 2.76 Mbps, 7.44 Mbps, and 14.13 Mbps, respectively.

The principal object of the present invention is that it can autonomously control the assignments of the resource block, initial power, the best channel quality index (CQI) and the minimum transmit power, so that the indoor small cell can produce the optimum throughput, minimum transmit power and interference for multimedia services. The resource allocator sets the average number of resource blocks for each indoor user according to the number of users and system bandwidth in the small cell. The minimum throughput/cell edge CQI converter sets the minimum (cell edge) CQI for each indoor user in accordance with the minimum (cell edge) throughput requirement. Here the cell edge CQI corresponds to the SINR threshold for the BLER of the transceiver equal to 10-1. The present invention uses cascade ANFIS architecture to adapt the initial transmit power setting to the requested throughput at the cell edge, coverage radius and the allocated number of resource blocks; to adapt the best CQI to the initial transmit power setting and average path loss (PL) measured by user equipment (UE) and the allocated number of resource blocks; to adapt the transmit power adjustment estimator (TPAE) in SOPC unit to the requested CQI at the cell edge, the best CQI and measured average SINR. The present IDCC device is design to self-optimize the signal-to-interference-plus-noise (SINR) and throughput service reliabilities of the indoor small cell in the multi-user (MU) and interference environments, while maintaining the blocking error rate (BLER) less than 10-1 and minimizing the transmit power and interference power to achieve the aims of energy saving and interference reducing.

Other aspects and advantages of the present invention will become apparent from the following detailed description, taken in conjunction with the accompanying drawings, illustrating by way of example the principles of the present invention.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

For your esteemed members of reviewing committee to further understand and recognize the fulfilled functions and structural characteristics of the invention, several preferable embodiments cooperating with detailed description are presented as the follows.

The invention presents an adaptive neural fuzzy inference system (ANFIS) based intelligent deployment cascade control (IDCC) device for FDD-OFDMA indoor small cell operated in the multi-user (MU) and interference environments to self-optimize the MU service reliability (SR), average throughput, transmit power and interference for multimedia call services.

Figure 1:
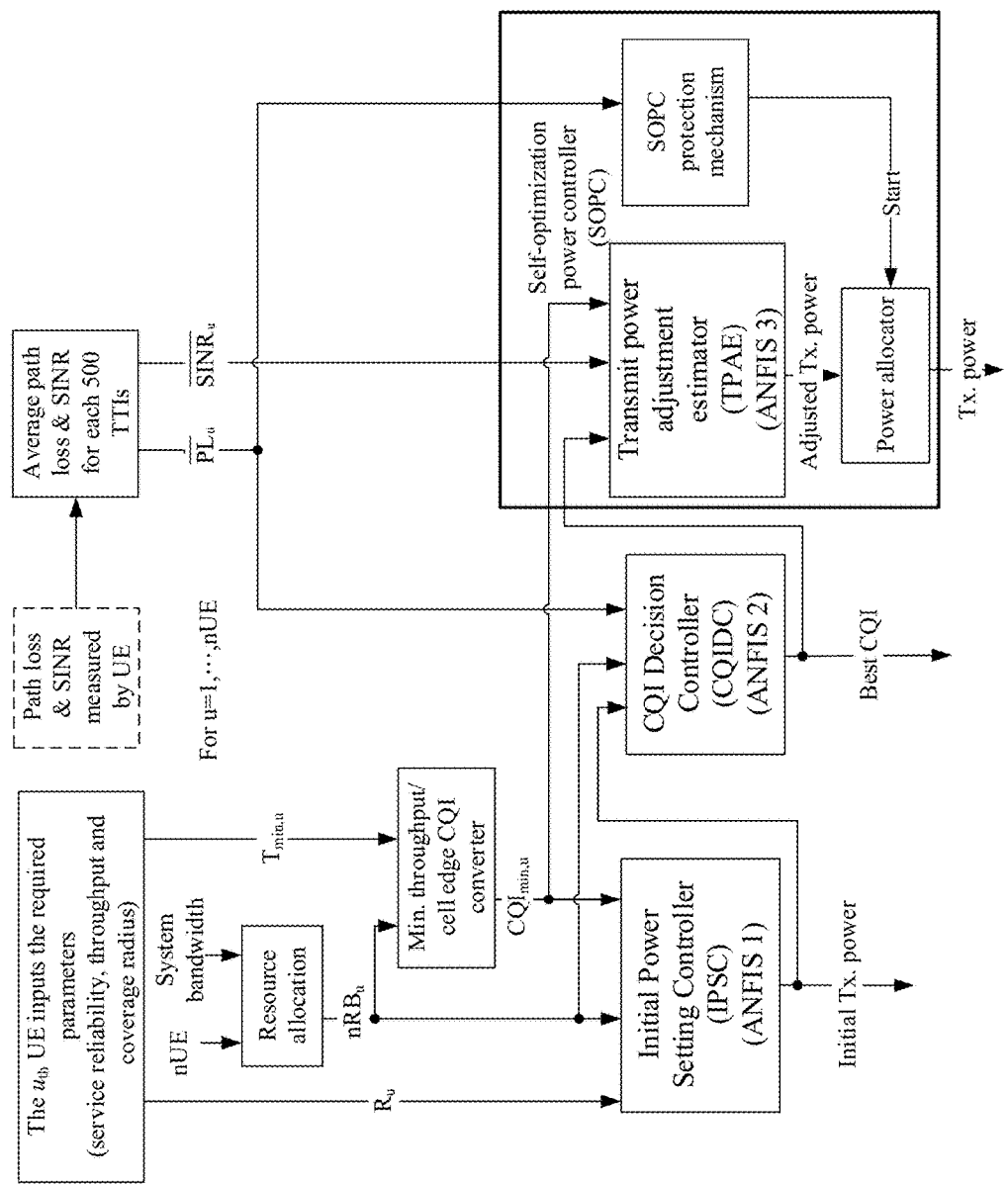
FIG. 1 is a block diagram of intelligent deployment cascade control (IDCC) device for FDD-OFDMA indoor small cell.

The principal structure of the present invention is an ANFIS based IDCC device as shown in FIG. 1; which mainly contains five units including a resource allocator, a minimum throughput/cell edge CQI converter, an adaptive neural fuzzy inference system (ANFIS) based initial transmit power setting controller (ITPSC) in the first cascade unit, an ANFIS based channel quality index (CQI) decision controller (CQIDC) in the second cascade unit and an ANFIS based self-optimization power controller (SOPC) in the third cascade unit. The SOPC consists of three parts, namely the transmit power adjustment estimator (TPAE), transmission power assignment and self-optimization power controller protection mechanism.

In order to complete the intelligent deployment of small cells, the present invention is to use adaptive network architecture established by Jjh Shing Roger Jang in 1993, known as ANFIS, which is a fuzzy inference system. By using a hybrid learning method, the weights of ANFIS controller are adjusted to the appropriate value. The user inputs the parameters including the service reliability, coverage radius and the throughput at the cell edge. The user equipment (UE) measures the reference signal received power (RSRP) and sends back the estimated average path loss (PL) and signal-to-interference-plus-noise ratio (SINR) to the IDCC device. The proposed IDCC device is design to self-optimize the minimum transmit power of the indoor small cell in the multi-user (MU) and interference environments, while maintaining the blocking error rate (BLER) of the transceiver less than 10-1, and satisfying the requirements of average throughput and service reliability for the UE.

Figure 2:
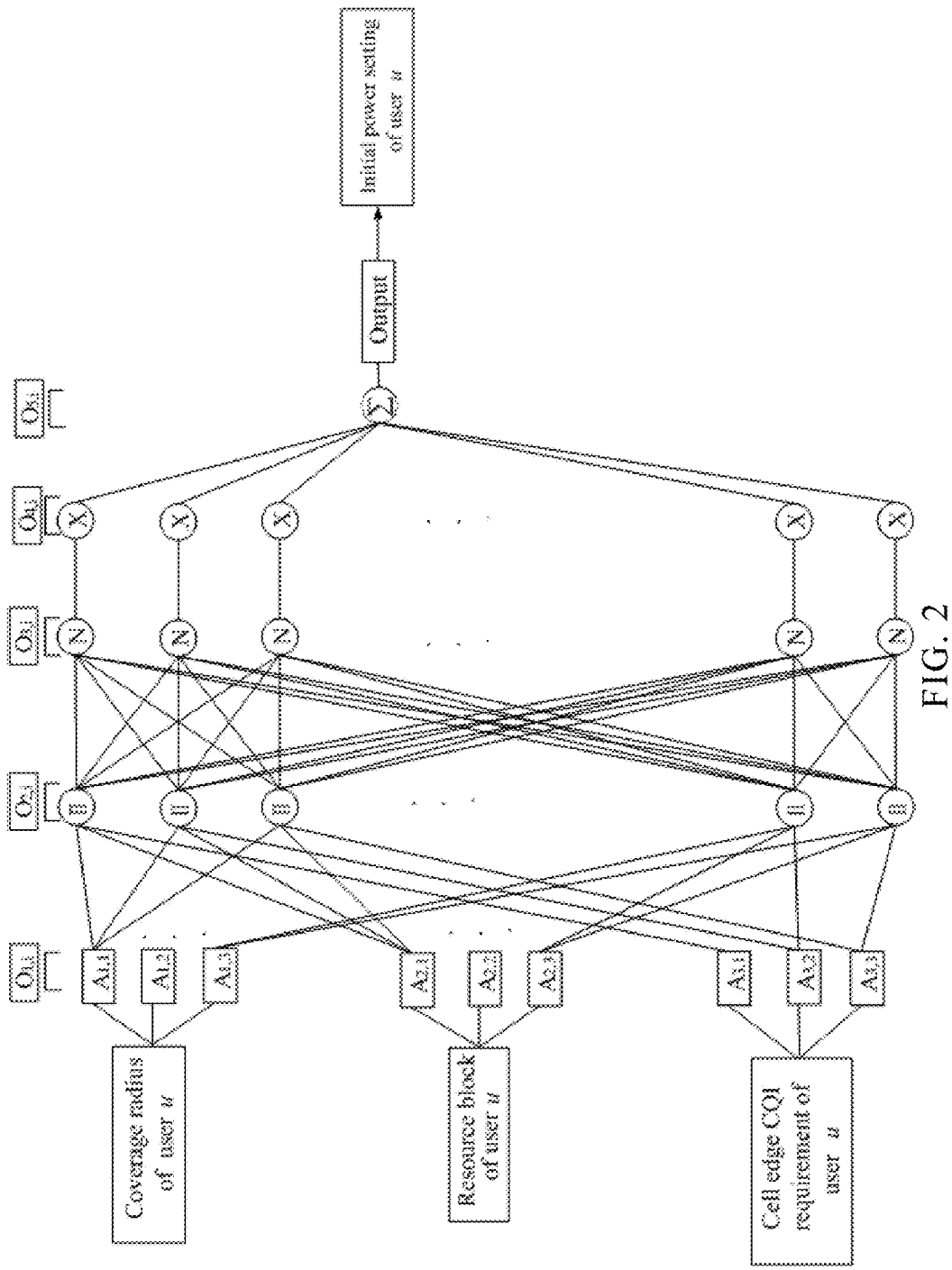
FIG. 2 shows the architecture of an ANFIS based initial transmit power setting controller (ITPSC) unit.

The architecture diagram of ANFIS based ITPSC unit is shown in FIG. 2, which contains five layers, a total of three inputs and one output. Three input parameters for the $u_{th}$ user are the coverage radius of indoor office ($R_u$), the number of resource blocks ($nRB_u$) and the cell edge CQI that is defined as $CQI_{min,u}$, the output parameter for the $u_{th}$ user is an initial minimum transmit power ($P_{ini,u}$). The ITPSC unit adapts the initial power setting to the changing $R_u$, $nRB_u$ and $CQI_{min,u}$. The generalized bell shape membership function of each input parameter for the $u_{th}$ user is divided into three levels. There are 27 fuzzy inference rules. The ITPSC unit defines the $R_u$ of less than 5 meters as low (L), it defines 5 meters~10 meters as medium (M), it defines 11 meters ~15 meters as high (H); it defines the $nRB_u$ of 1 RB~25 RBs as low (L), it defines 26 RBs~74 RBs as medium (M), it defines 75 RBs~100 RBs as high (H); it defines $CQI_{min,u}$ in 1~5 for L, it defines $CQI_{min,u}$ in 6~10 for M, it defines $CQI_{min,u}$ in 11~15 for H; the output for the $u_{th}$ user is the initial transmit power setting ($P_{ini,u}$), which satisfies the $u_{th}$ user requests under interference free environments.

Figure 3:
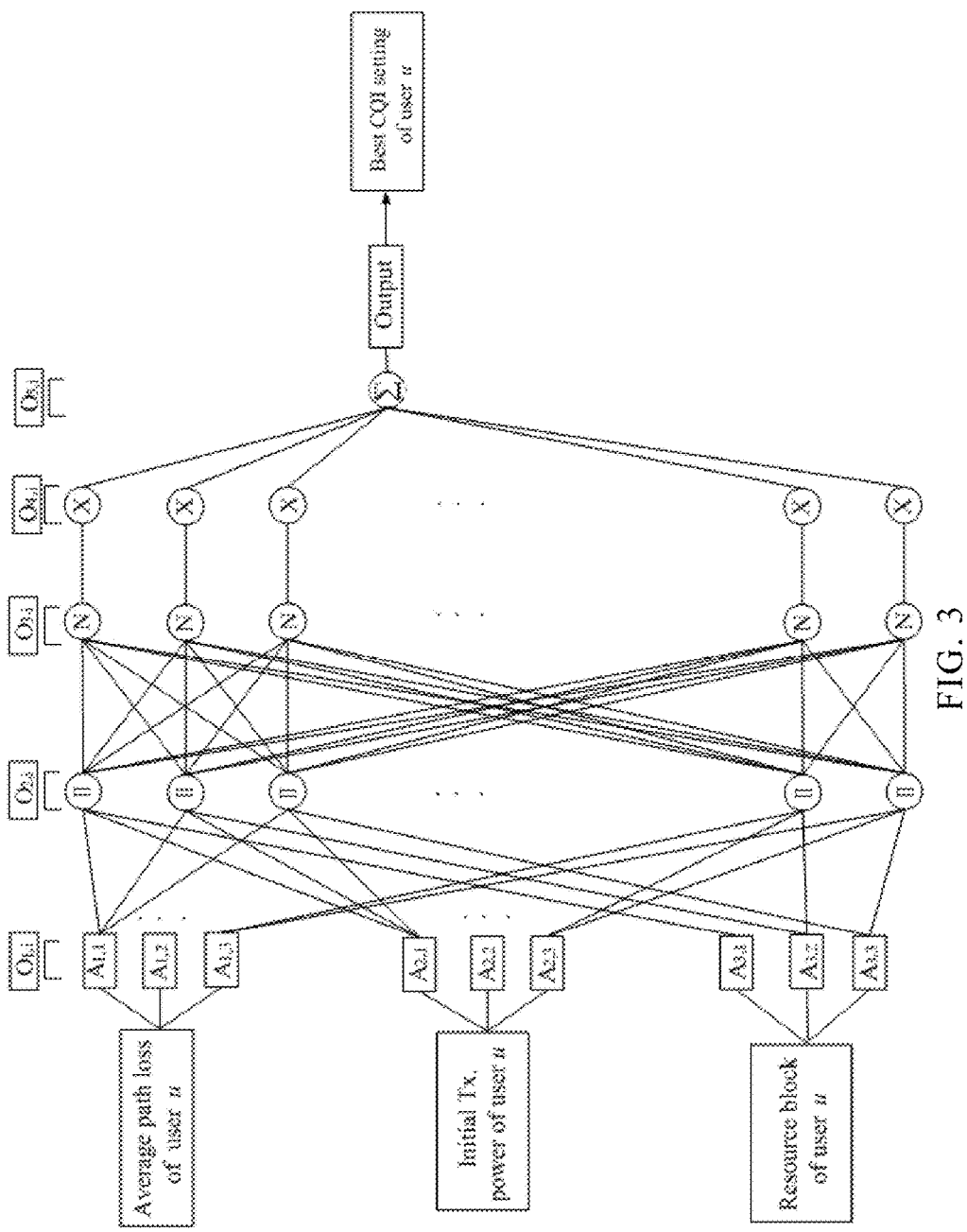
FIG. 3 shows the architecture of an ANFIS based channel quality index (CQI) decision controller (CQIDC) unit.

The architecture diagram of ANFIS based CQIDC unit is shown in FIG. 3, which contains five layers, a total of three inputs and one output. There are three input parameters for the $u_{th}$ user including average path loss ($\overline{PL}_u$) between orthogonal frequency division multiplexing (OFDM) transmitter and receiver, initial transmit power setting ($P_{ini,u}$) and number of resource blocks ($nRB_u$), the output parameter for the $u_{th}$ user is the best CQI ($CQI_{best,u}$). Under interference free environments, the CQIDC unit adapts the best CQI to the changing $\overline{PL}_u$, $P_{ini,u}$ and $nRB_u$. The Gaussian shape membership function of each input parameter is divided into three levels. There are 27 fuzzy inference rules. The CQIDC unit defines the average path loss ($\overline{PL}_u$) in 30 dB~40 dB for L, it defines average path loss ($\overline{PL}_u$) in 41 dB~60 dB for M, it defines average path loss ($\overline{PL}_u$) in 61 dB~70 dB for H; it defines initial transmit power setting ($P_{ini,u}$) in −75 dBm~−51 dBm for L, it defines initial transmit power setting ($P_{ini,u}$) in −50 dBm~−4 dBm for M, it defines the initial transmit power setting ($P_{ini,u}$) in −3 dBm~20 dBm for H; it defines the $nRB_u$ of 1 RB~25 RBs as low (L), it defines 26 RBs ~74 RBs as medium (M), it defines 75 RBs~100 RBs as high (H). The output for the $u_{th}$ user is the best CQI ($CQI_{best,u}$) under interference free environments.

The SOPC consists of three parts, namely the transmit power adjustment estimator (TPAE), transmission power assignment and self-optimization power controller protection mechanism. The power adjustment estimator in the interference environment primarily estimates the amount of minimum transmit power adjustment needs for each user; the transmission power for each user is adjusted when the sum doesn't exceed the maximum transmit power limit. The protection mechanism of the SOPC is used to prevent the co-channel interference from the moving users of adjacent cells.

Figure 4:
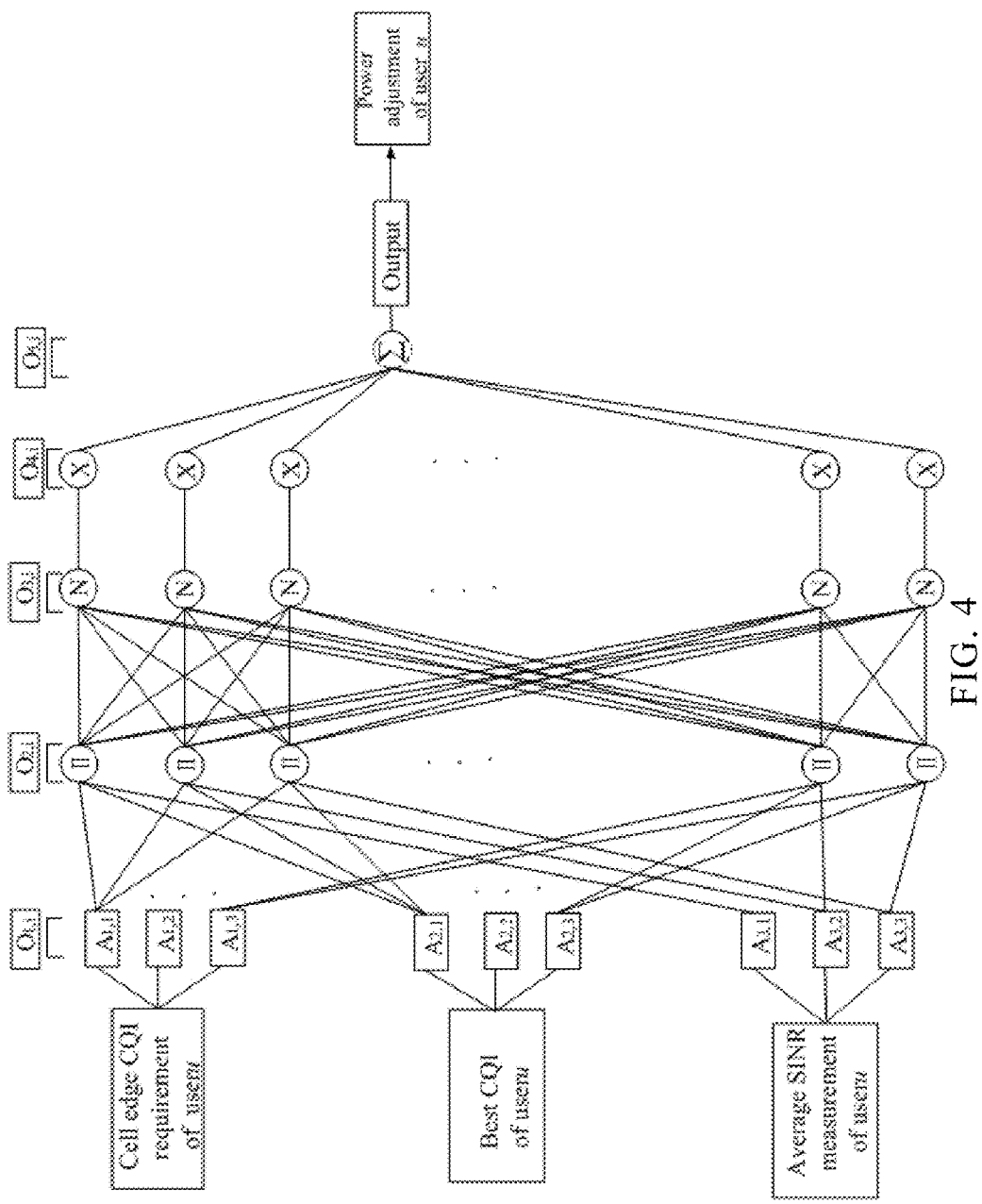
FIG. 4 shows the architecture of an ANFIS based transmit power adjustment estimator in SOPC unit.

The architecture diagram of ANFIS based TPAE in the SOPC unit is shown in FIG. 4, which contains five tiers, a total of three inputs for the $u_{th}$ user including cell edge CQI ($CQI_{min,u}$), best CQI ($CQI_{best,u}$) and average measured SINR ($\overline{SINR}_u$), the output parameter for the $u_{th}$ user is a power adjustment ($\Delta P_u$). In the interference environment, the ANFIS based TPAE in the SOPC unit adapts output power adjustment $\Delta P_u$ to the changing $CQI_{min,u}$, $CQI_{best,u}$ and $\overline{SINR}_u$. The SOPC unit will be coordinated with CQIDC unit to set the minimum transmit power for the transceiver, which switches to the corresponding modulation mode and coding rate. The SOPC unit accepts three inputs and generates the optimizing minimum transmit power. The SOPC unit will continue to estimate the average SINR value in the MU interference environments. The transmit power of OFDM transceiver will be adjusted with the changing interference power to maintain the BLER less than $10^{-1}$ and to satisfy the requirement of SR for the $u_{th}$ user; The generalized bell shape membership function of each input parameter is divided into three levels. There are 27 fuzzy inference rules. The ANFIS based TPAE in the SOPC unit defines the $CQI_{min,u}$ in 1~5 for L, it defines $CQI_{min,u}$ in 6~10 for M, it defines $CQI_{min,u}$ in 11~15 for H; it defines the $CQI_{best,u}$ in 1~5 for L, it defines $CQI_{best,u}$ in 6~10 for M, it defines the $CQI_{best,u}$ in 11~15 for H; it defines the $\overline{SINR}_u$ less than −25 dB~−5 dB for L, it defines the $\overline{SINR}_u$ in −4 dB~25 dB for M, it defines the $\overline{SINR}_u$ in 26 dB~45 dB for H. The signal-to-interference-plus-noise ratio (SINR) is estimated through the reference signal received power (RSRP) measured from the user equipment (UE) and sends back to the IDCC device in e Node B (eNB). The estimated path loss (PL) is obtained by subtracting RSRP from the transmit reference signal.

(A) The Architecture of the ANFIS Controller:

The ANFIS based TPAE in the SOPC unit is used as an example to describe the framework of the ANFIS controller:

Layer 1: The generalized bell shape membership functions are defined as:

$$A_{j,n}(x_{j,m}) = \frac{1}{1 + \left|\frac{x_{j,m} - c_{j,n}}{a_{j,n}}\right|^{2b_{j,n}}}, \quad (1)$$

for $n = 1, 2, 3$ and $j = 1, 2, 3$ where $x_{j,m}$ is the $m_{th}$ input and the premise parameters $a_{j,n}$, $b_{j,n}$, $c_{j,n}$ pertaining to the node outputs are updated according to given training data and the gradient descent approach.

Layer 2: The output of node i, denoted by $O_{2,i}$, is the product of all the incoming signals for the $i_{th}$ rule. It is given by:

$$w_{i,m} = O_{2,i} = A_{1,p}(x_{1,m}) \times A_{2,q}(x_{2,m}) \times A_{3,r}(x_{3,m})$$

for $i=1,2,27; p=1,2,3; q=1,2,3; r=1,2,3$ \quad (2)

Layer 3: The output of node i, denoted by $O_{3,i}$, is called the normalized firing strength and calculated as:

$$O_{3,i} = \hat{w}_{i,m} = \frac{w_{i,m}}{\sum_{i=1}^{27} w_{i,m}}, \text{ for } i = 1 \sim 27 \quad (3)$$

Layer 4: Every node in the fourth layer is an adaptive node with a node function:

$$O_{4,i} = \hat{w}_{i,m} \times f_{i,m} = \hat{w}_{i,m} \times (\alpha_i x_{1,m} + \beta_i x_{2,m} + \gamma_i x_{3,m} + \omega_i);$$

for $i=1\sim27$ \quad (4)

where $O_{4,i}$ is the node output, $f_{i,m}$ is a crisp output in the consequence, and the $\alpha_i$, $\beta_i$, $\gamma_i$, $\omega_i$ are the consequent parameters of node i. The 27 fuzzy inference rules of $f_{i,m}$ are constructed as follows:

$R_1$: if ($x_{1,m}$ is $A_{11}$) and ($x_{2,m}$ is $A_{21}$) and ($x_{3,m}$ is $A_{31}$)
   then (output is $f_{1,m}$);

$R_2$: if ($x_{1,m}$ is $A_{11}$) and ($x_{2,m}$ is $A_{21}$) and ($x_{3,m}$ is $A_{32}$)
   then (output is $f_{2,m}$);

$R_3$: if ($x_{1,m}$ is $A_{11}$) and ($x_{2,m}$ is $A_{21}$) and ($x_{3,m}$ is $A_{33}$)
   then (output is $f_{3,m}$);

$R_{26}$: if ($x_{1,m}$ is $A_{13}$) and ($x_{2,m}$ is $A_{23}$) and ($x_{3,m}$ is $A_{32}$) then (output is $f_{26,m}$);

...

$R_{27}$: if ($x_{1,m}$ is $A_{13}$) and ($x_{2,m}$ is $A_{23}$) and ($x_{3,m}$ is $A_{33}$) then (output is $f_{27,m}$) \quad (5)

The above 27 fuzzy inference rules are used for determining the assigned data rate to achieve optimization objective.

Layer 5: The single node in the fifth layer is a fixed node labeled $\Sigma$, which computes the overall output $O_5$ as the summation of all incoming signals.

$$G_m = O_5 = \sum_{i=1}^{27} \hat{w}_{i,m} \times f_{i,m} \quad (6)$$

Figure 5:
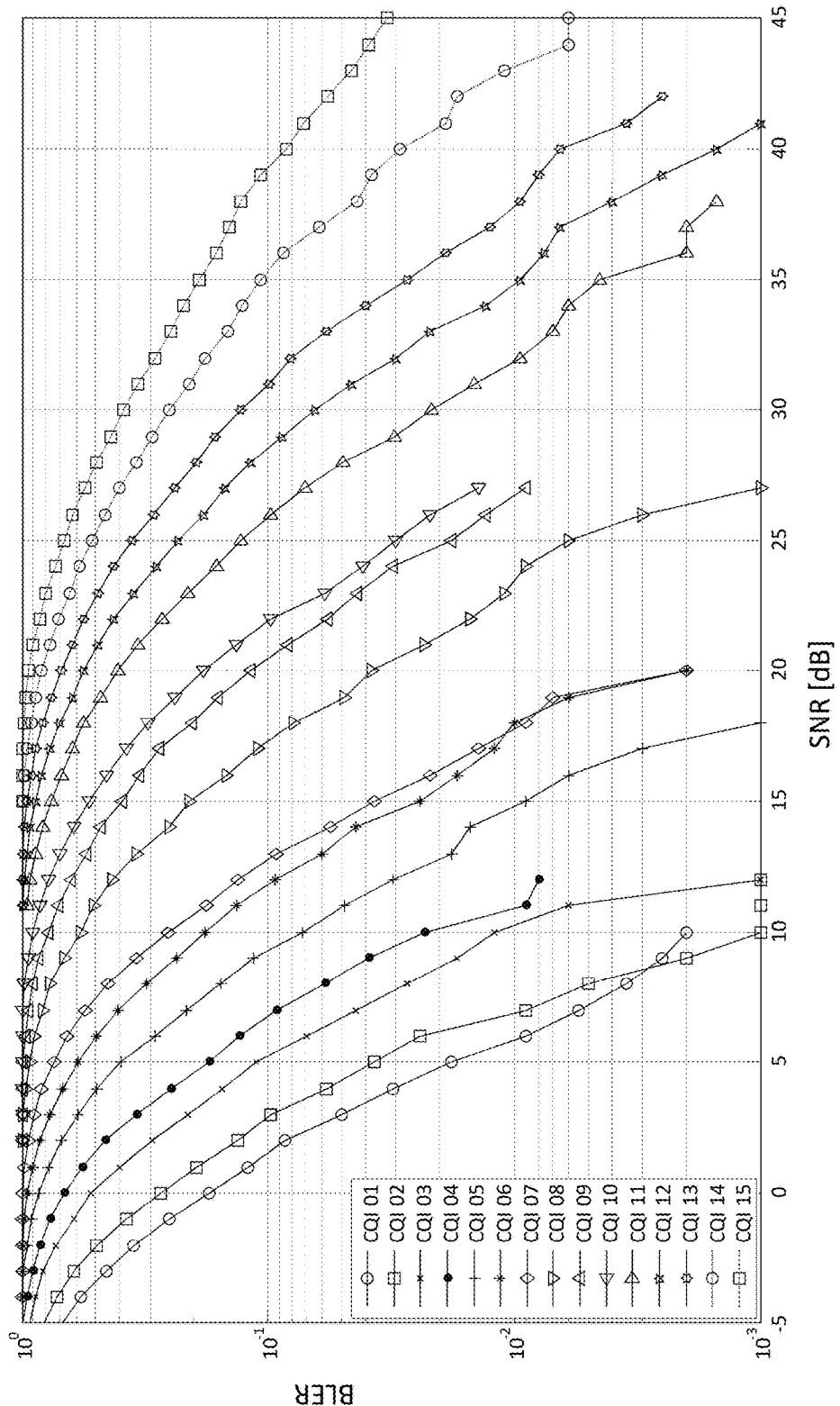
FIG. 5 illustrates the BLER performance of DL OFDM transceiver in IOA channel for CQI=1, 2 . . . , 15.

(B) The Minimum Throughput/Cell Edge CQI Conversion Unit:

In order to satisfy the user requirements of indoor small cell in throughput and blocking error rate (BLER) of less than $10^{-1}$, the relationship between the throughput and SINR threshold for the different CQI must be obtained. Therefore, the BLER and throughput of the LTE downlink (DL) transceiver for indoor small cell are simulated to generate the training data for the ANFIS ITPSC. The system parameters are shown in Table 1 and fundamental parameters of the transceiver are shown in Table 2. In the simulation of the present embodiment, for the different channel quality index (CQI), the BLER of 1×1 SISO-OFDM transceiver is simulated where the system bandwidth is 20 MHz, the indoor office A (IOA) channel is selected as channel model, the least square (LS) channel estimation and minimum mean square error (MMSE) equalizer are used, and the user speed is assumed to be 10 km/hr. The 1000 sub frames are applied for the simulations. The results are shown in FIG. 5, which is used as a training data to define the SINR threshold for BLER=$10^{-1}$ under different CQI, as shown in Table 3. In each CQI (corresponding to each pair of modulation and code rate mode), the difference between the SINR measurement value and the SINR threshold value is used to control the size of the transmit power adjustment $\Delta$P, which must compliance with the provisions of Table 3, where the interference power is not considered. The physical resource blocks (PRBs) of Table 3 is generated according to the system bandwidth of 20 MHz and three indoor users. When the system bandwidth is 20 MHz, the corresponding total number of physical resource blocks (PRBs) is 100 PRBs.

Figure 6:
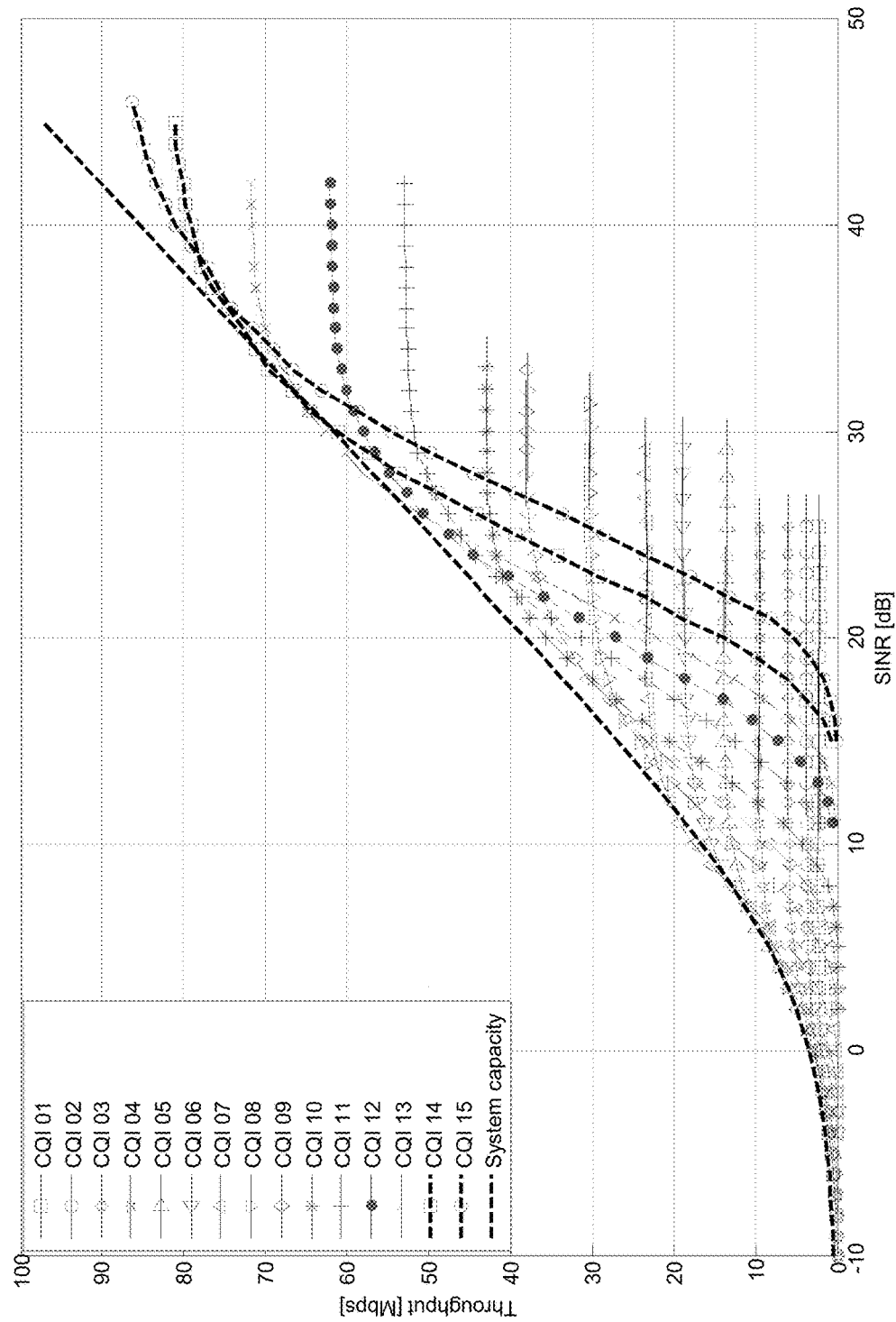
FIG. 6 illustrates average throughput and system capacity of DL OFDM transceiver in IOA channel for CQI=1, 2 . . . , 15.

The resource assignment method of this invention is the orthogonal frequency division multiplexing access (OFDMA) for the frequency division duplexing (FDD) mode of indoor small cell operated in the multi-user (MU) environments. The eNB of the indoor office will perform the resource allocation for each UE with 33 RBs at each time instant. For practical implementation considerations, the system capacity of the downlink (DL) OFDM transceiver formula is modified as [10]:

$$C(bps) = BW \cdot BW\_\text{eff} \cdot \frac{nRB_u}{nRB_{total}} \cdot \eta \cdot \log_2(1 + SINR/\text{SINR\_eff}) \quad (7)$$

where $nRB_{total}$ is the total number of RBs and $nRB_u$ is the number of RBs assigned for the $u_{th}$ user; BW and BW_eff are system bandwidth and effective system bandwidth, respectively. The parameter $\eta$ is a correction factor. SINR and SINR_eff are signal to interference plus noise power ratio and effective signal to interference plus noise power ratio, respectively. In this invention, the simulation parameters of DL SISO OFDM transceiver is given in Table 1, where BW=20 MHz, BW_eff=0.83, $\eta$=0.43 and SINR_eff=2.51199 (4 dB). The average throughput of DL transceiver in IOA channel for CQI=1, 2 . . . , 15 is shown in FIG. 6, where the system capacity is denoted by dotted curve and the simulated average throughput for CQI=1, 2 . . . , 15 are denoted by solid curve. It is observed that the simulated average throughput approximates to the Shannon capacity bound for LTE specifications. Thus, the throughputs corresponding to SINR threshold for the different CQIs are calculated with (7) and listed in Table 3. As can be seen from table, the input throughput requirement settings for the $u_{th}$ user in the range of 1.99~2.76 Mbps, 6.76~7.44 Mbps, 12.99~14.13 Mbps correspond to the cell edge CQI ($CQI_{min,u}$) in 3, 7, and 10, respectively.

(C) Initial Transmit Power Setting Controller (ITPSC) Unit:

In order to control the initial transmit power of small cell eNB for satisfying the requirements of the $u_{th}$ user, the BLER performance of the LTE downlink (DL) transceiver is simulated to generate the training data for the ITPSC. This invention considers multi-user system reliability (SR) requirements of indoor small cell in fading environments. The received signal strength $P_r$ at the UE is log-normally distributed. The coverage probability of $P_r$ greater than the receiver sensitivity $P_{r,min}$ from the femtocell to a UE at the distance d is:

$$P_{W_0}(d) = p[P_r \geq P_{r,min}] = \int_{W_0}^{\infty} p(P_r) dP_r \quad (8)$$

$$= \frac{1}{2} - \frac{1}{2}\text{erf}\left(\frac{P_{r,min} - K + 10N\log_{10}\left(\frac{d}{R}\right)}{\sqrt{2}\,\sigma_W}\right)$$

where R is the coverage radius, K is the average signal strength (dBm) at the cell edge, K−$P_{r,min}$ (dB) is the fade margin (FM) at the cell edge (d=R) which is used to guarantee the reliability at the cell edge, $\sigma_W$ is the standard deviation of received signal strength (dB) and N is the path loss exponent.

The percentage of the UE in a cell of radius R for $P_r$ greater than the receiver sensitivity $P_{r,min}$ is defined as the service reliability (SR), which is given as:

$$SR = \frac{1}{2}\left\{1 + \text{erf}(p) + \exp\left(\frac{2pq+1}{q^2}\right)\left[1 - \text{erf}\left(\frac{pq+1}{q}\right)\right]\right\}., \quad (9)$$

where $$p = \frac{FM}{\sqrt{2}\,\sigma_W}, q = \frac{10N\log_{10}e}{\sqrt{2}\,\sigma_W}, \quad (10)$$

The minimum transmit power of the ITPSC is evaluated by link budget formula for the different SR, coverage radius ($R_u$) of indoor office, and the cell edge CQI ($CQI_{min,u}$) requested by the $u_{th}$ user. The minimum transmit power in dBm of the ITPSC is given by:

$$P_{ini,u} = P_{rmin,u}(CQI_{min,u}) + L_t - G_t + PL(R_u) + FM(SR_u) - G_r + L_r \quad (11)$$

where $P_{rmin,u}(CQI_{min,u})$ is the receiver sensitivity of the cell edge CQI ($CQI_{min,u}$) for the $u_{th}$ user. $L_t$ denotes the cable loss in dB. $G_t$ and $G_r$ are the antenna gains in dBi of the femtocell and the UE, respectively. $PL(R_u)$ denotes the maximum path loss between a femtocell and the uth user at the cell edge. $L_r$ in dB is the body loss of the UE. $FM(SR_u)$ denotes fade margin in dB corresponding to the SR set by the $u_{th}$ user. The receiver sensitivity of the given cell edge CQI ($CQI_{min,u}$) for the $u_{th}$ user is obtained by:

$$P_{rmin,u}(CQI_{min,u}) = P_{N,u} + SNR_{th}(CQI_{min,u}) \quad (12)$$

where $SNR_{th}(CQI_{min,u})$ denotes the SNR threshold of the receiver for different $CQI_{min,u}$, which is generated from the performance simulations using the transceiver specification listed in Table 2. The receiver noise power $P_{N,u}$ in dBm for the $u_{th}$ user is given as:

$$P_{N,u} = NF(dB) + (-174) + 10\log_{10}(BW_{r,u})(dBm) \quad (13)$$

where NF is the noise FIG. of the UE receiver and $BW_{r,u}$ is the receiver bandwidth.

$$BW_{r,u} = 15 \text{ kHz} \times 12 \times nRB_u \quad (14)$$

where $nRB_u$ is the allocated RBs of the $u_{th}$ user. The SNR thresholds for BLER=0.1 are summarized in Table 3. Using the ITU-R indoor path loss model [12], the path loss between a femtocell eNB and an UE separated by a distance d (m) in a given cell is $$PL(d) = 20\log_{10}(f) + 10N\log_{10}(d) + L_f(n) - 28 \text{ (dB)} \quad (15)$$

where the carrier frequency f (MHz) is set as 2350 MHz with 20 MHz bandwidth in the experiment. N is the path loss exponent, where the nominal value in the indoor office is set as 3 [12]. $L_f(n)$ (dB) is the penetration loss between the floors, where n is the number of floors. The penetration loss is not considered in the simulations.

In addition, the standard deviation $\sigma_W$ of the received shadow fading signal power in the indoor office environment is set as 10 dB.

Figure 7:
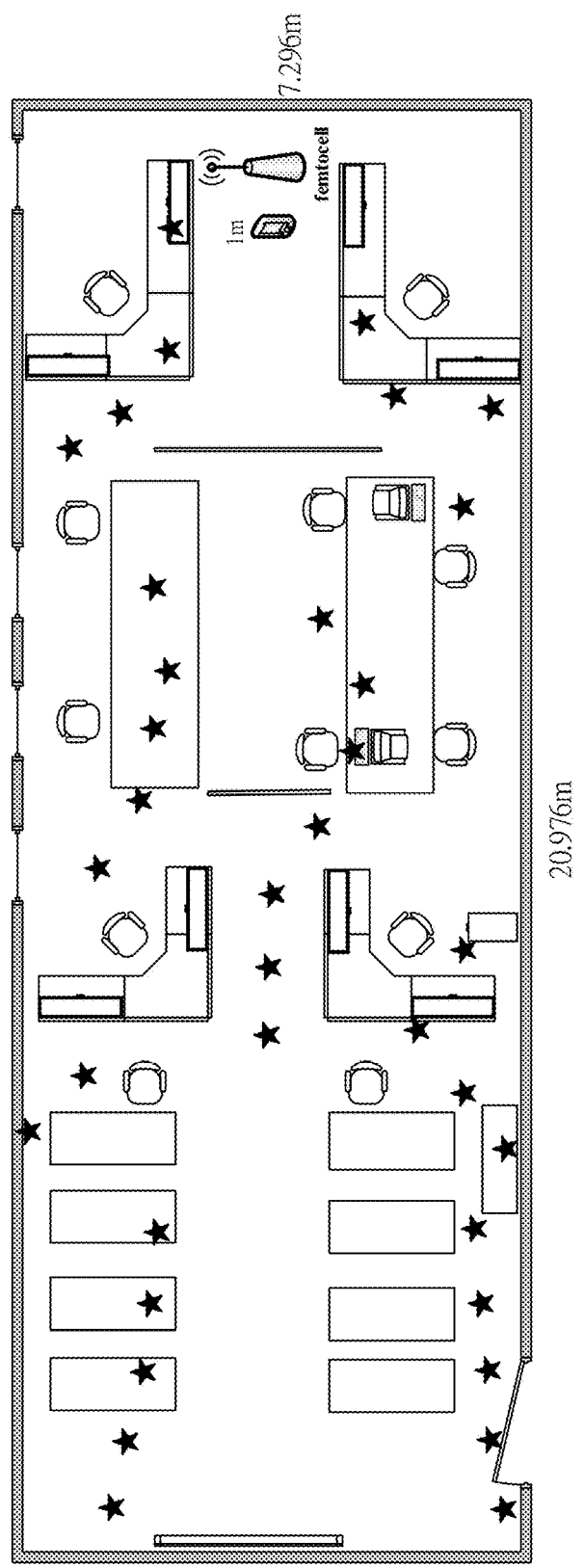
FIG. 7 shows the scenario of laboratory with femtocell eNB and measurement points.

Experiment Measurements in the Laboratory:

For the purpose of determining the path loss exponent N and the standard deviation $\sigma_W$ of the received shadow fading signal in the indoor office environments, the power measurement of small cell eNB (ITRI-SC-CUT3) is performed in the laboratory. The scenario of laboratory is shown in FIG. 7, where the femtocell eNB and measurement positions are illustrated. The length and width of the laboratory are 20.98 meter and 7.30 meter, respectively. The black stars located in the laboratory represent 38 measurement positions, which are distributed at distance of 1~19 meters from the eNB. 1000 RSRPs are measured at each measurement position.

Figure 8:
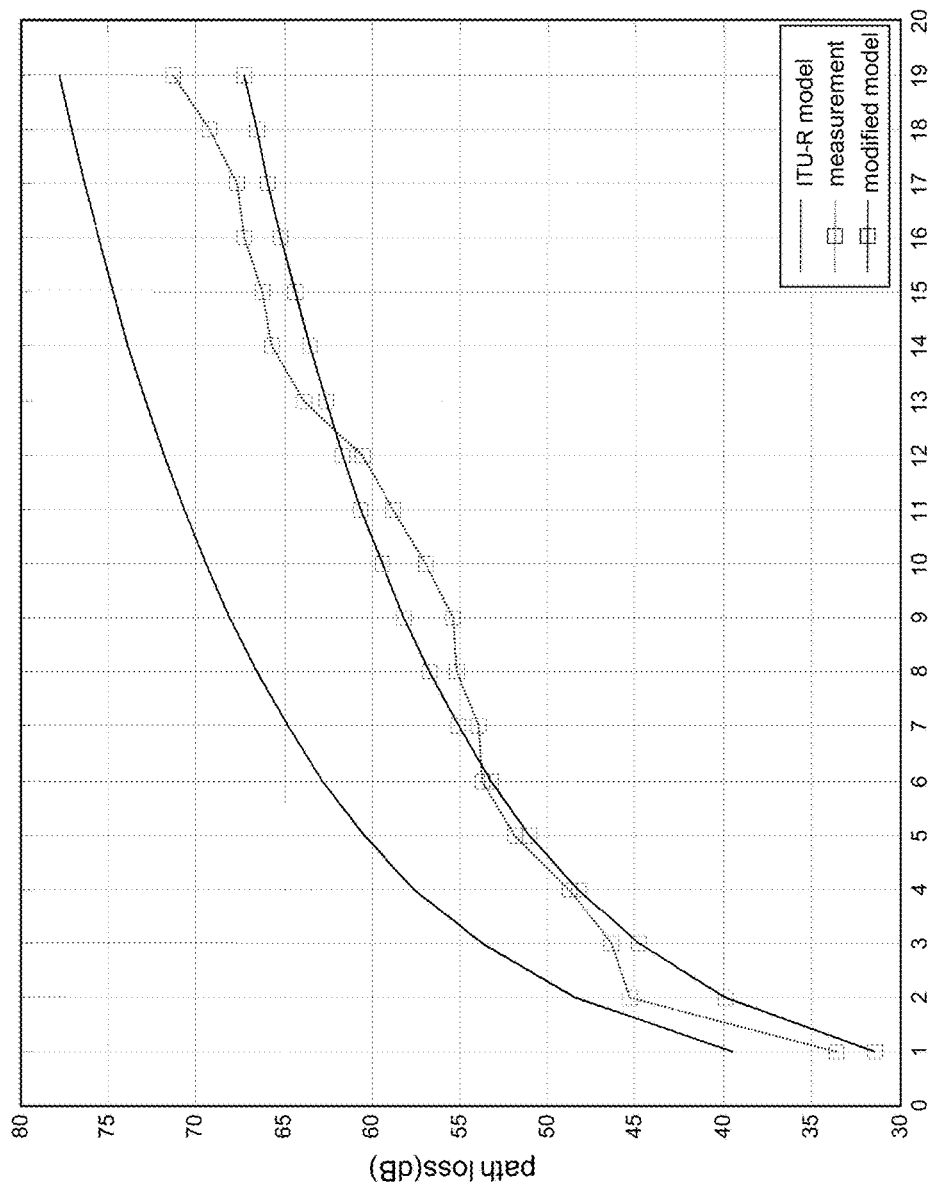
FIG. 8 shows the modified path loss model obtained from the field trial in the laboratory.

UE (Samsung Galaxy Note Edge SM-N915G) used with drive test tool report RSRPs for different distances between transmitter and receiver in the laboratory and calculate their standard deviation. Then the path loss model of the laboratory can be obtained by modifying the ITU-R indoor office path loss model. FIG. 8 shows the modified path loss model obtained from the field trial in the laboratory, where circle solid curve is the ITU-R indoor office path loss model; the triangular dotted curve is the measured path loss model; the square solid curve is the modified path loss model of the laboratory. Therefore, the formula of the ITU path loss model is modified as $$PL(d) = 20\log_{10}(f) + 28\log_{10}(d) - 36 \text{ (dB)} \quad (16)$$

where the standard deviation $\sigma_W$ of the received shadow fading signal and the path loss exponent N are 4.27 dB and 2.8, respectively. Finally, by substituting O and N into (9)(10), the fade margin FM for 90% service reliability is calculated as 2.14 dB.

Figure 9:
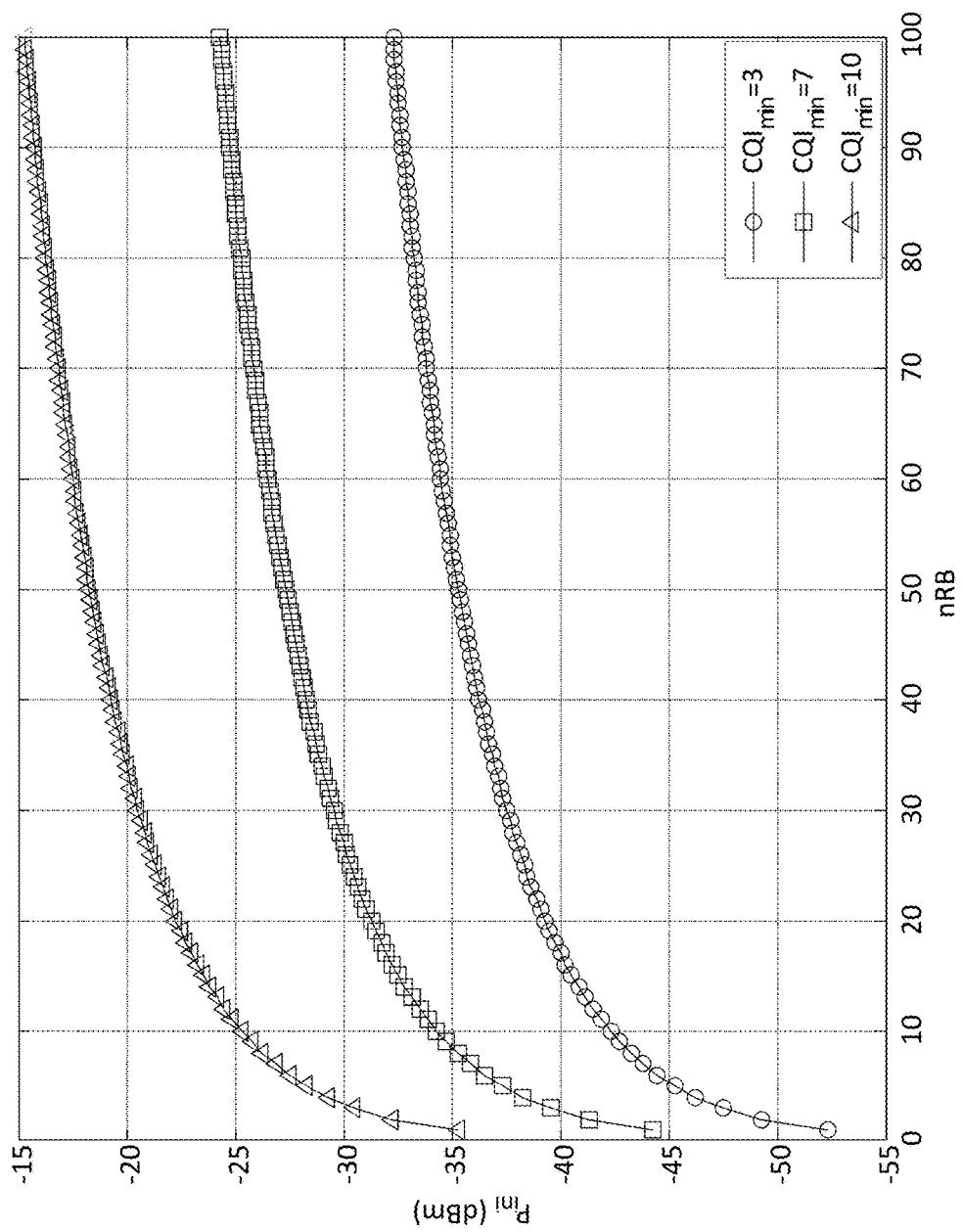
FIG. 9 shows a set of training data for ITPSC unit: The minimum transmit power corresponding to coverage radius=5 m, the cell edge CQI=3, 7, 10 and number of resource block=1 to 100.

The training data of the ITPSC is generated from the simulation results of the transceiver BLER, as shown in Table 3. Integrating Table 3 with equations (11), (12), (13), (14) and (16), the minimum transmit power is calculated for the service reliability of 90%, different coverage radius (2.5, 5, 7.5, 10, 12.5 and 15 meters), different number of resource block (1~100) and cell edge CQI (1~15). FIG. 9 shows a set of training data of the ITPSC for coverage radius of 5 meter, cell edge CQI (3, 7, 10) and different number of resource block (1~100). For example, when the number of resource block is 50, the minimum transmit power corresponding to different cell edge CQI (3, 7, 10) is (−35.33 dBm, −27.33 dBm, −18.33 dBm).

Figure 10A:
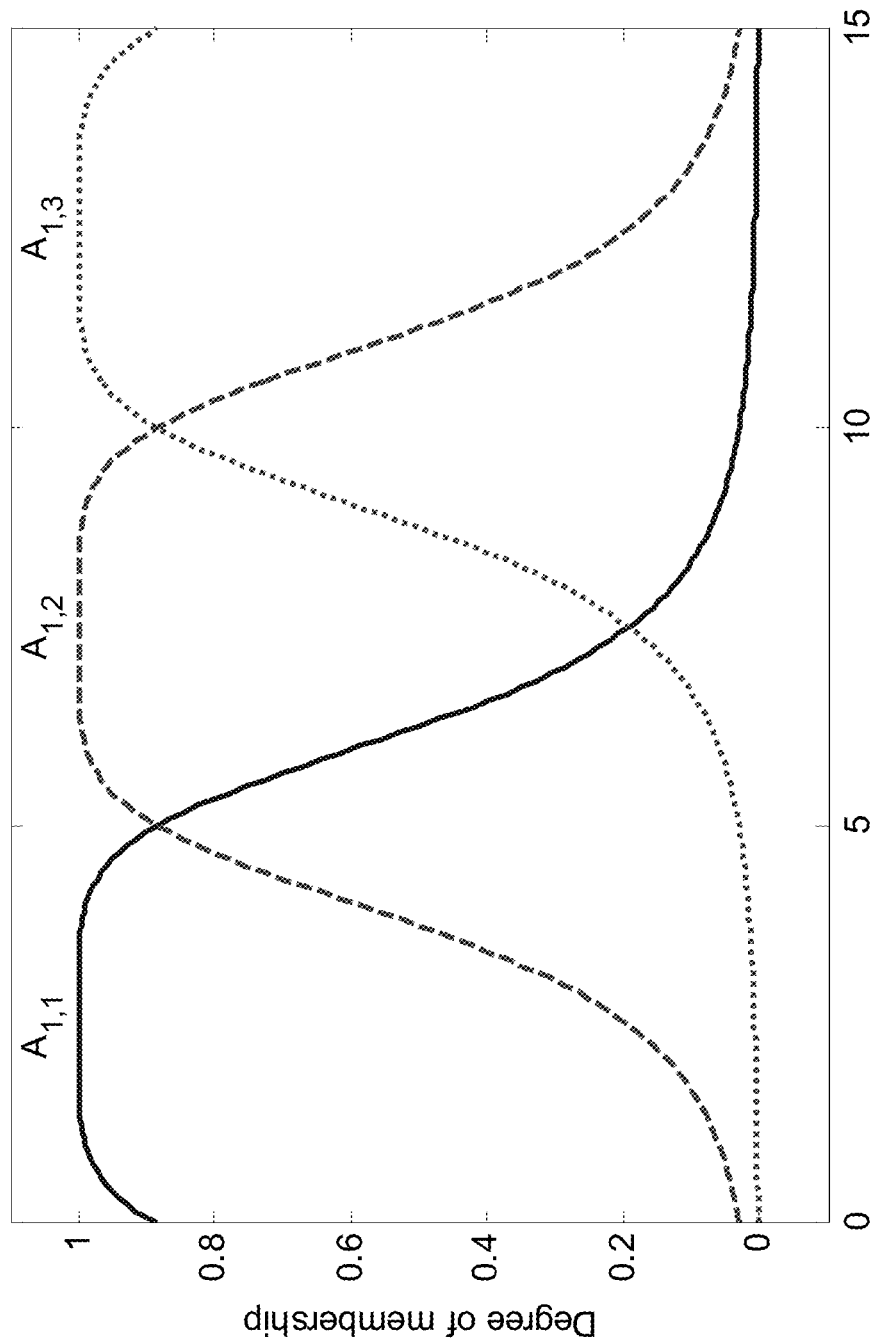
FIG. 10(a) shows the initial coverage radius (R) membership functions of ITPSC unit.
Figure 10B:
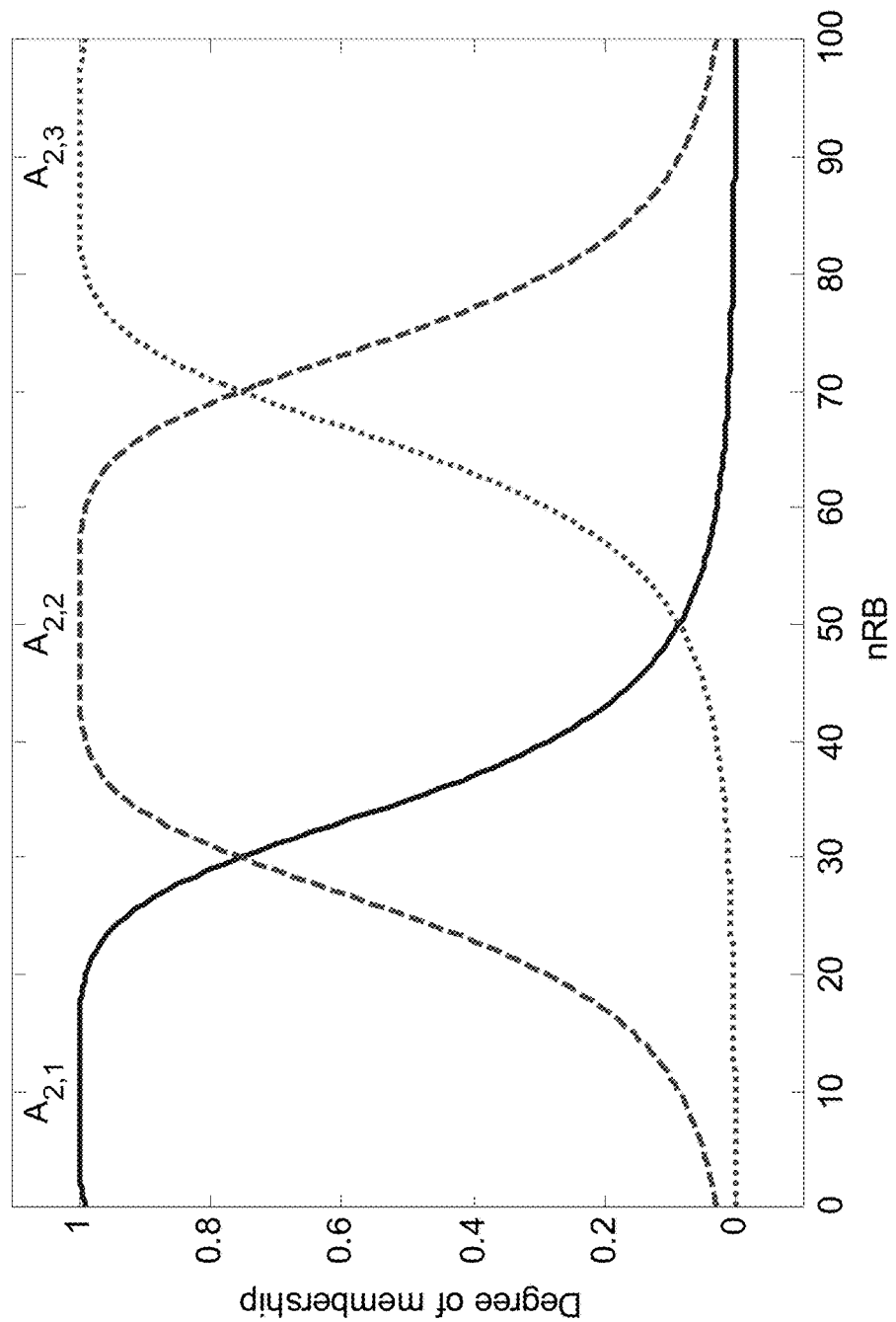
FIG. 10(b) shows the initial number of resource block (nRB) membership functions of ITPSC unit.
Figure 10C:
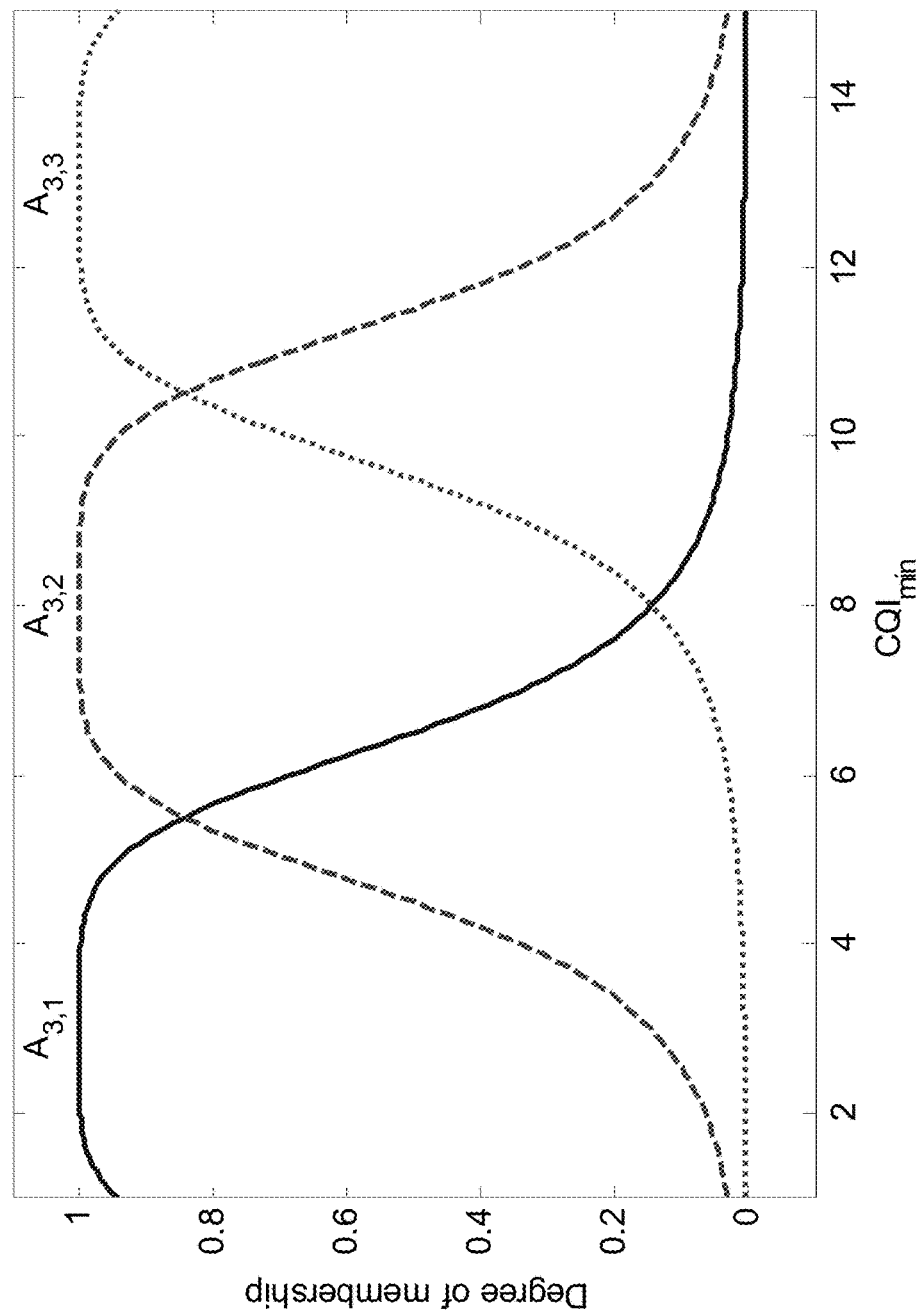
FIG. 10(c) shows the initial cell edge CQI ($CQI_{min}$) membership functions of ITPSC unit.
Figure 11A:
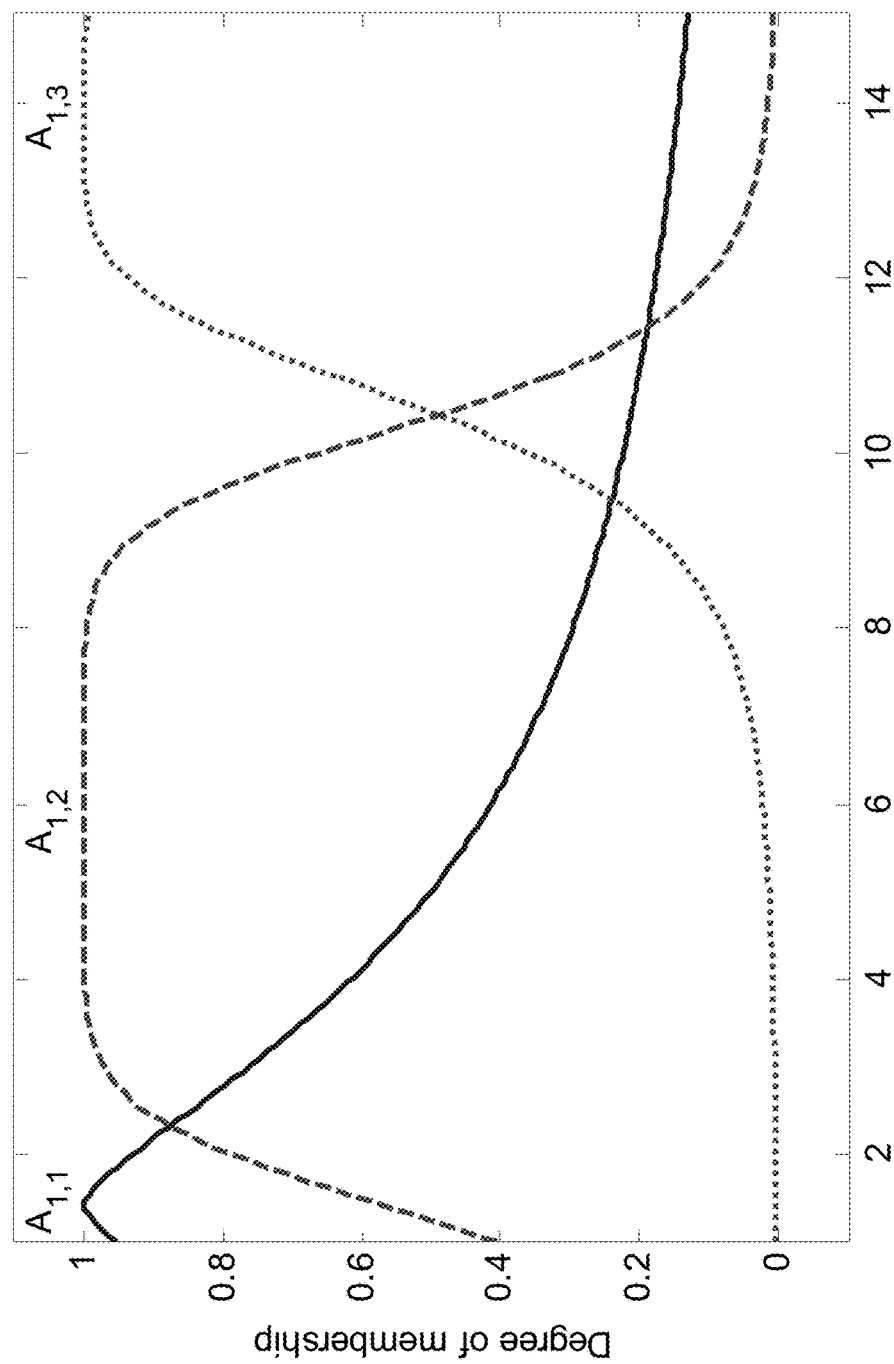
FIG. 11(a) shows the learned coverage radius (R) membership functions of ITPSC unit.
Figure 11B:
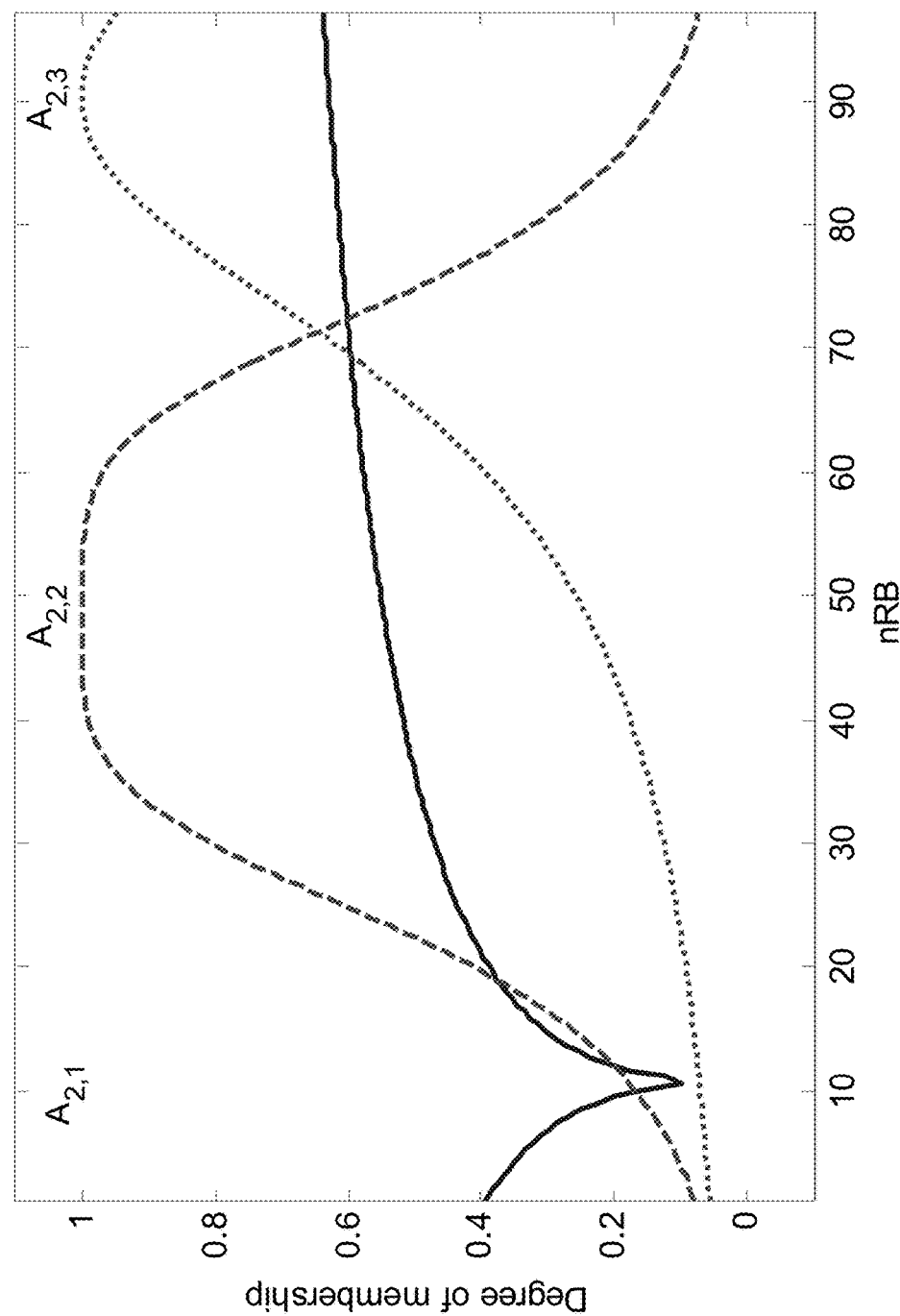
FIG. 11(b) shows the learned number of resource block (nRB) membership functions of ITPSC unit.
Figure 11C:
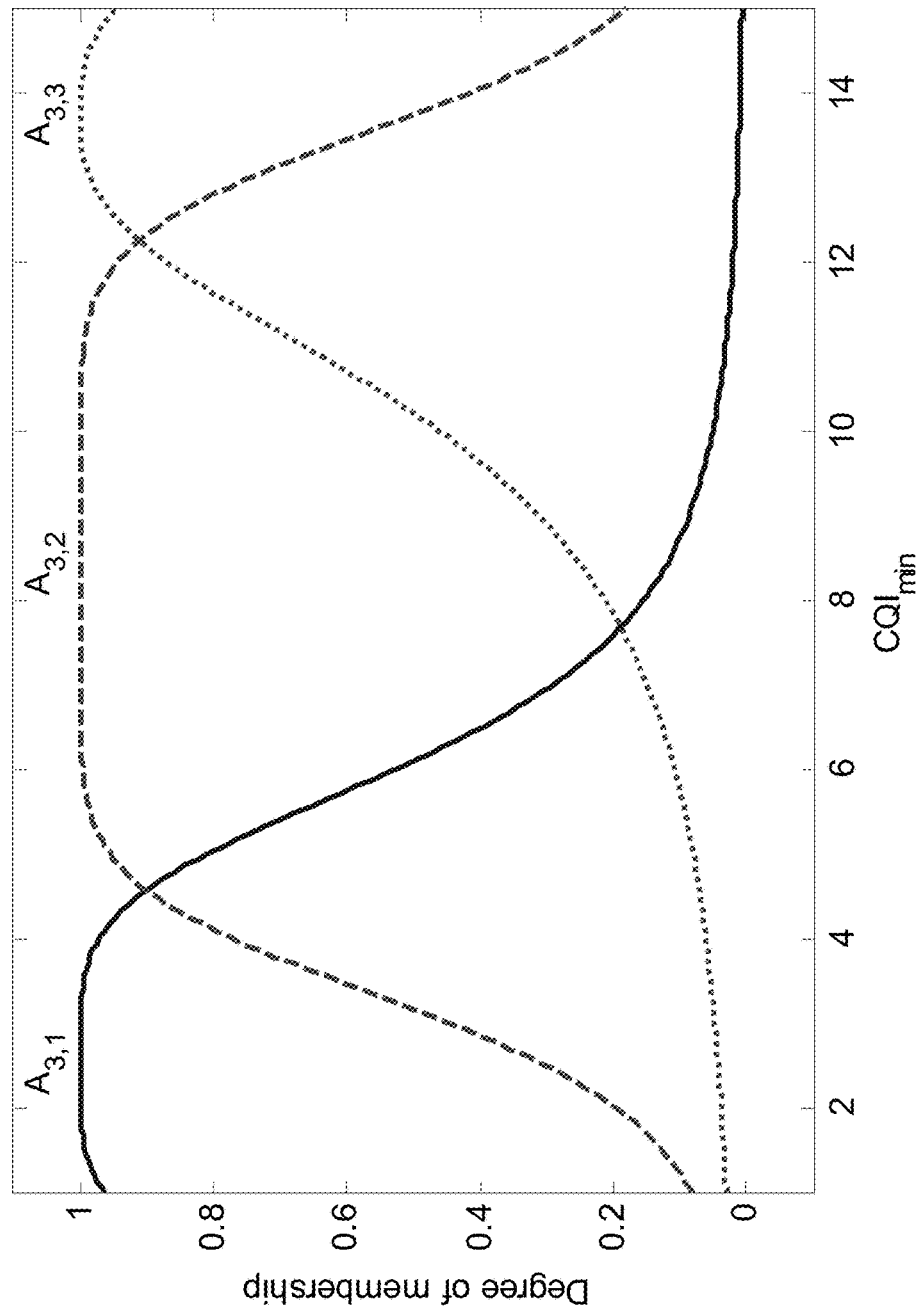
FIG. 11(c) shows the learned cell edge CQI ($CQI_{min}$) membership functions of ITPSC unit.
Figure 12:
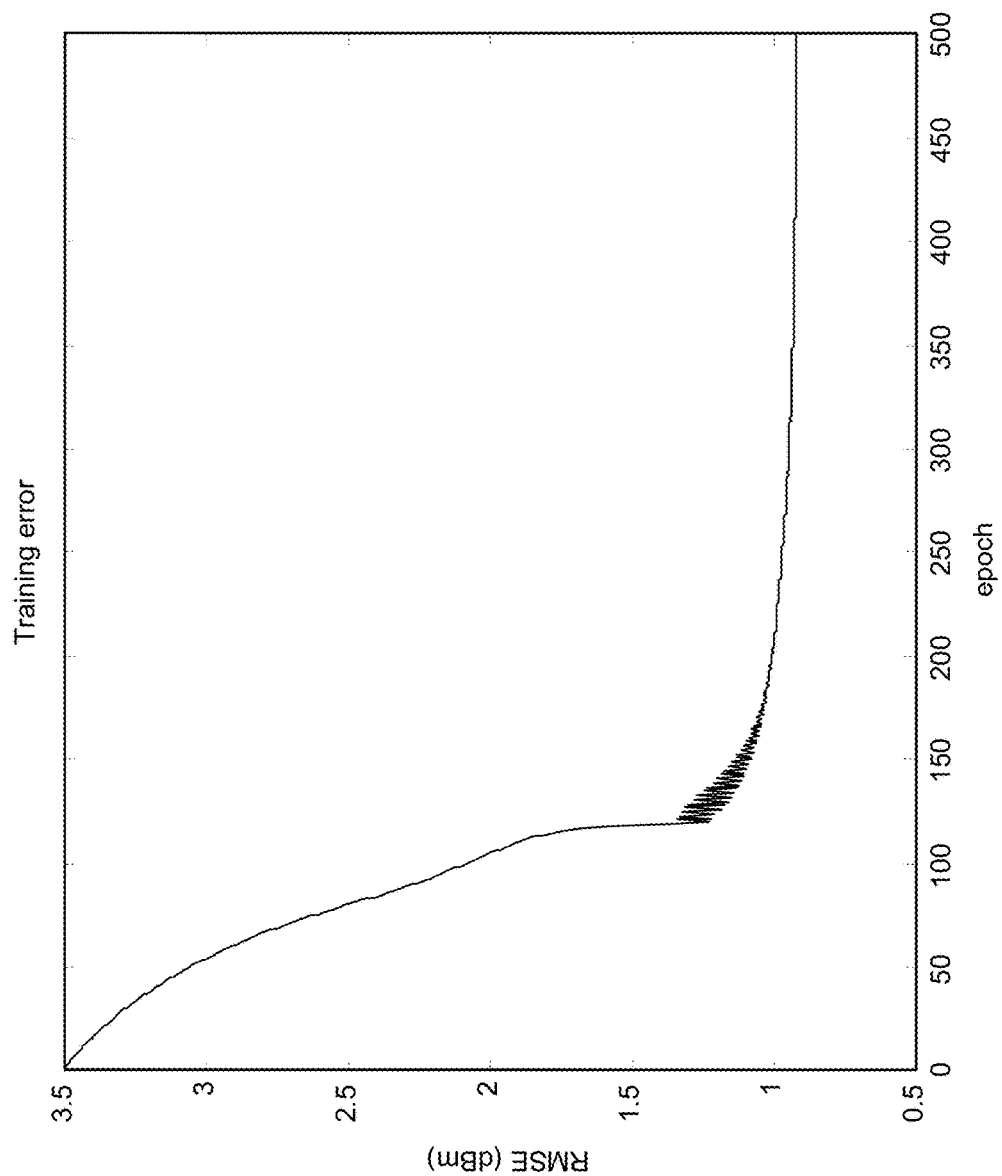
FIG. 12 shows the root mean square error of ITPSC unit.

The function of the ITPSC is to set the initial minimum transmit power of the femtocell eNB, which satisfies the requirements of the different RBs ($nRB_u$), coverage radius ($R_u$) of indoor office, and the cell edge CQI ($CQI_{min,u}$) requested by the $u_{th}$ user in the interference free environments. Each input uses three generalized bell shape membership functions (MFs), which are defined as:

$$A_{j,n}(x_{j,m}) = \frac{1}{1 + \left|\frac{x_{j,m} - c_{j,n}}{a_{j,n}}\right|^{2b_{j,n}}}, \quad (17)$$

for $n = 1, 2, 3$ and $j = 1, 2, 3$ where $x_{j,m}$ is the $m_{th}$ input and the premise parameters $a_{j,n}$, $b_{j,n}$, $c_{j,n}$ pertaining to the node outputs are updated according to given training data and the steepest descent approach. The 27 fuzzy inference rules are constructed in Table 4. A minimum transmit power optimization problem of the ANFIS-ITPSC for the $u_{th}$ user is formally formulated as follows:

Optimize $P_{ini} = f(\vec{x})$, $f(\vec{x})$ is the objective function; (18)

subject to:

$\vec{x} \in \{R_u, nRB_u, CQI_{min,u}\}$ $0 \text{ m} < R_u \leq 15 \text{ m}$ $1 \leq nRB_u \leq 100$ $1 \leq CQI_{min,u} \leq 15$ $\sum_{u}^{nUE} P_{ini,u} \in \{ \leq 20 \text{ dBm}\}$ The premise parameters of three MFs before and after training are shown in FIG. 10 and FIG. 11, respectively. The root mean square error (RMSE) curve of the ITPSC is shown in FIG. 12, which demonstrates that the RMSE converges to 0.9 dBm after 300 epochs.

(D) Channel Quality Index Decision Controller (CQIDC) Unit:

In the real radio channel environment, indoor small cell base station deployment will face co-channel interference of macro cell base station or neighboring small cell, resulting in performance degradation of indoor small cell base station. Therefore, the CQIDC unit in the IDCC device determines the best CQI in interference-free environment to meet the receiver performance of BLER≤0.1. Further, in interference environments, self-optimizing power system control unit (SOPC) keeps track of the measured SINR to self-optimize the transmit power, enabling the UE to meet the objective needs of the service's reliability and minimum transmit power.

In the interference free environment, in order to determine the best CQI ($CQI_{best,u}$) at the $u_{th}$ user's location of the indoor office, the following formula is used to estimate signal-to-noise-power ratio (SNR). It can be expressed as $$SNR_u = P_{r,u}(W)/P_{N,u}(W) \quad (19)$$

where the average received power $P_{r,u}$ at the $u_{th}$ user in the interference free environment is given as $$P_{r,u} = P_{ini,u} - L_t + G_t - \overline{PL}_u + G_r - L_r \quad (20)$$

where $\overline{PL}_u$ denotes the measured average path loss between a femtocell and an UE in the given cell. The noise power $P_{N,u}$ can be calculated by (13). Then, the best CQI in the interference free environment is determined by the following rules:

$$CQI_{best,u} = \quad (21)$$

Figure 13:
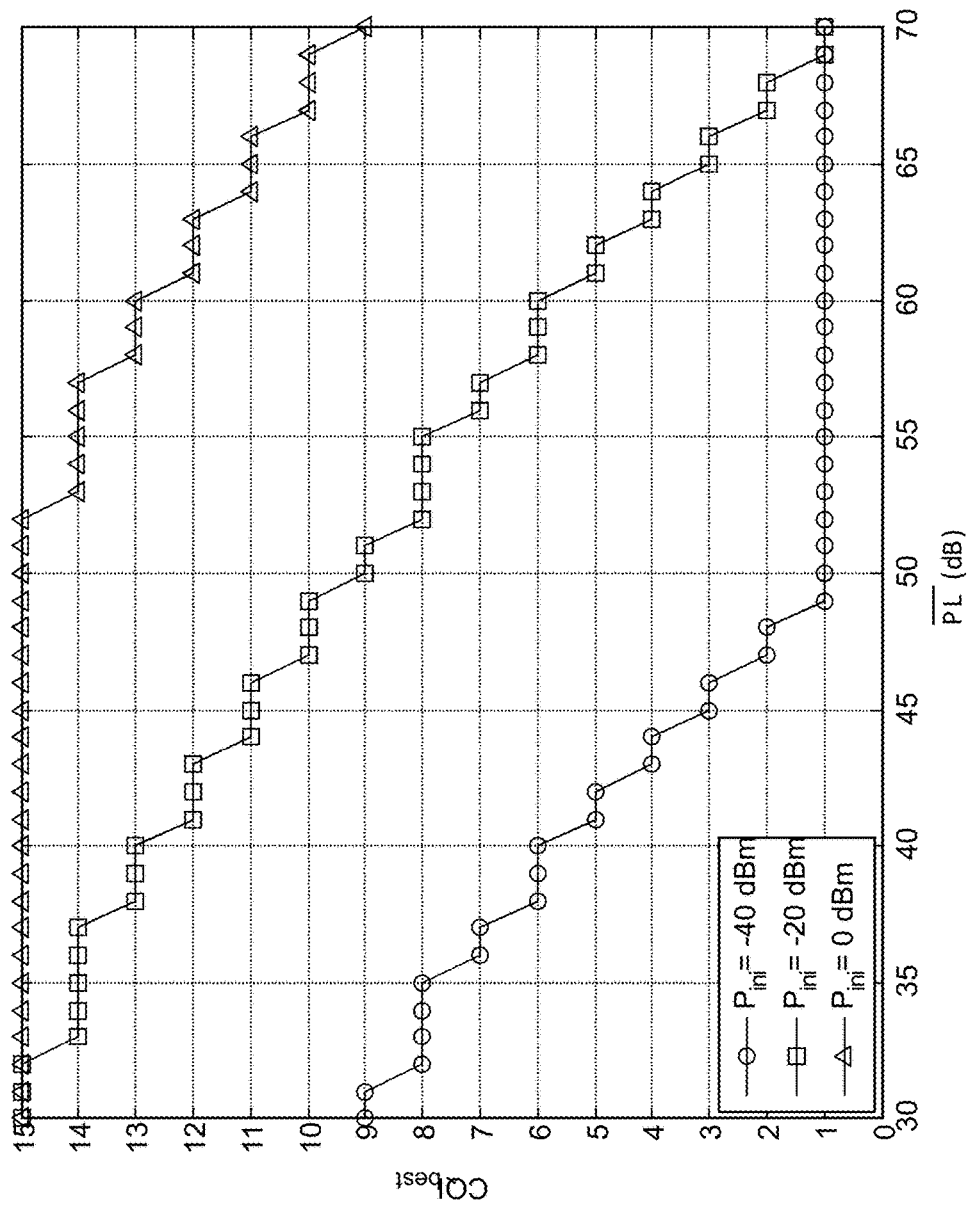
FIG. 13 shows a set of training data for CQIDC unit: The best CQI corresponding to the initial transmit power of ITPSC=−40 dBm, −20 dBm, 0 dBm, average path loss=30 dB to 70 dB and number of resource block=1 to 100.

$\begin{cases} CQL\_i, & \text{if } SNR_{th}(CQL\_i) \leq SNR_u < SNR_{th}(CQL\_i+1), i = 1 \sim 14 \\ CQL\_15, & \text{if } SNR_u \geq SNR_{th}(CQL\_15) \\ CQL\_1, & \text{if } SNR_u < SNR_{th}(CQL\_1) \end{cases}$ The training data of the CQIDC is generated from the simulation results of the transceiver BLER, as shown in Table 3. Integrating Table 3 with equations (19), (20) and (21), the best CQI is calculated for different measured average path loss (30 dB~70 dB), resource block (1~100) and initial minimum transmit power (−75 dBm~20 dBm). FIG. 13 shows a set of CQIDC training data of the best CQI corresponding to different average path loss (30 dB~70 dB), when the resource block is 50, the minimum transmit power is (−40 dBm, −20 dBm, 0 dBm). It is observed that the best CQI will decrease as the path loss becomes larger, and at the same average path loss, the best CQI increases as the initial transmit power becomes larger.

The function of the CQIDC is to determine the best CQI of the femtocell at the $u_{th}$ user's location of indoor office, which satisfies the receiver performance of BLER≤0.1 in the interference free environments. Each input uses three Gaussian MFs, which are defined as $$A_{j,n}(x_{j,m}) = e^{\frac{-(x_{j,m} - b_{j,n})^2}{2a_{j,n}^2}}, \text{ for } n = 1, 2, 3 \text{ and } j = 1, 2, 3 \quad (22)$$

where $x_{j,m}$ is the $m_{th}$ input and the premise parameters $a_{j,n}$, $b_{j,n}$ pertaining to the node outputs are updated according to given training data and the steepest descent approach. The 27 fuzzy inference rules are constructed in Table 5. The output of CQIDC is the best CQI of the femtocell at the $u_{th}$ user's location of indoor office. An optimization problem of the best CQI of the ANFIS-CQIDC is formally formulated as follows:

In the interference free environments, BLER ≤0.1, optimize $CQI_{best,u} = f(\vec{x})$ at the $u_{th}$ user, $f(\vec{x})$ is the objective function;

subject to :

$\vec{x} \in \{\overline{PL}_u, P_{ini,u}, nRB_u\}$ $30\text{dB} \leq \overline{PL}_u \leq 70\text{dB}$ $-75\text{dBm} \leq P_{ini,u} \leq 20\text{dBm}$ $1 \leq nRB_u \leq 100$ $CQI_{best,u} \in \{1 \sim 15\}$ (23)

Figure 14A:
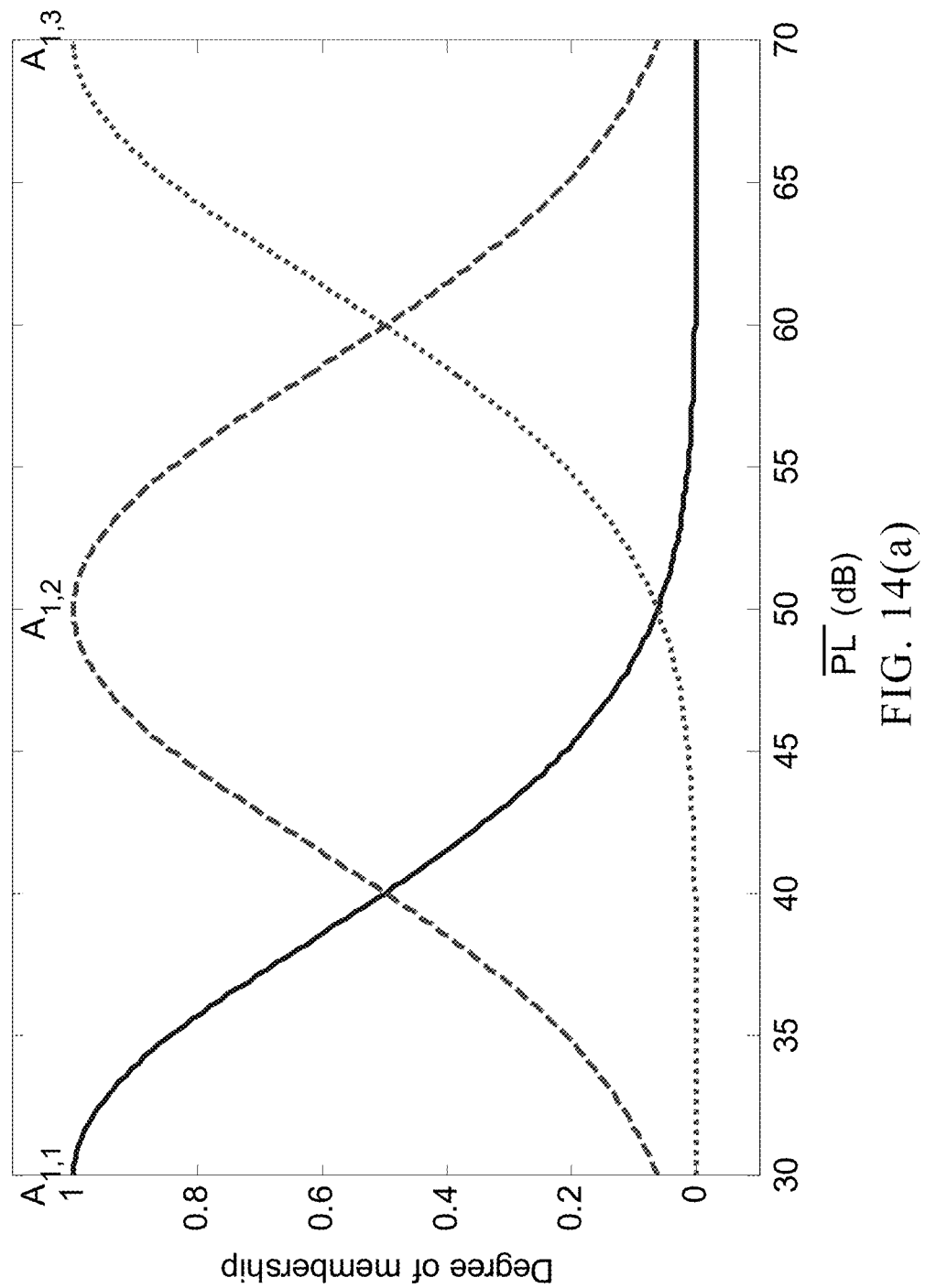
FIG. 14(a) shows the initial average path loss ($\overline{PL}$) membership functions of CQIDC unit.
Figure 14B:
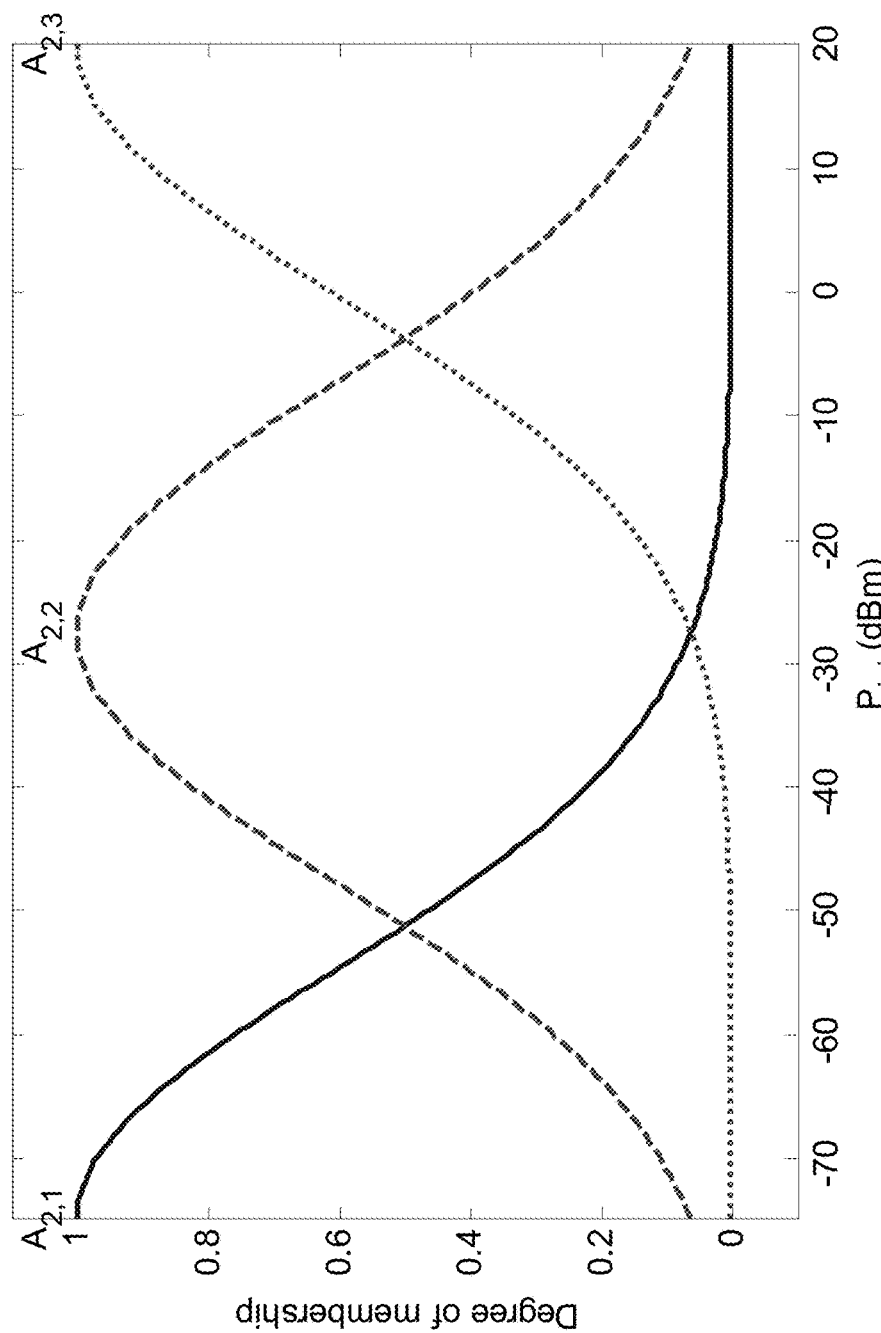
FIG. 14(b) shows the initial transmit power initialization ($P_{ini}$) membership functions of CQIDC unit.
Figure 14C:
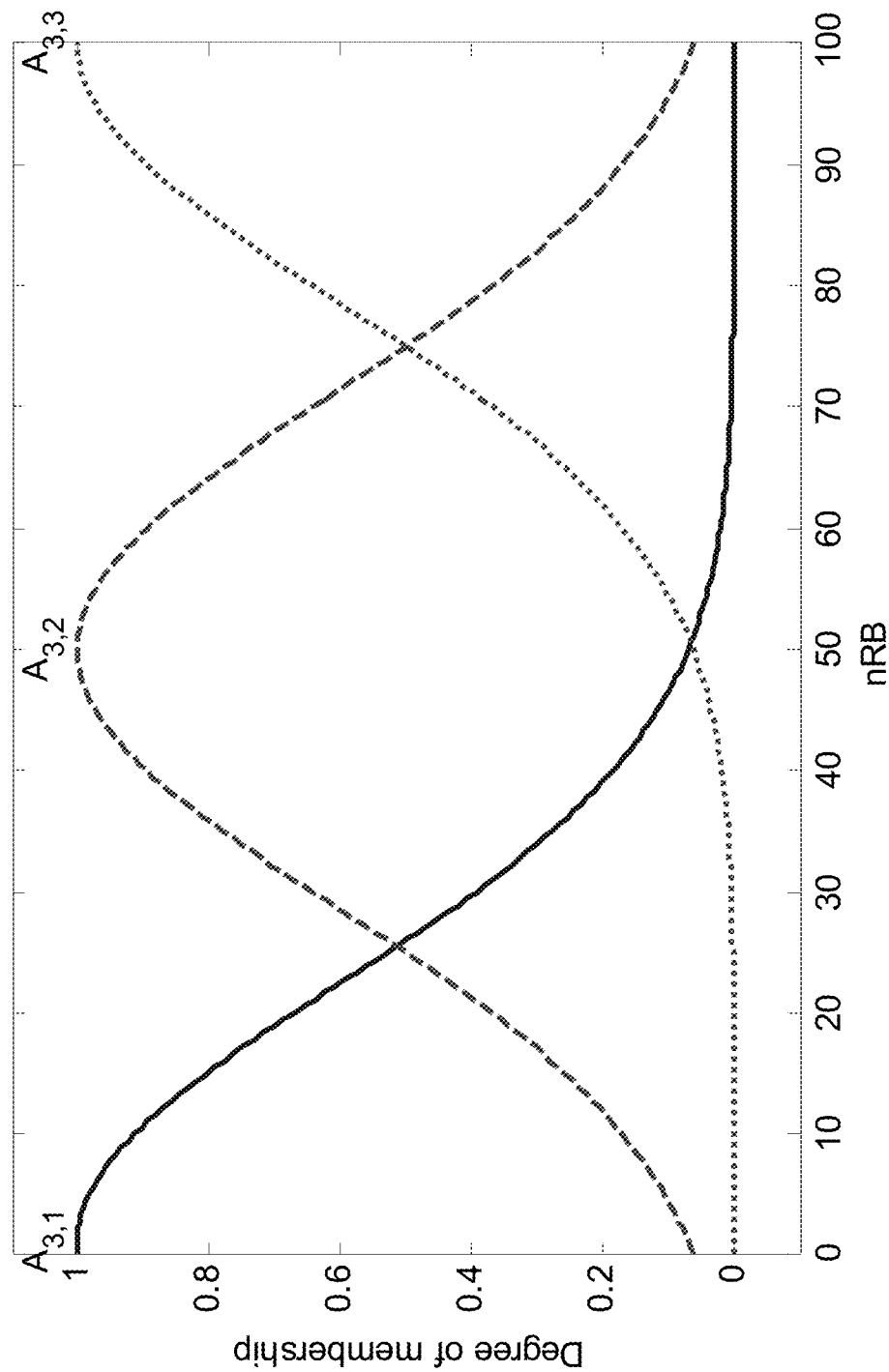
FIG. 14(c) shows the initial number of resource block (nRB) membership functions of CQIDC unit.
Figure 15A:
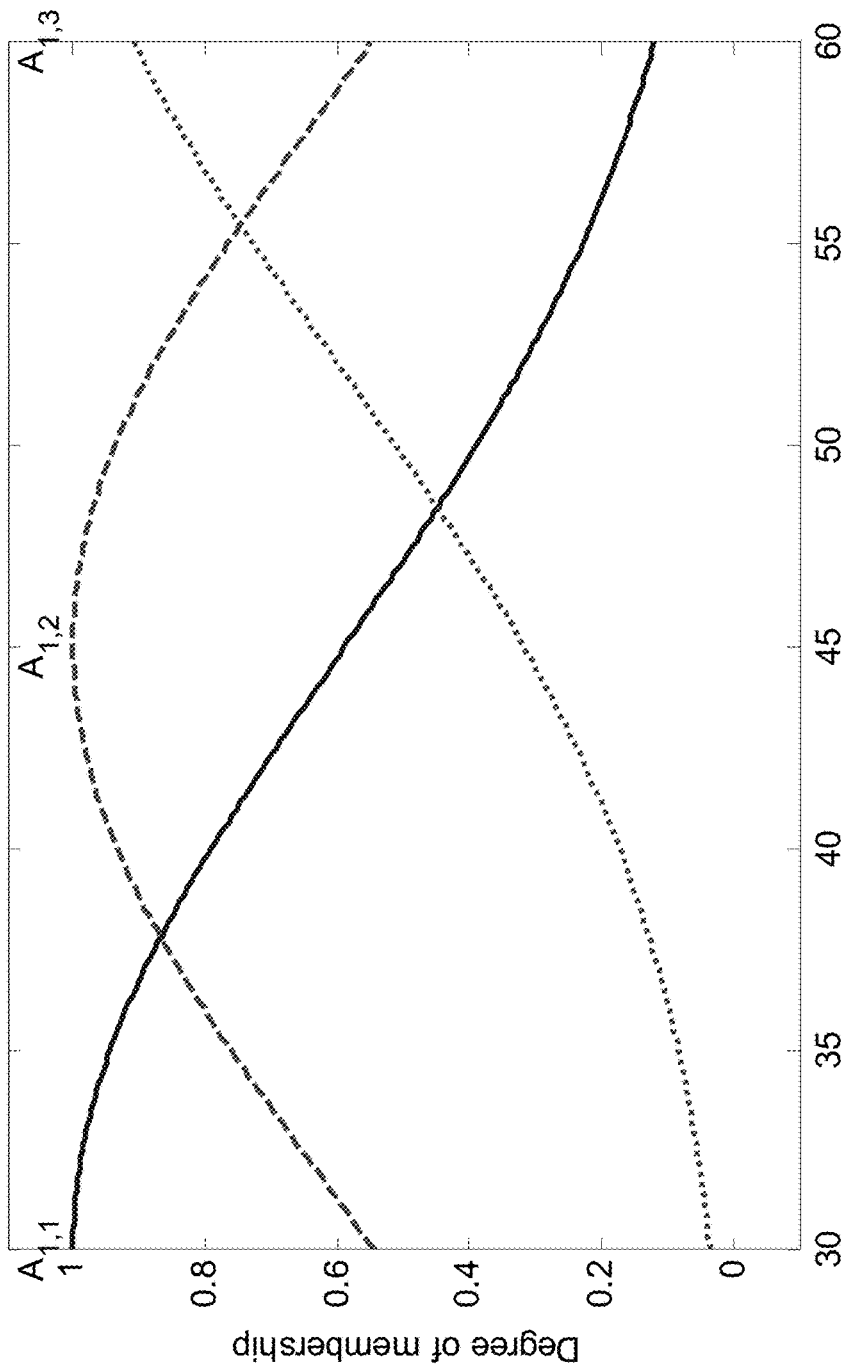
FIG. 15(a) shows the learned average path loss ($\overline{PL}$) membership functions of CQIDC unit.
Figure 15B:
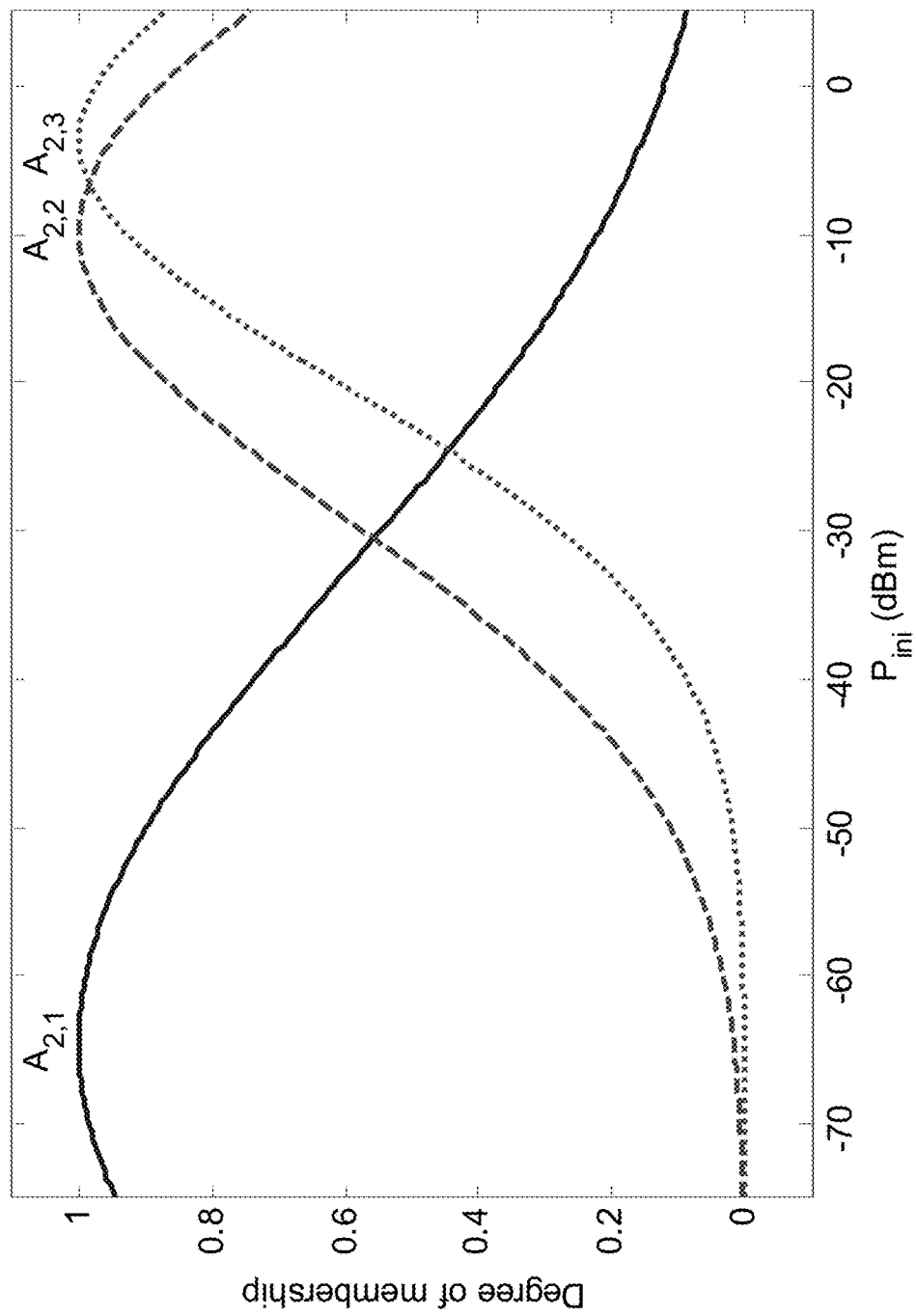
FIG. 15(b) shows the learned transmit power initialization ($P_{ini}$) membership functions of CQIDC unit.
Figure 15C:
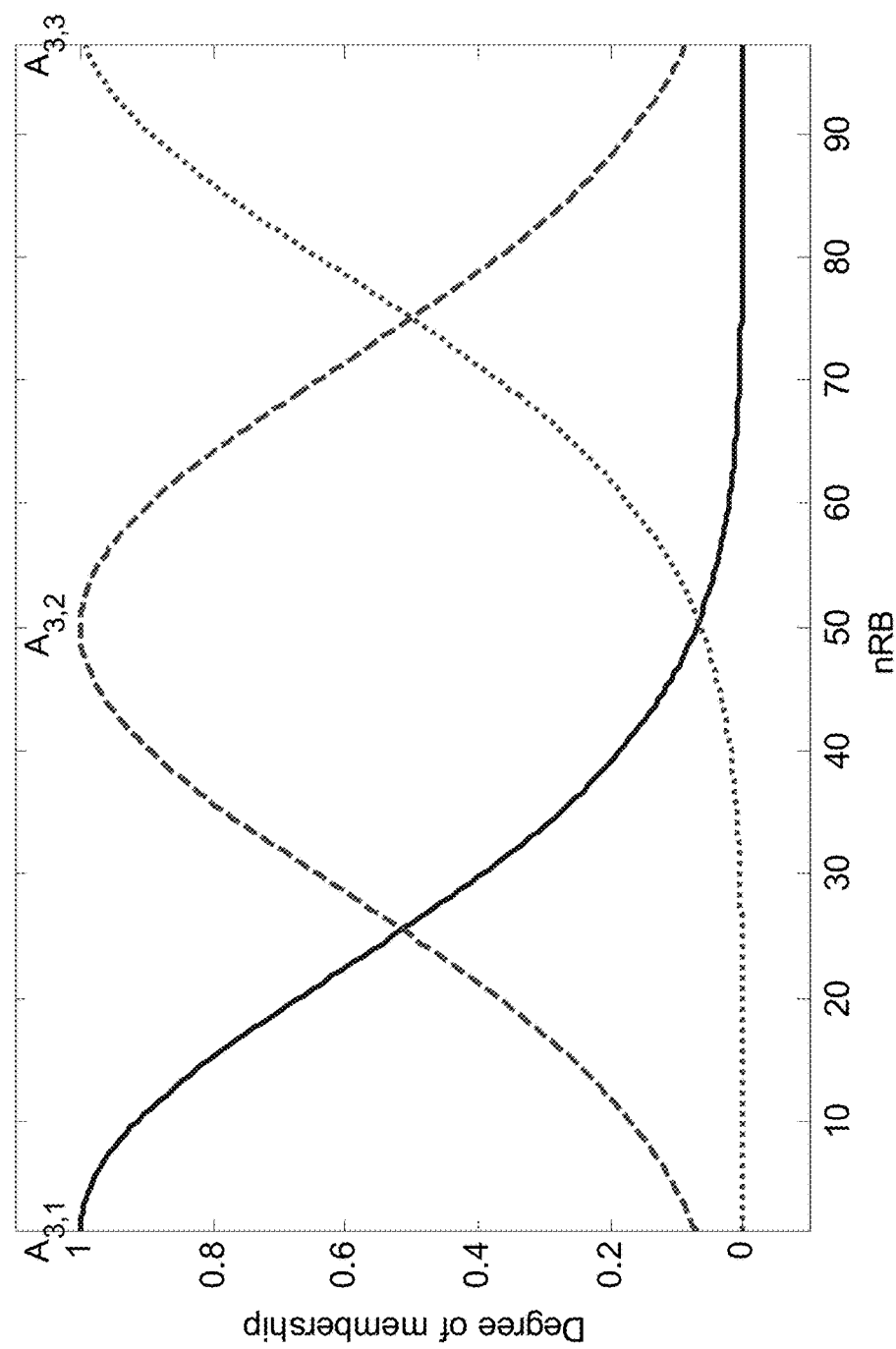
FIG. 15(c) shows the learned number of resource block (nRB) membership functions of CQIDC unit.
Figure 16:
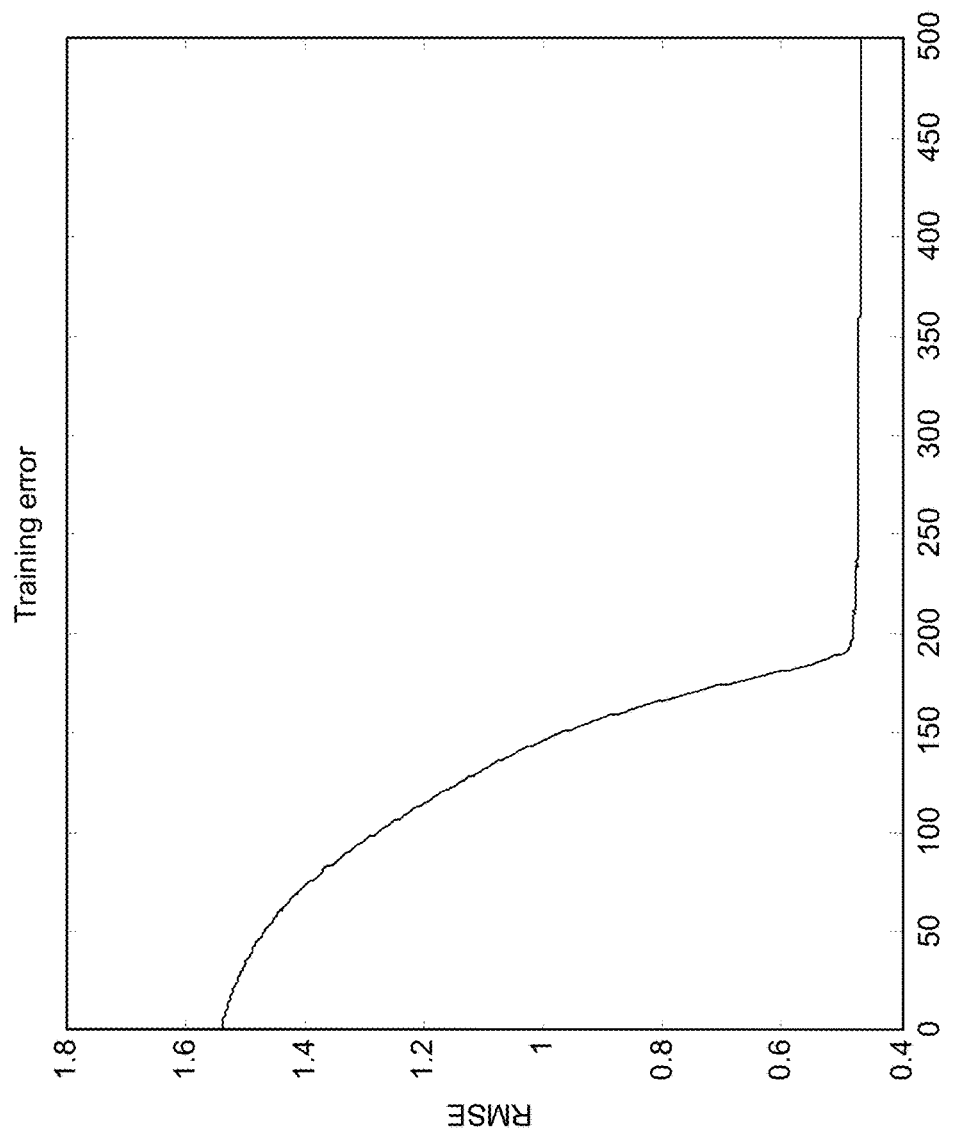
FIG. 16 shows the root mean square error of CQIDC unit.

The premise parameters of three MFs before and after training are shown in FIG. 14 and FIG. 15, respectively. The root mean square error (RMSE) curve of the CQIDC is shown in FIG. 16, which demonstrates that the RMSE converges to 0.46 after 300 epochs.

(E) Self-Optimizing Power Control (SOPC) Unit:

The SOPC consists of three parts, namely the transmit power adjustment estimator (TPAE), transmission power assignment and self-optimization power controller protection mechanism. The TPAE in the interference environment primarily estimates the amount of minimum transmit power adjustment needs for each user; the transmission power for each user is adjusted when the sum of total transmission power to all indoor users doesn't exceed the maximum transmit power limit of the eNB. The protection mechanism of the SOPC is used to prevent the co-channel interference from the moving users of adjacent cells.

The ANFIS based TPAE of the SOPC unit adapts output power adjustment value $\Delta P_u$ at the $u_{th}$ user's location to the changing cell edge CQI ($CQI_{min,u}$) set by user demand, the best CQI ($CQI_{best,u}$) and measured average SINR ($\overline{SINR}_u$), so that the femtocell in the interference environment not only can still meet the demands set by the UE and communication quality, but also self-optimizing the minimum transmit power of eNB, thereby reducing the co-channel interference to the neighboring cells.

For the purpose of satisfying the requirements of BLER≤10% and the SR of 90%, the threshold of the signal to interference plus noise ratio ($SINR_{th,u}$) at the) $u_{th}$ user is defined as $$SINR_{th,u} = \max\{SNR_{th}(CQI_{min,u}) + FM(SR_u), SNR_{th}(CQI_{best,u})\} \text{(dB)} \quad (24)$$

The output power adjustment ($\Delta P_u$) at the $u_{th}$ user is given as $$\Delta P_u = SINR_{th,u} - \overline{SINR}_u \text{(dB)} \quad (25)$$

where $\overline{SINR}_u$ is the measured average SINR at the $u_{th}$ user.

Figure 17:
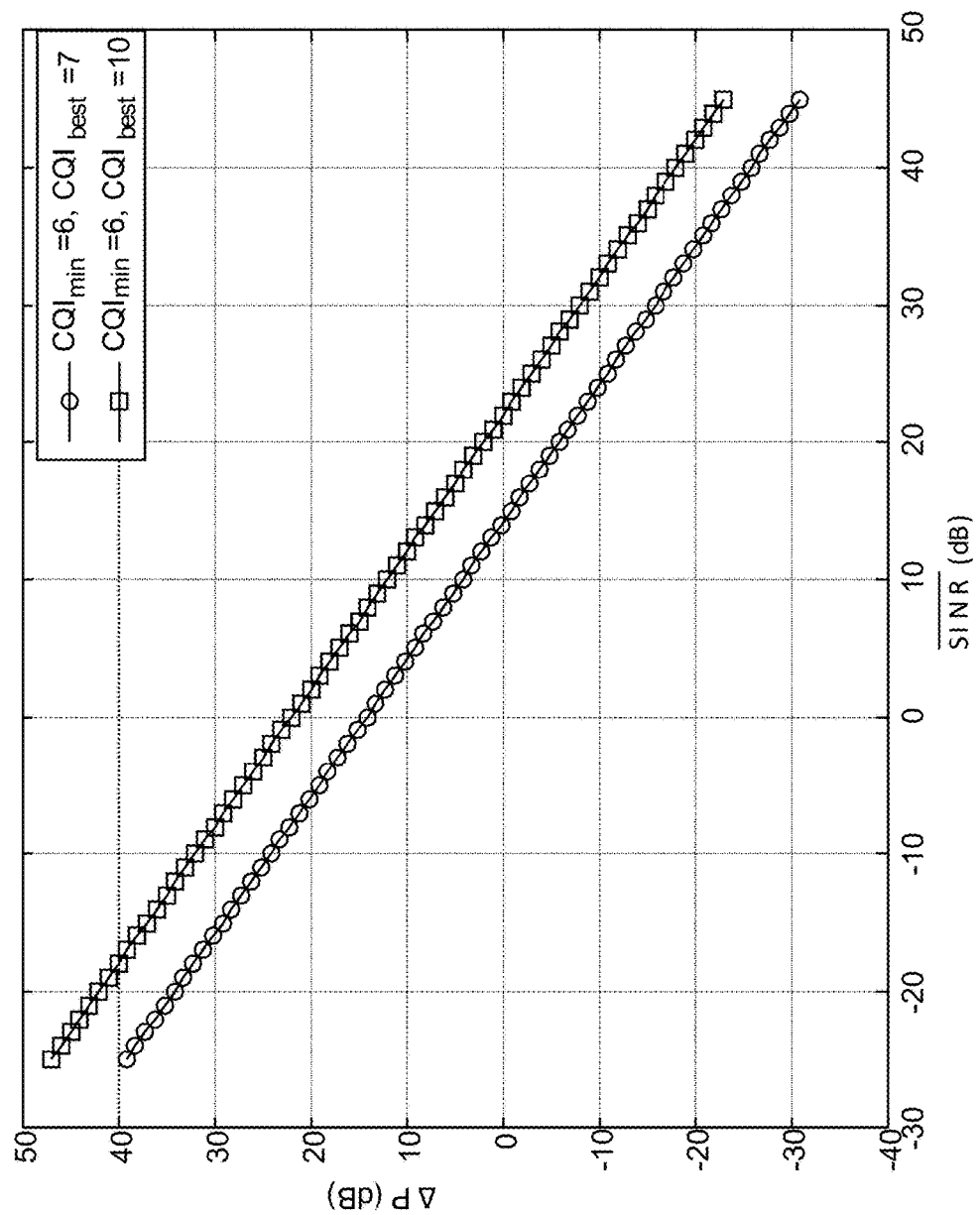
FIG. 17 shows a set of training data for the ANFIS based TPAE in the SOPC unit: The optimum power adjustment corresponding to $CQI_{min}$=6, the best CQI=7, 10, and different average measured SINR.

The training data of ANFIS based TPAE of the SOPC unit is generated from the simulation results of the single input single output (SISO) transceiver BLER, as shown in Table 3. The fundamental specification of the SISO transceiver is listed in Table 2. Integrating Table 2, Table 3 with equations (24) and (25), the adjustment value of the minimum transmit power is calculated for service reliability (90%), cell edge CQI (1~15), measured average SINR (−25 dB~45 dB) and the best CQI (1~15). FIG. 17 shows a set of SOPC training data for the transmit power adjustment estimator corresponding to the different measured average SINR when the service reliability is 90%, cell edge CQI ($CQI_{min,u}$) is 6 for two different best CQI ($CQI_{best,u}$)(7, 10). It is observed that the transmit power adjustment will decreases as the measured average SINR increases in order to achieve the aim of minimum transmit power. For example, the SNR threshold for $CQI_{best,u}=7$ is 13 dB. According to (20), the SINR threshold ($SINR_{th,u}$) is equal to 14.14 dB, which is the sum of SNR threshold (12 dB) corresponding to $CQI_{min,u}=6$ and $FM(SR_u)$(2.14 dB) corresponding to $SR_u=90\%$. The SNR threshold for $CQI_{bes,u}=10$ is 22 dB, which is greater than 14.14 dB. Thus, the SINR threshold ($SINR_{th,u}$) is equal to 22 dB for $CQI_{best,u}=10$. FIG. 13 shows $\Delta P_u=0$ dB when the measured average SINR is 14.14 dB and 22 dB corresponding to $CQI_{best,u}=7$ and 10, respectively.

The function of ANFIS based TPAE of the SOPC unit is to determine the minimum transmit power of the femtocell eNB, which satisfies the receiver performance of BLER≤0.1 in the interference environments. Each input uses three generalized bell shape MFs, which are defined in (1). The 27 fuzzy inference rules are constructed in Table 6. Optimization problem of the minimum transmit power of the ANFIS based TPAE in the SOPC unit is formally formulated as follows:

$$\text{In the interference environment, } BLER \leq 0.1, \quad (26)$$

optimize $\Delta P_u = f(\vec{x})$ at the $u_{th}$ user, $f(\vec{x})$ is the objective function $\vec{x} \in \{CQI_{min,u}, CQI_{best,u} \text{ and } \overline{SINR}_u\}$ $1 \leq CQI_{min,u} \leq 15$ $1 \leq CQI_{best,u} \leq 15$ $-25 \text{ dB} \leq \overline{SINR}_u \leq 45 \text{ dB}$ $\sum_{u}^{nUE} P_u + \Delta P_u \in \{\leq 20 \text{ dBm}\},$ $P_u$ is the last transmit power (dBm)

Figure 18A:
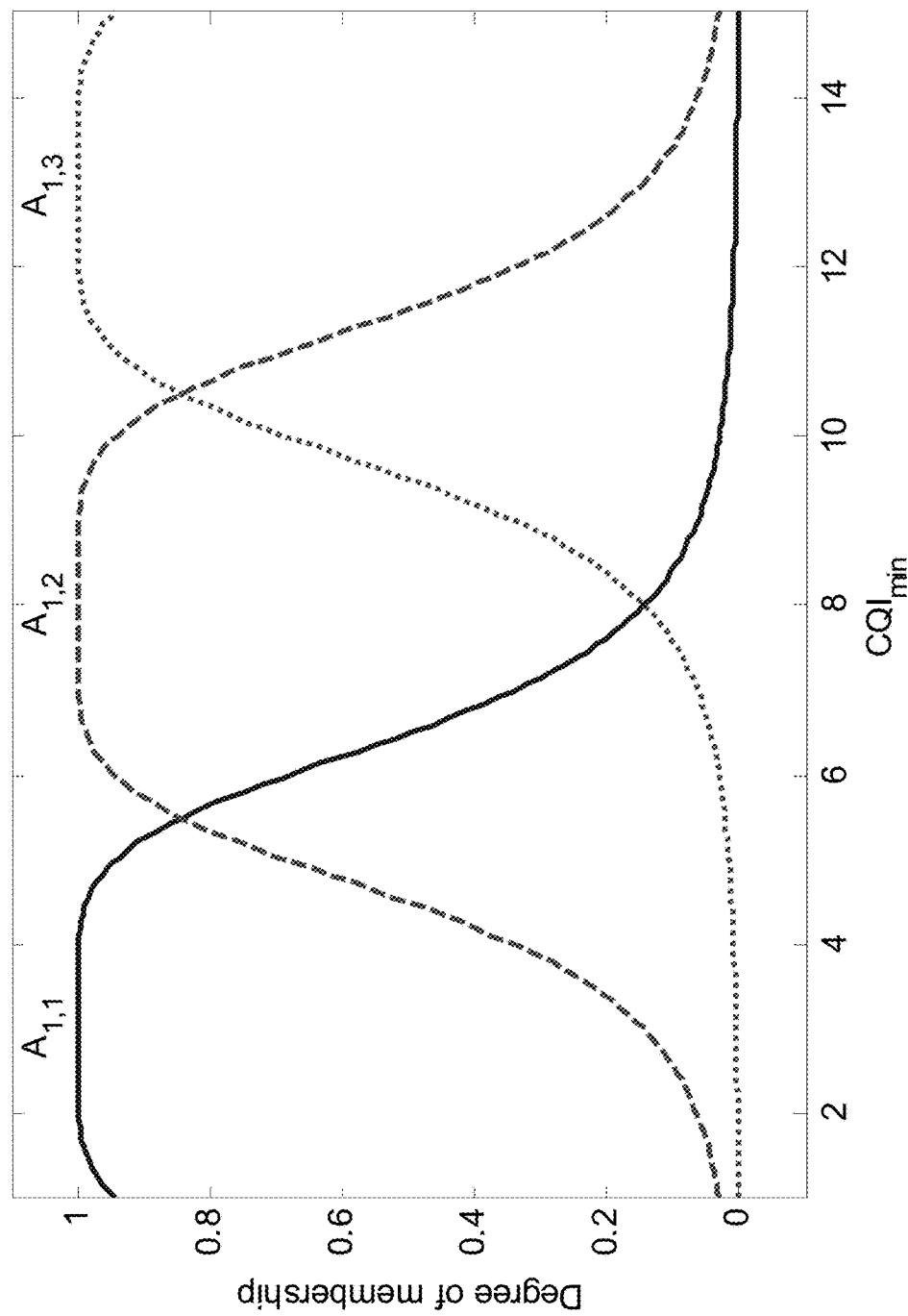
FIG. 18(a) shows the initial cell edge CQI ($CQI_{min}$) membership functions of the ANFIS based TPAE in the SOPC unit.
Figure 18B:
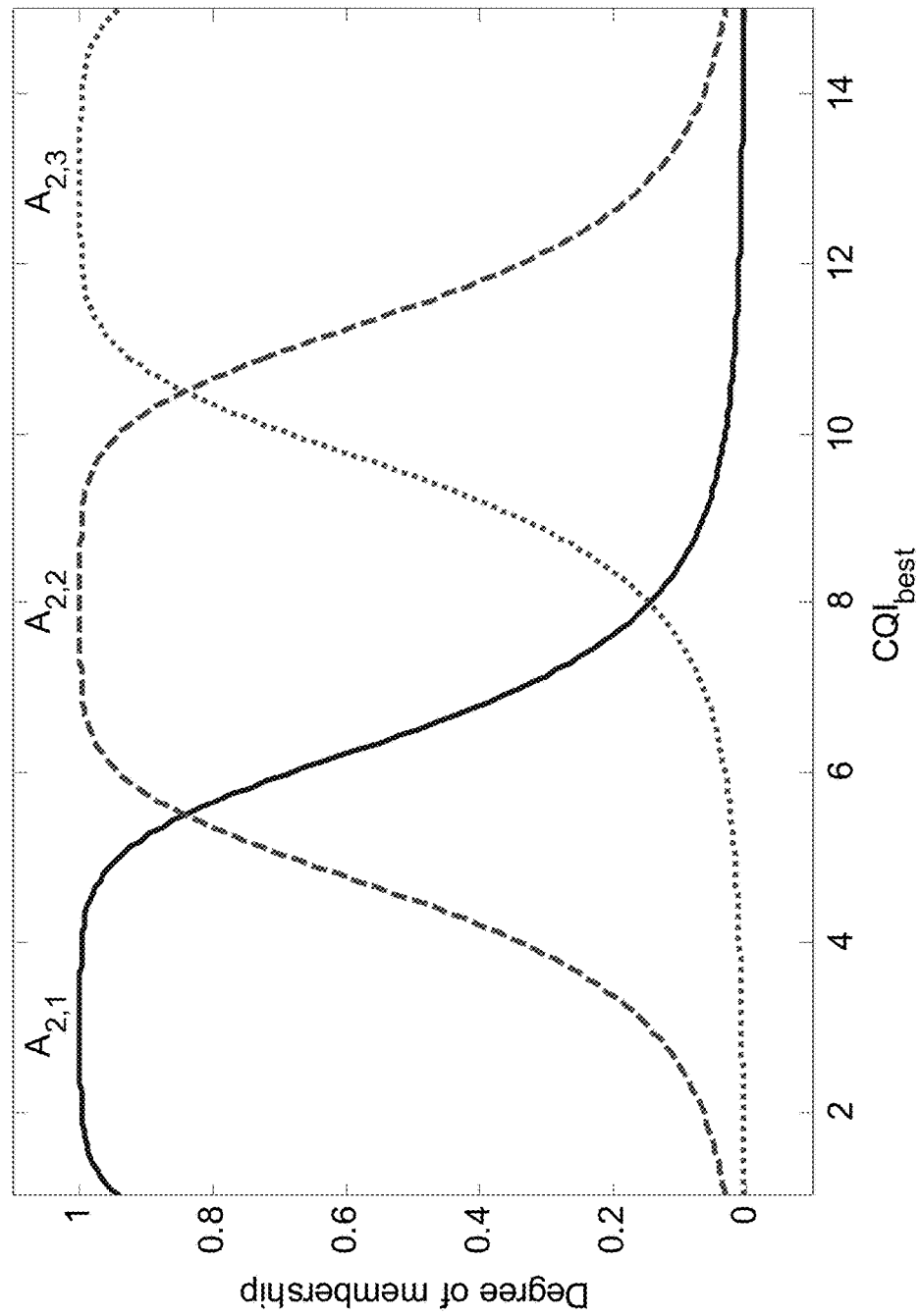
FIG. 18(b) shows the initial best CQI ($CQI_{best}$) membership functions of the ANFIS based TPAE in the SOPC unit.
Figure 18C:
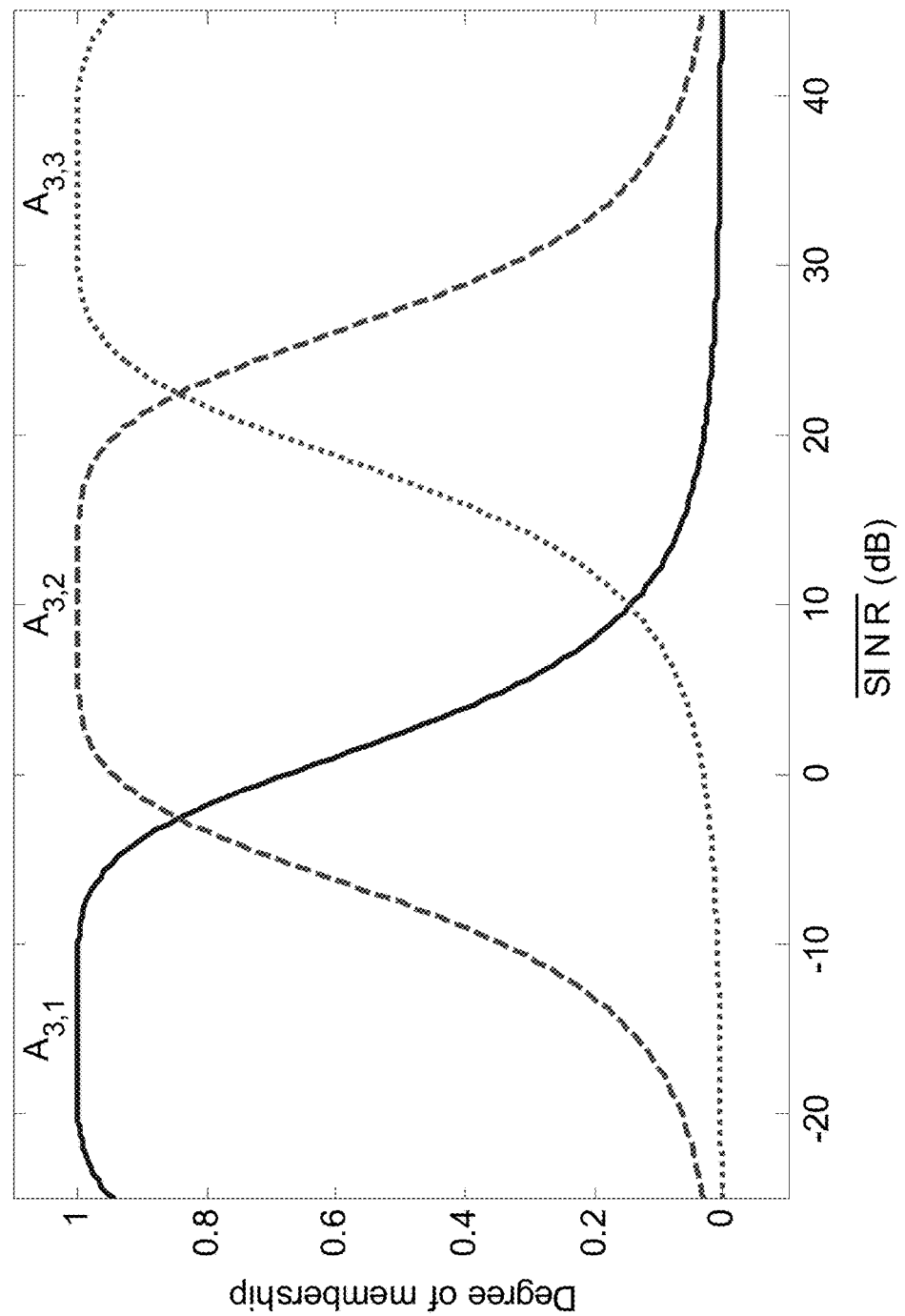
FIG. 18(c) shows the initial measured average SINR ($\overline{SINR}$) membership functions of the ANFIS based TPAE in the SOPC unit.
Figure 19A:
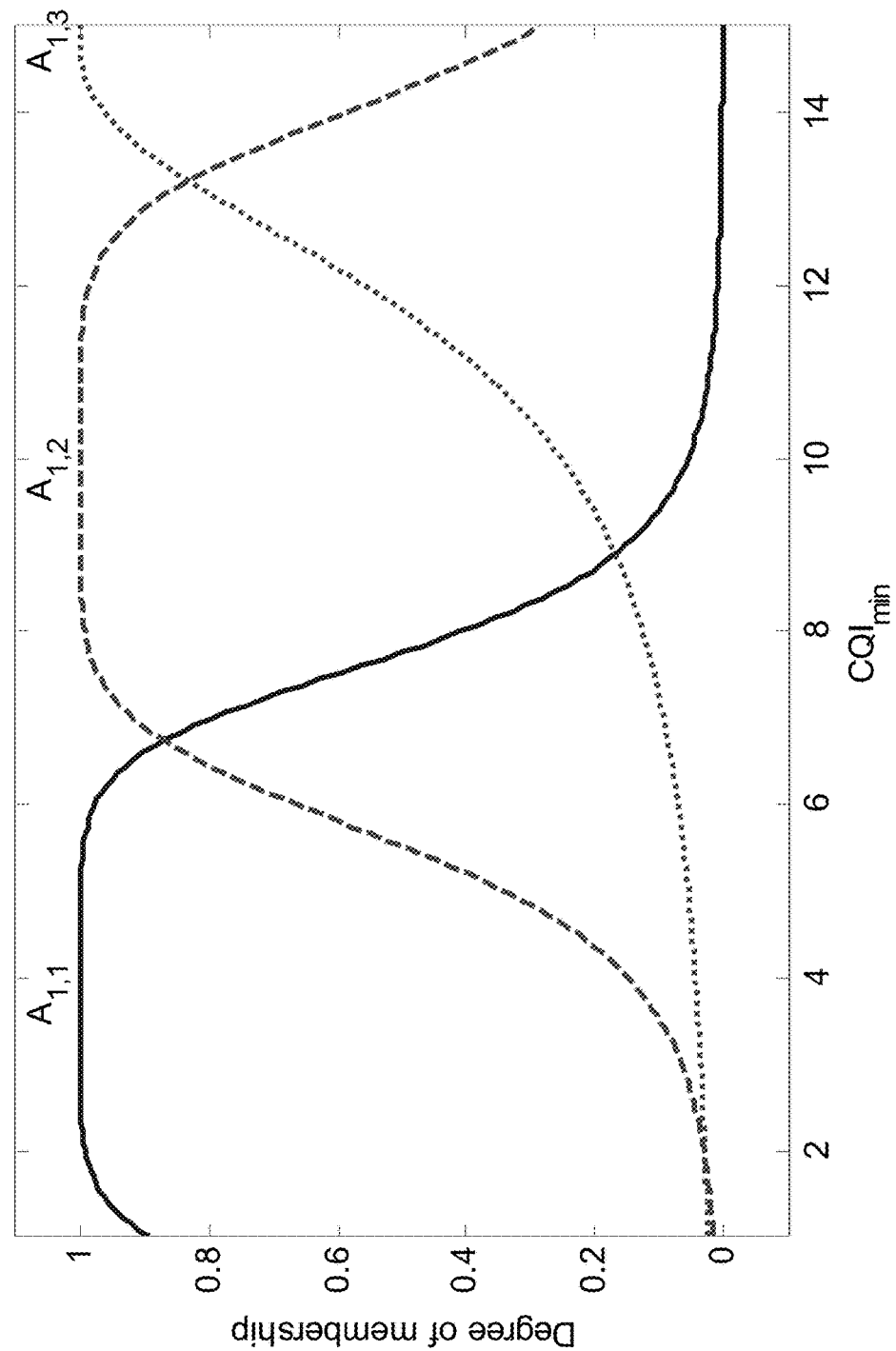
FIG. 19(a) shows the learned cell edge CQI ($CQI_{min}$) membership functions of the ANFIS based TPAE in the SOPC unit.
Figure 19B:
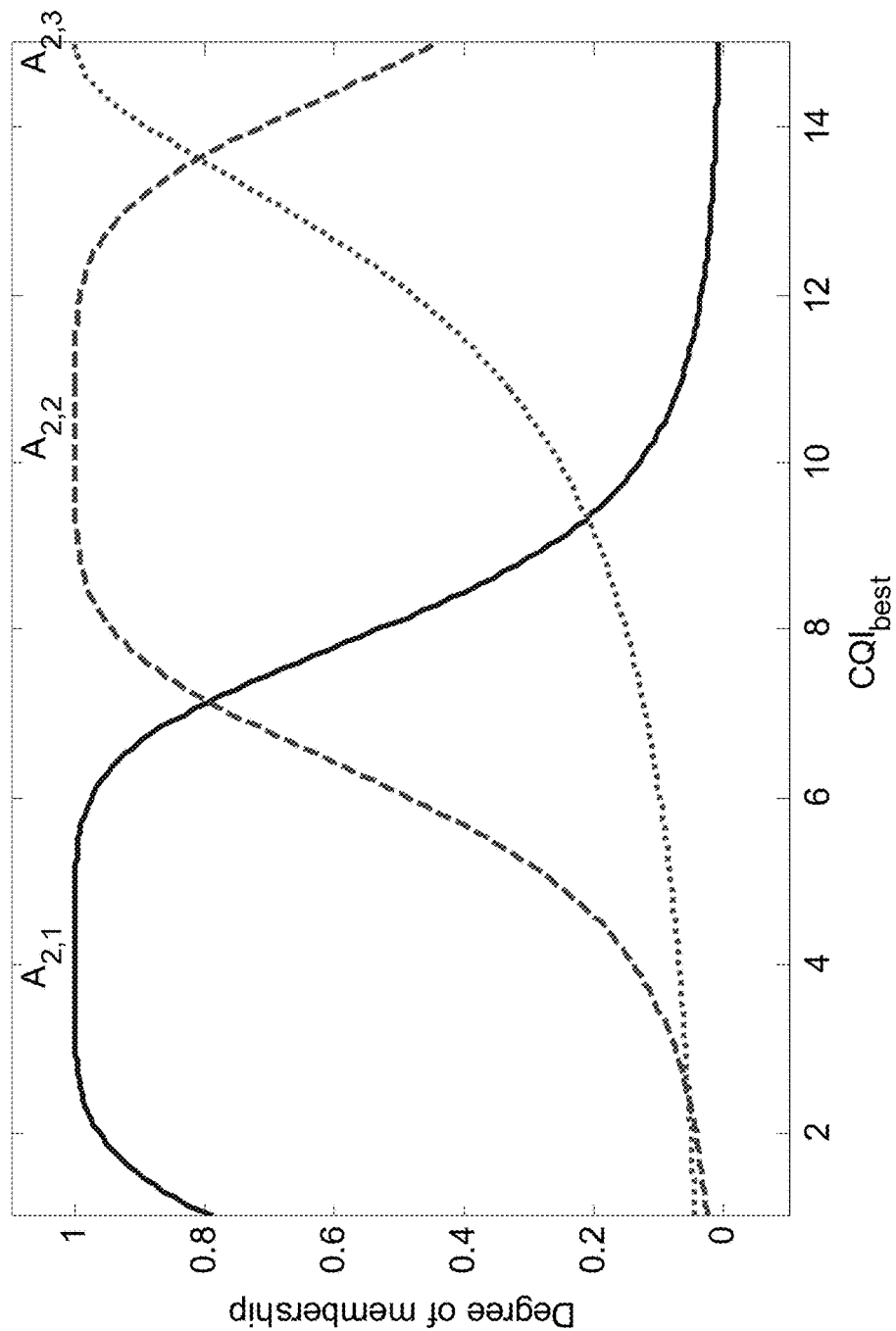
FIG. 19(b) shows the learned best CQI ($CQI_{best}$) membership functions of power increment estimator unit.
Figure 19C:
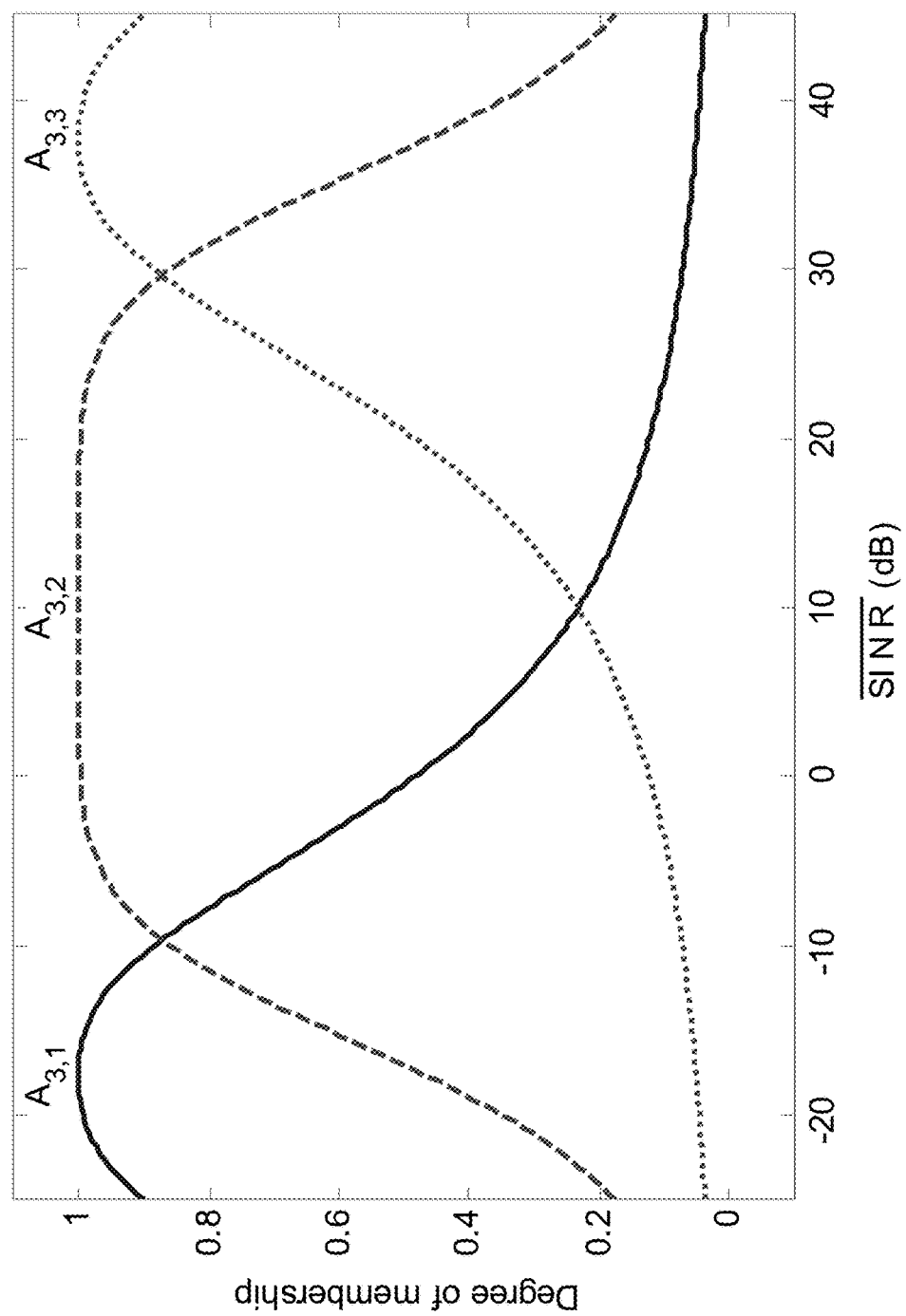
FIG. 19(c) shows the learned measured average SINR ($\overline{SINR}$) membership functions of the ANFIS based TPAE in the SOPC unit.
Figure 20:
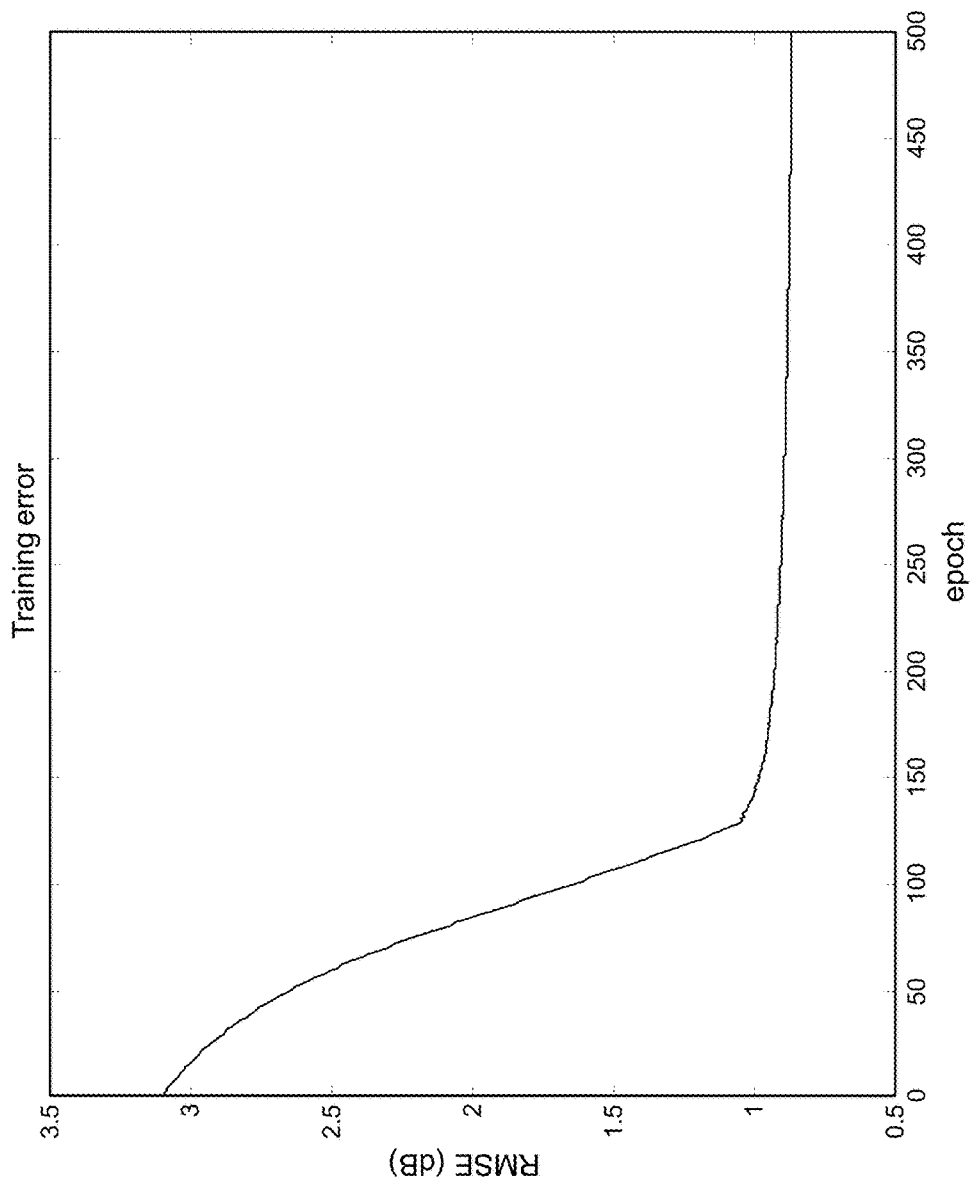
FIG. 20 illustrates the root mean square error of the ANFIS based TPAE in the SOPC unit.

The premise parameters of three MFs before and after training are shown in FIG. 18 and FIG. 19, respectively. The root mean square error (RMSE) curve of the TPAE is shown in FIG. 20, which demonstrates that the RMSE converges to 0.86 dB after 300 epochs.

Power Assignment Algorithm

Figure 21:
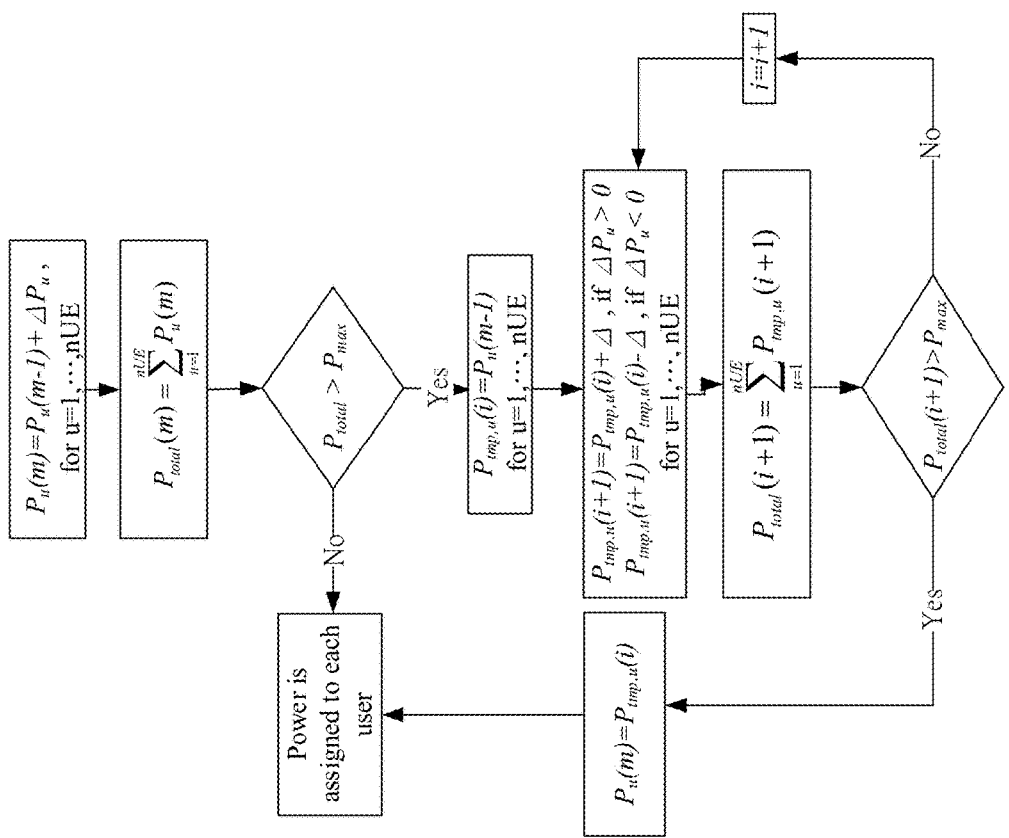
FIG. 21 shows the flow chart of power allocation algorithm.

For the purpose of controlling the sum of individual transmission power to all indoor users less than the maximum transmit power limit of the indoor small cell eNB, a power assignment algorithm is proposed in FIG. 21. First, the previous transmit power $P_u(m-1)$ of the $u_{th}$ user is compensated with the amount $\Delta P_u$ estimated by TPAE, and the sum of individual transmission power to all indoor users is calculated. Then the total transmitting power $P_{total}(m)$ at the $m_{th}$ time instant is compared with the maximum transmission power $P_{max}$ of the indoor small cell eNB. If the total transmitting power $P_{total}(m)$ at the $m_{th}$ time instant is less than $P_{max}$, the power $P_u(m)$ of the $u_{th}$ user is assigned for each user at the $m_{th}$ time instant.

If the total transmitting power $P_{total}(m)$ at the $m_{th}$ time instant is greater than $P_{max}$, then the feedback loop of the step power adjustment is performed, wherein the previous transmit power $P_u(m-1)$ of the $u_t$ user at the $(m-1)_{th}$ time instant is temporarily stored in $P_{tmp,u}(i)$ for u=1, 2 . . . nUE. In the feedback loop of the step power adjustment, $P_{tmp,u}(i)$ will be decreased by $\Delta$ when $\Delta P_u>0$; $P_{tmp,u}(i)$ will be increased by $\Delta$ when $\Delta P_u<0$ and $\Delta$ is assumed to be ±0.1 dB. After each step power adjustment loop, the sum of $P_{tmp,u}(i+1)$ at the $(i+1)_{th}$ loop for all users is compared the maximum transmission power $P_{max}$ of the indoor small cell eNB. If the total transmitting power $P_{total}(i+1)$ at the $(i+1)_{th}$ loop is greater than $P_{max}$, the transmit power $P_u(m)$ is equal to $P_{tmp,u}(i)$ at the $i_{th}$ loop and assigned to the $u_{th}$ user at the $m_{th}$ time instant. If the total transmitting power $P_{total}(i+1)$ at the $(i+1)_{th}$ loop is less than $P_{max}$, i is increased by one and feedback to the loop of the step power adjustment.

(F) Protection Mechanism of the SOPC:

The protection mechanism of the SOPC is included in the IDCC device to prevent the co-channel interference from the moving users of adjacent cells. The SODCC device inputs the average path loss measured from the UE, and then by the indoor path loss model of (16) to estimate the distance (d) between the UE and the eNB (base station). If the moving UE is inside the coverage range of the radius (R), then the SOPC unit is initiated to transmit the minimum power to the moving UE of the adjacent cells. Otherwise, he SOPC unit is disabled to the moving UE of the adjacent cells.

Figure 22:
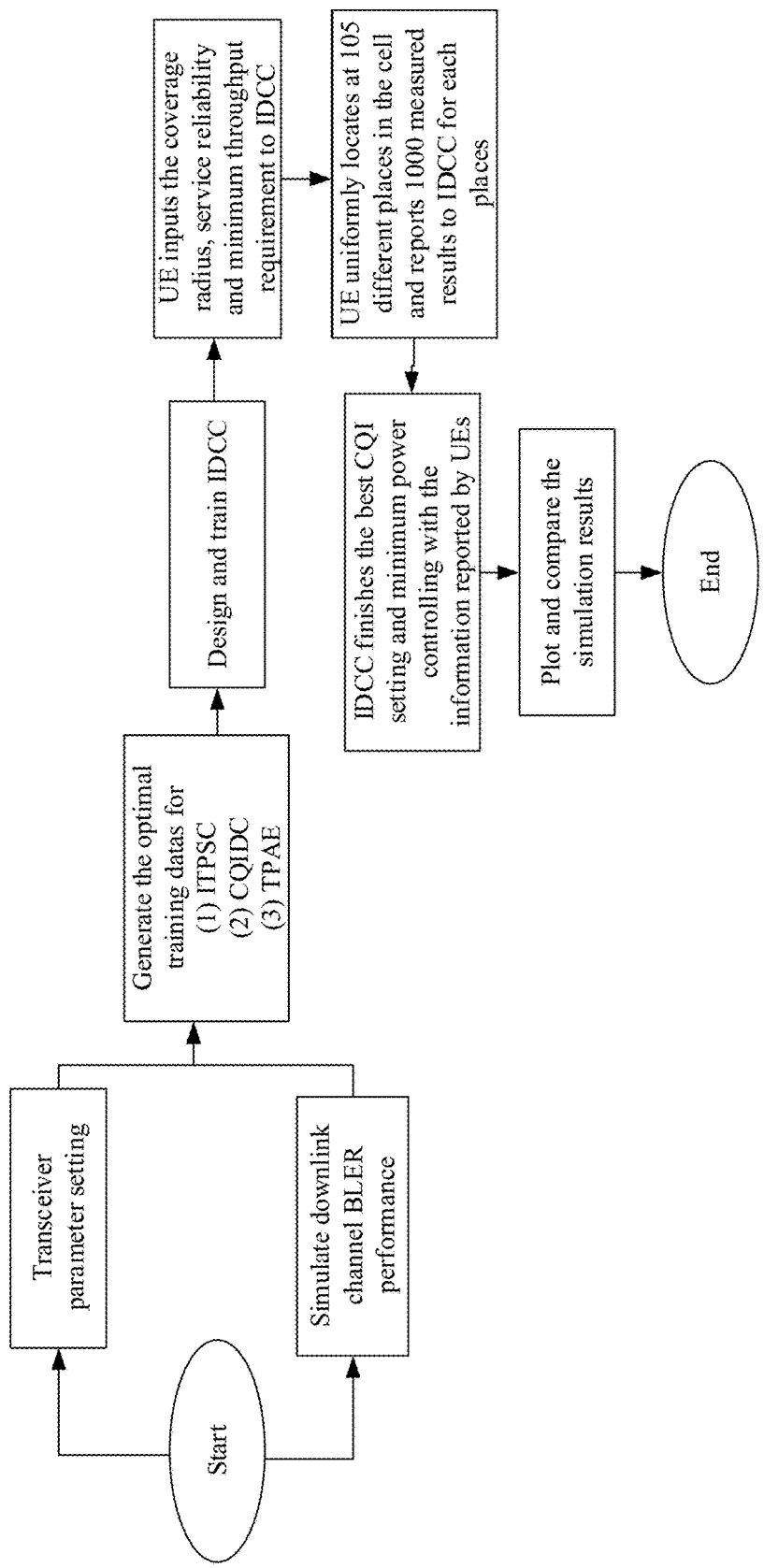
FIG. 22 shows the simulation flow chart of IDCC.

(G) Experimental Results:

FIG. 22 shows the simulation procedure to verify the service reliability. In the experiment, the SINR are measured at uniformly distributed UE positions in an indoor office with coverage radius R. The SINR are measured 1000 times at each UE position. The total number of measurements is defined as:

$$m_R = \sum_{r=1}^{R} 7r \times 1000 \quad (27)$$

On the circumference of radius r=1 meter, the SINRs are measured at 7 uniformly distributed positions; on the circumference of the radius r=2, 3, 4, 5 meters, the corresponding uniformly distributed positions are 14, 21, 28, 35, respectively. When the coverage range of indoor office is set as 5 meters, the total number of positions to measure the SINR in an indoor office is 105. The total number of measurement positions increases with the coverage range of femtocell in the indoor office.

The complementary cumulative distribution function (CCDF) of the measured SINR can be expressed as $$F(SINR_{th}) = P(\text{measured } SINR > SINR_{th}) \quad (28)$$

The CCDF has the same meaning with the system reliability, which is defined as the percentage of the UE locations within a eNB coverage area of radius R for which the measured SINR exceeds a given $SINR_{th}$. FIG. 18 shows the CCDF of the measured SINR for coverage radius of 5 meter, (90%) and three different cell edge CQIs 3, 7 and 10 corresponding to the minimum throughput requirements of three users UE1, UE2 and UE3, 2.76 Mbps, 7.44 Mbps and 7.44 Mbps, respectively, in the interference free environments.

Figure 23A:
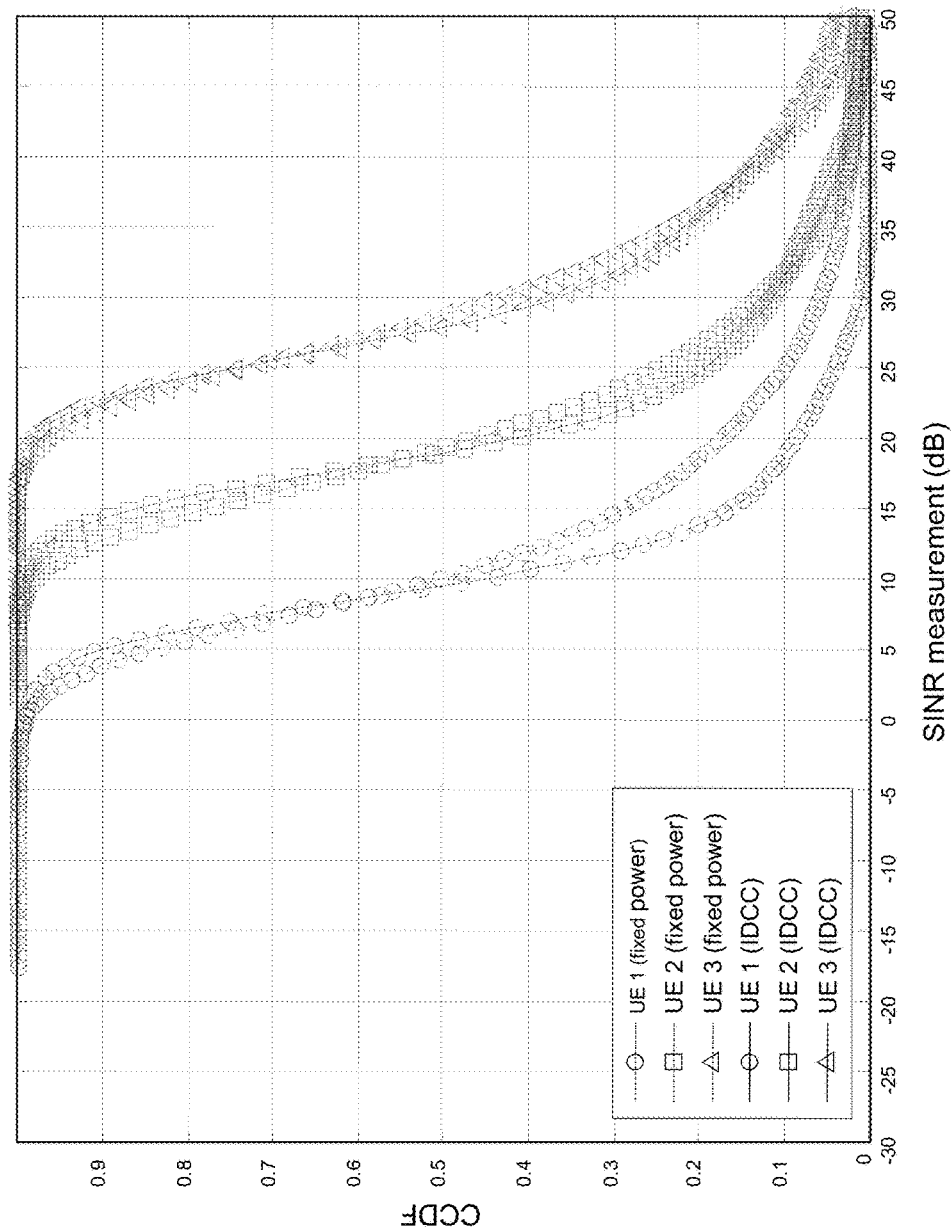
FIG. 23(a) shows the CCDF of SINR measurement for different UEs using fixed power and the IDCC in interference free environment.
Figure 23B:
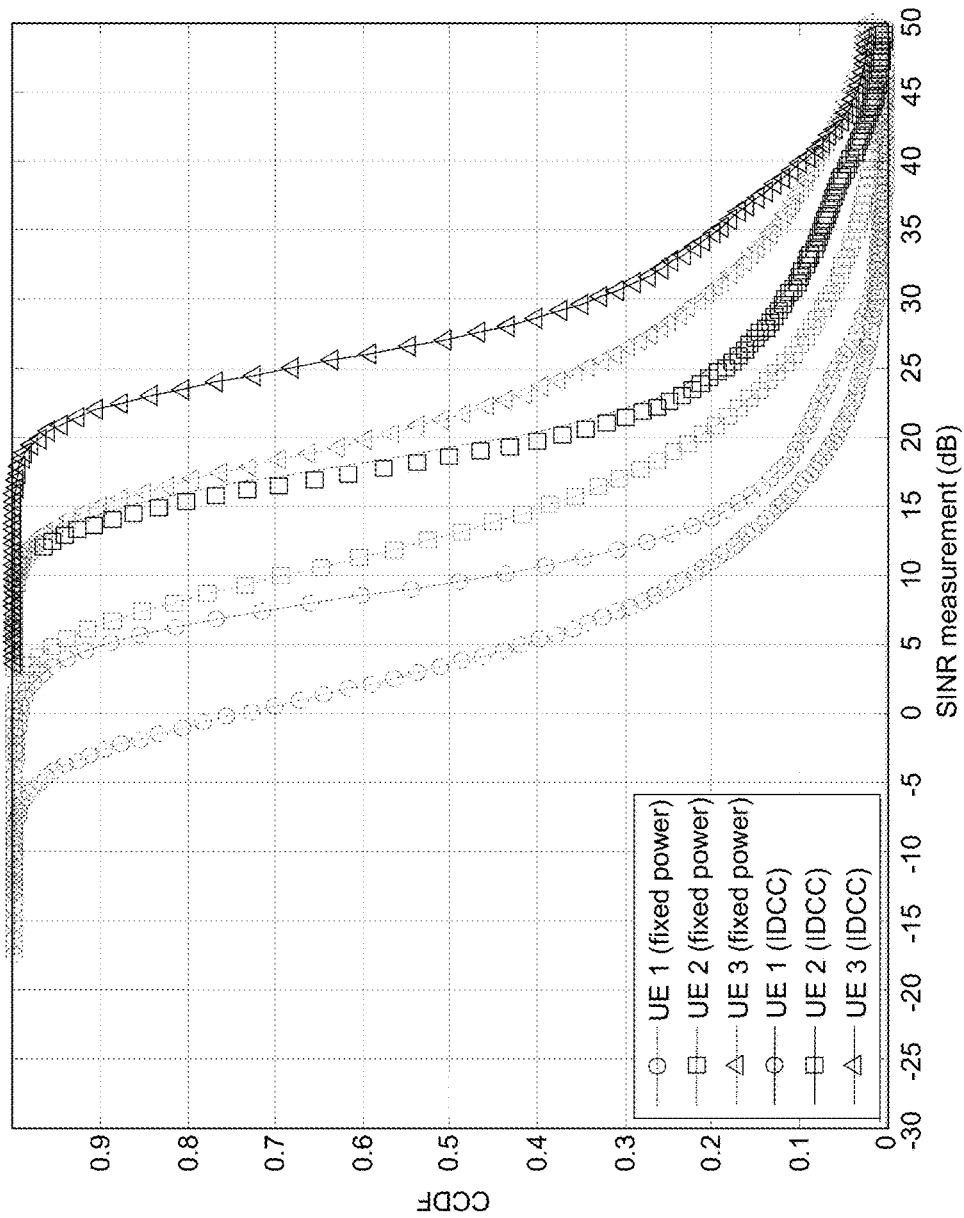
FIG. 23(b) shows the CCDF of SINR measurement for different UEs using fixed power and the IDCC in interference power=−90 dbm environment.
Figure 23C:
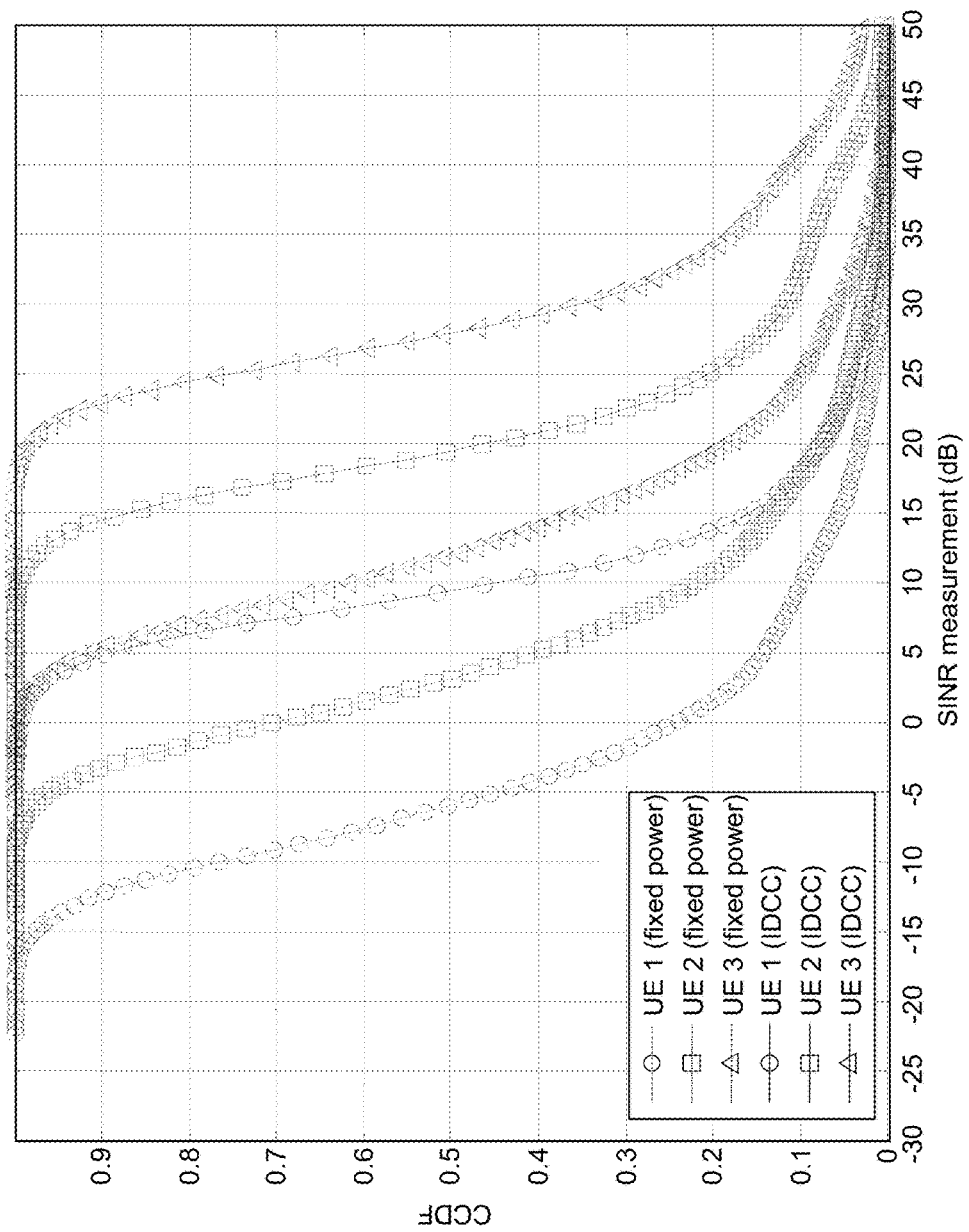
FIG. 23(c) shows the CCDF of SINR measurement for different UEs using fixed power and the IDCC in interference power=−80 dbm environment.
Figure 24A:
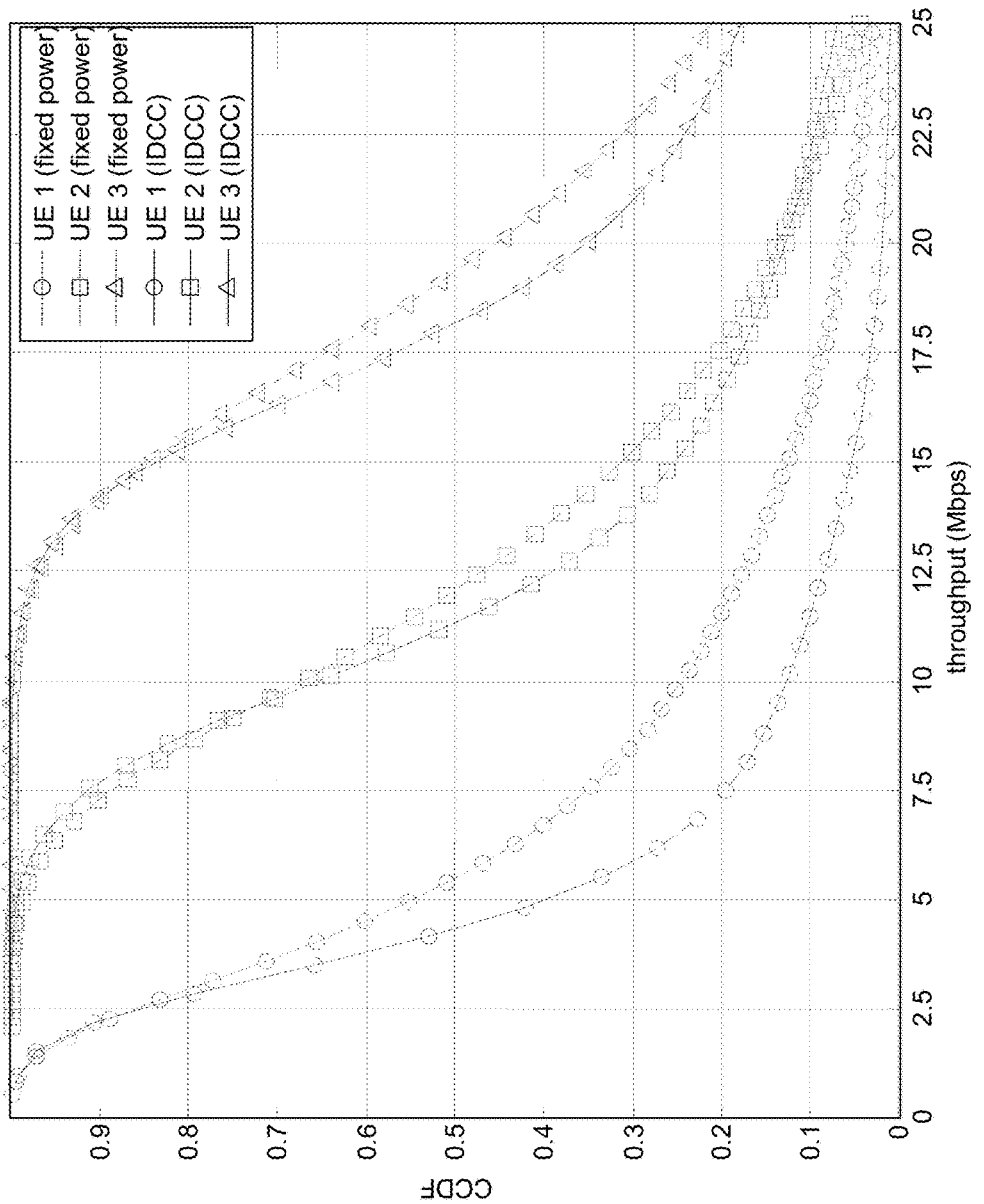
FIG. 24(a) shows the CCDF of throughput for different UEs using fixed power and the IDCC in interference free environment.
Figure 24B:
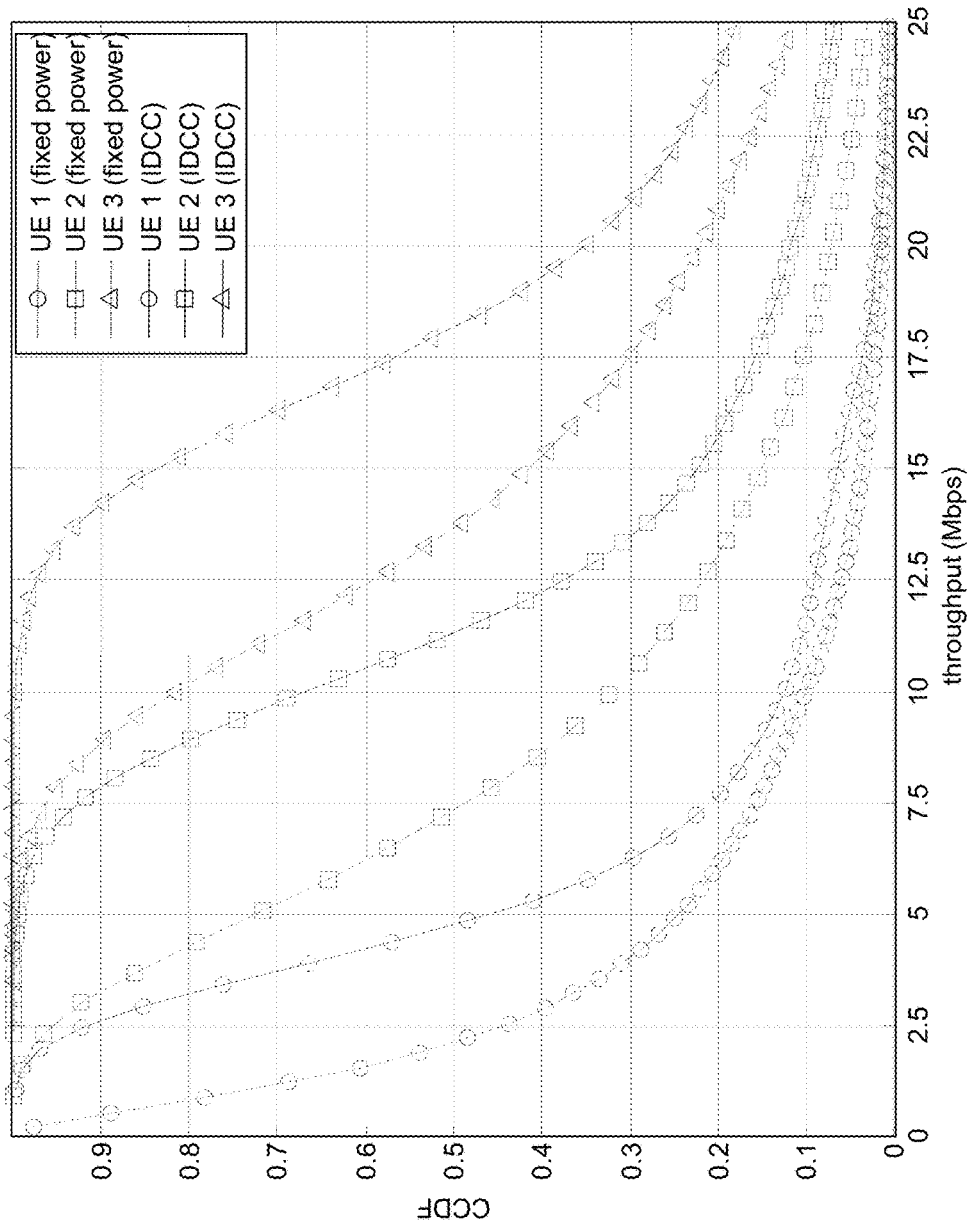
FIG. 24(b) shows the CCDF of throughput for different UEs using fixed power and the IDCC in interference power=−90 dbm environment.
Figure 24:
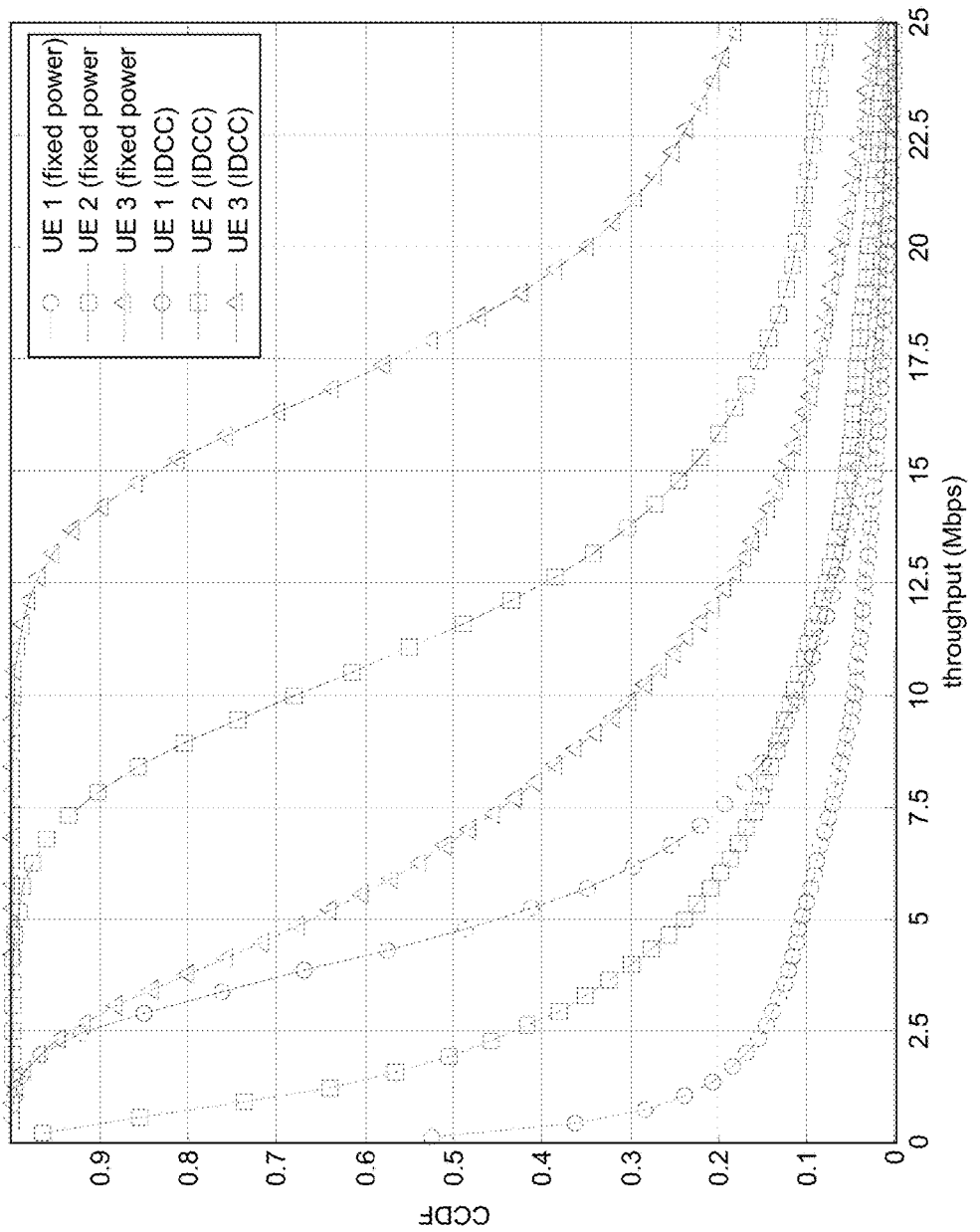
FIG. 24(c) shows the CCDF of throughput for different UEs using fixed power and the IDCC in interference power=−80 dbm environment.

The SINR service reliabilities of the SOPC for coverage radius of 5 meter, service reliability 90% and different cell edge CQI $CQI_{min}$=3, 7, 10 in the interference environments are also verified with FIG. 23(a), (b), (c) for interference power-100 dBm, −90 dBm and −80 dBm, respectively, where the solid curves denote for combining ITPSC and SOPC and the dot curves denote for using the ITSPC only. By means of Table 3, it can be found that the $SINR_{th}$ values corresponding to cell edge CQI 3, 7, and 10 are 5 dB, 13 dB, and 22 dB, respectively. The throughput service reliabilities for coverage radius of 5 meter and different cell edge CQI $CQI_{min}$=3, 7, 10 in the interference environments are also verified with FIG. 24(a), (b), (c) for interference power −100 dBm, −90 dBm and −80 dBm, respectively, where the solid curves denote for combining ITPSC and SOPC and the dot curves denote for using the ITSPC only. Then (7) is used to calculate the throughputs of UE1, UE2 and UE3, which are 2.76 Mbps, 7.44 Mbps and 14.13 Mbps corresponding to cell edge CQI 3, 7, and 10, respectively. For example, as shown in FIGS. 23(a), (c) and 24(a), (c), both the CCDF of the measured SINR in 22 dB and the CCDF of the throughput in 21.4 Mbps are about 91% when the interference power is small (−100 dBm) for both cases of combining ITPSC and SOPC method and using the ITPSC only. Increasing the interference power to −80 dBm, for example, when using the ITPSC only, the CCDF of the measured SINR value in 22 dB and the CCDF of the throughput in 14.13 Mbps for UE3 is dropped to about 15%, while the SOPC is still able to maintain about 89%. With the increase of interference power, it is observed that using the ITPSC only is unable to maintain the service reliability requirements set by the user, but using the SOPC is still able to maintain the requested service reliability.

Figure 25:
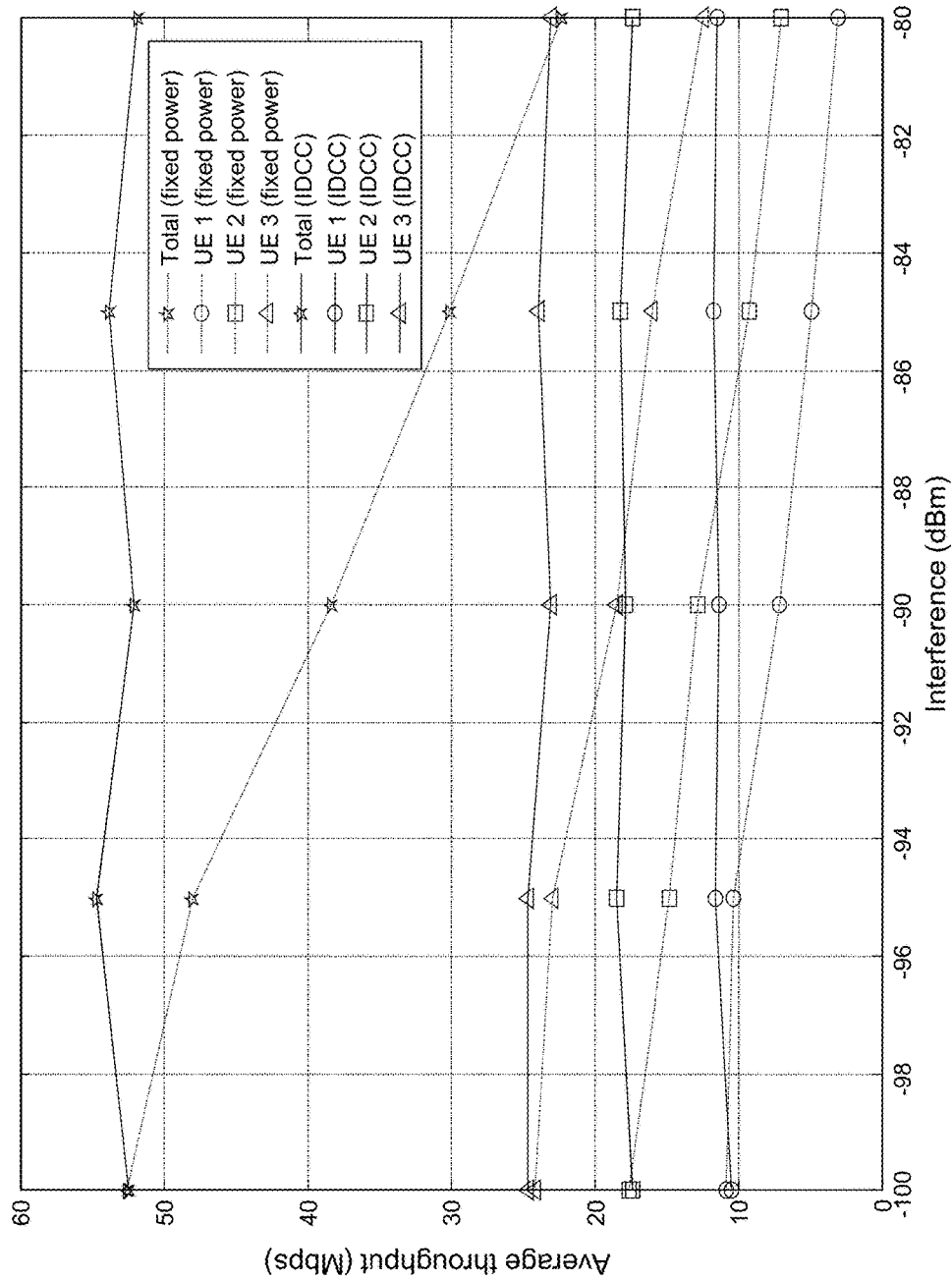
FIG. 25 shows the average throughput of DL transceiver for different UEs using fixed power and the IDCC in the MU interference environment.
Figure 26:
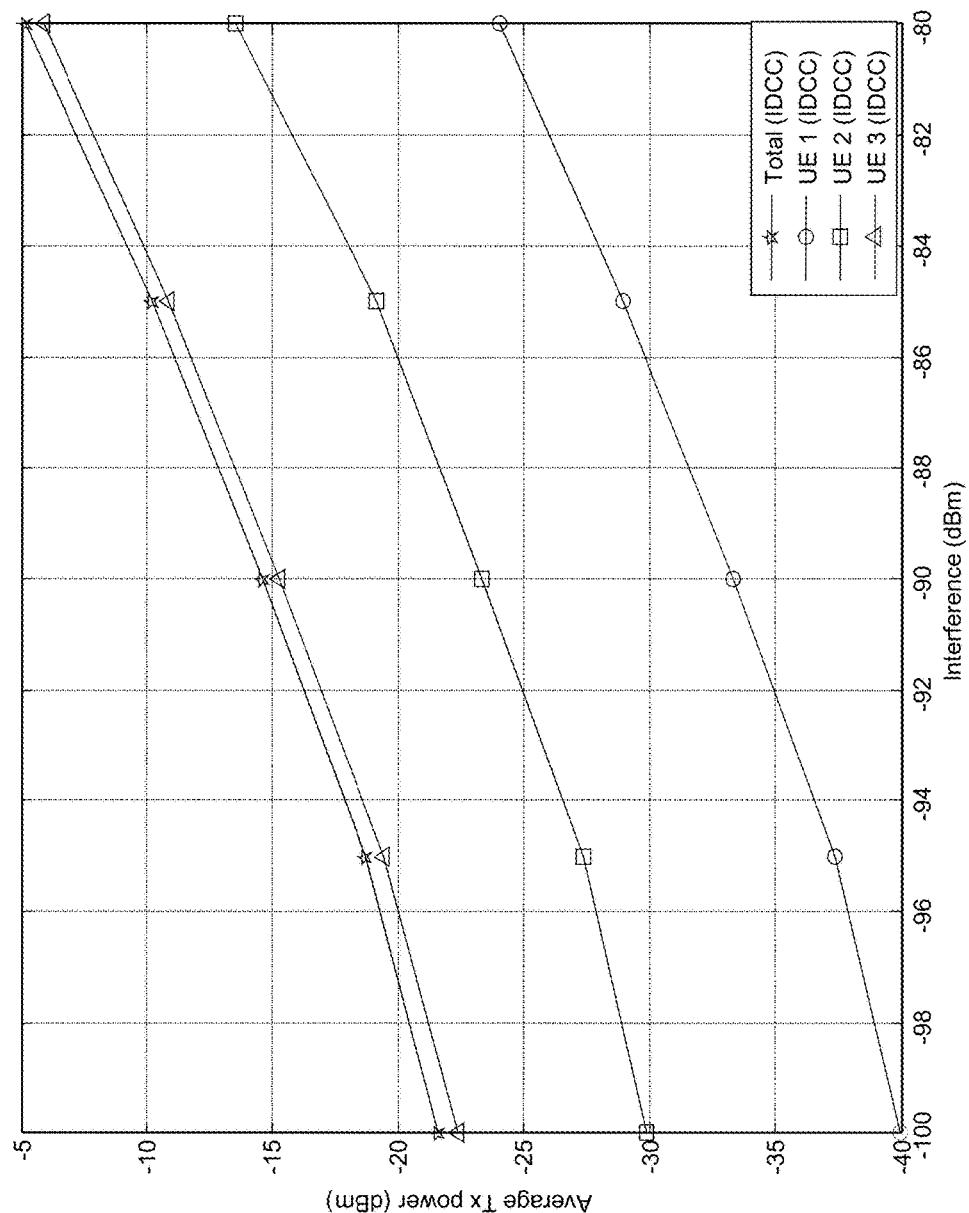
FIG. 26 shows the average transmit power of DL OFDM transceiver for different UEs using the IDCC in the MU interference environment.

FIG. 25 and FIG. 26 show average throughput and average transmit power, respectively, for comparing the IDCC with fixed transmit power in the different interference environments. FIG. 25 shows using the fixed transmit power the average throughputs of UE1, UE2, UE3 and total average throughput for −100 dBm interference power are 10.86 Mbps, 17.38 Mbps, 24.08 Mbps and 52.45 Mbps, respectively. When the interference power increases to −80 dBm, the average throughputs of UE1, UE2 UE3 and total average throughput reduce to 2.97 Mbps, 6.93 Mbps, 12.41 and 22.32 Mbps, respectively. Using the present IDCC, the average throughputs of UE1, UE2, UE3 and total average throughput for −100 dBm interference power are 10.48 Mbps, 17.38 Mbps, 24.59 Mbps and 52.45 Mbps, respectively. When the interference power increases to −80 dBm, the average throughputs of UE1, UE2 UE3 and total average throughput reduce to 11.48 Mbps, 17.31 Mbps, 22.97 Mbps and 51.75 Mbps, respectively. The average throughputs of UE1, UE2, UE3 and total average throughput almost remain the same values when the IDCC is used. FIG. 26 shows using the present IDCC, the average transmit power increases as the interference power increases. Using the present IDCC, the average transmit power of UE1, UE2, UE3 and total average transmit power for −100 dBm interference power are −39.88 dBm, −29.85 dBm, −22.36 dBm and −21.58 dBm, respectively. When the interference power increases to −80 dBm, the average transmit power of UE1, UE2 UE3 and total average transmit power increase to −24.06 dBm, −13.56 dBm, −5.896 dBm and −5.154 dBm, respectively. The average transmit power of UE1, UE2, UE3 and total average transmit power adjust with the interference environments adaptively to satisfy the requirements of the service reliability when the IDCC is used.

Thus the simulation results show that the present FFD-OFDMA based IDCC device for indoor small cell operated in the MU and interference environments to self-optimize the service reliability, throughput at the cell edge, minimum transmit power and interference for multimedia call services. Thus the IDCC device can achieve the goals of saving power consumption and reducing co-channel interference. In this embodiment of the simulation, the basic OFDM transceiver parameters listed in Table 2 is a single antenna mode (SISO), the present invention is also applicable to multi-antenna mode (MIMO) and other different channel environments.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A frequency division duplexing-orthogonal frequency division multiplexing access (FDD-OFDMA) based adaptive neural fuzzy inference system (ANFIS) intelligent deployment cascade control (IDCC) device for indoor small cell operated in the multi-user (MU) and interference environments to self-optimize the service reliability, throughput, minimum transmit power and interference for multimedia call services, comprising:
    an indoor small cell base station, wherein resources of the indoor small cell base station are allocated to multiple user equipments (UEs);

a resource allocator, configured to assigns the average resource blocks (RBs) of small cell for each indoor user according to the total number of indoor users and the setting system bandwidth;

a minimum throughput/cell edge channel quality index (CQI) converter, configured to set the cell edge (minimum) channel quality index for each indoor user in accordance with the minimum throughput requirement;

an adaptive neural fuzzy inference system based initial transmit power setting controller (ITPSC) in the first cascade unit, configured to adapt the initial power setting for the uth user to the coverage radius of indoor office, the number of the resource blocks and the cell edge channel quality index;

an adaptive neural fuzzy inference system based channel quality index decision controller (CQIDC) in the second cascade unit, configured to adapt the best channel quality index to the initial power setting, number of the resource blocks and average path loss (PL) measured by the user equipment; and an adaptive neural fuzzy inference system based self-optimizing power controller (SOPC) in the third cascade unit consists of three parts, namely the transmit power adjustment estimator (TPAE), transmission power assignment and self-optimization power controller protection mechanism;

wherein, it can autonomously cascade control the assignments of initial power, the best channel quality index and the minimum transmit power to the transceiver according to the user input parameters including the service reliability, coverage radius and the throughput at the cell edge; the measured average path loss and average signal-to-interference-plus-noise ratio (SINR), so that the present intelligent deployment cascade control device can self-optimize the service reliability of the indoor small cell in the multi-user and interference environments, while maintaining the blocking error rate (BLER) less than 10-1 and minimizing the transmit power and interference power to achieve the design aims of energy saving and interference reducing.

2. The frequency division duplexing-orthogonal frequency division multiplexing access based adaptive neural fuzzy inference system intelligent deployment cascade control device for indoor small cell operated in the multi-user and interference environments of claim 1, wherein the architecture of adaptive neural fuzzy inference system based initial transmit power setting controller unit contains five tiers, a total of three inputs and one output; three input parameters for the $u_{th}$ user are the coverage radius of indoor office ($R_u$), the number of resource blocks ($nRB_u$) and the cell edge channel quality index that is defined as $CQI_{min,u}$, the output parameter for the $u_{th}$ user is an initial minimum transmit power ($P_{ini,u}$); each input uses three generalized bell shape membership functions (MFs); each MF contains three levels; the 27 fuzzy inference rules are constructed; a minimum transmit power optimization problem of the adaptive neural fuzzy inference system initial transmit power setting controller is formally formulated as follows:

optimize $P_{ini} = f(\vec{x})$, $f(\vec{x})$ is the objective function;

subject to:

$\vec{x} \in \{R_u, nRB_u, CQI_{min,u}\}$

-continued $0\ m < R_u \leq 15\ m$ $1 \leq nRB_u \leq 100$ $1 \leq CQI_{min,u} \leq 15$ $\sum_{u}^{nUE} P_{ini,u} \in \{ \leq 20\ dBm\}$.

3. The frequency division duplexing-orthogonal frequency division multiplexing access based adaptive neural fuzzy inference system intelligent deployment cascade control device for indoor small cell operated in the multi-user and interference environments of claim 2, wherein, for the adaptive neural fuzzy inference system based initial transmit power setting controller in the multi-user environments of claim 2, wherein the training data is generated from the simulation results of the transceiver blocking error rate to train the premise and consequent parameters of the initial transmit power setting controller; the minimum transmit power (dBm) training data of the initial transmit power setting controller for the $u_{th}$ user is given by:

$P_{ini,u} = P_{rmin,u}(CQI_{min,u}) + L_t - G_t + PL(R_u) + FM(SR_u) - G_r + L_r$;

wherein $P_{rmin,u}(CQI_{min,u})$ is the receiver sensitivity of the cell edge channel quality index ($CQI_{min,u}$) for the $u_{th}$ user; $L_t$ denotes the cable loss in dB; $G_t$ and $G_r$ are the antenna gains in dBi of the femtocell and the user equipment, respectively; $PL(R_u)$ denotes the maximum path loss between a femtocell and the $u_{th}$ user at the cell edge, $L_r$ in dB is the body loss of the user equipment; $FM(SR_u)$ denotes fade margin in dB corresponding to the SRset by the $u_{th}$ user;

the receiver sensitivity of the given cell edge channel quality index ($CQI_{min,u}$) for the $u_{th}$ user is obtained by $P_{rmin,u}(CQI_{min,u}) = P_{N,u} + SNR_{th}(CQI_{min,u})$;

wherein $SNR_{th}(CQI_{min,u})$ denotes the SNR threshold of the receiver for different $CQI_{min,u}$, which is generated from the performance simulations using the transceiver;

the training data for minimum transmit power is generated for the service reliability of 90%, different coverage radius (2.5, 5, 7.5, 10, 12.5 and 15 meters), different resource block (1~100) and cell edge channel quality index (1~15).

4. The frequency division duplexing-orthogonal frequency division multiplexing access based adaptive neural fuzzy inference system intelligent deployment cascade control device for indoor small cell operated in the multi-user and interference environments of claim 1, wherein the architecture of the adaptive neural fuzzy inference system based channel quality index decision controller unit contains five tiers, a total of three inputs and one output for the $u_{th}$ user; there are three input parameters for the $u_{th}$ user including path loss ($\overline{PL}_u$) between orthogonal frequency division multiplexing (OFDM) transmitter and receiver, initial power setting ($P_{ini,u}$) and number of the resource blocks; in the interference free environments, the channel quality index decision controller unit adapts the best channel quality index ($CQI_{best,u}$) to the changing initial power setting, number of the resource blocks and the measured average path loss; the Gaussian shape membership function of each input parameter is divided into three levels; there are 27 fuzzy inference rules; an optimization problem of channel quality index the best channel quality index of the adaptive neural fuzzy inference system based channel quality index decision controller is formally formulated as follows:

in the interference free environments, BLER≤0.1;

optimize $CQI_{best,u} = f(\bar{x})$ at the $u_{th}$ user, $f(\bar{x})$ is the objective function:

subject to:

$$\bar{x} \in \{\overline{PL}_u, P_{ini,u}, nRB_u\}$$

$$30dB \leq \overline{PL}_u \leq 70dB$$

$$-75dBm \leq P_{ini,u} \leq 20dBm$$

$$1 \leq nRB_u \leq 100$$

$$CQI_{best,u} \in \{1\sim15\}.$$

5. The frequency division duplexing-orthogonal frequency division multiplexing access based adaptive neural fuzzy inference system intelligent deployment cascade control device for indoor small cell operated in the multi-user and interference environments of claim 4, wherein, for the adaptive neural fuzzy inference system based channel quality index decision controller, the training data is used to train the premise and consequent parameters of the channel quality index decision controller; the training data of the best channel quality index ($CQI_{best,u}$) at the $u_{th}$ user's location of the indoor office in the interference free environment is determined by the following rules:

$$CQI_{best,u} = \begin{cases} CQI\_i, & \text{if } SNR_{th}(CQI\_i) \leq SNR_u < SNR_{th}(CQI\_i+1), i=1\sim14 \\ CQI\_15, & \text{if } SNR_u \geq SNR_{th}(CQI\_15) \\ CQI\_1, & \text{if } SNR_u < SNR_{th}(CQI\_1) \end{cases}$$

the signal-to-noise-power ratio (SNR) is estimated by:

$$SNR_u = P_{r,u}(W)/P_{N,u}(W);$$

wherein the average received power $P_{r,u}$ at the $u_{th}$ user in the interference free environment is given as:

$$P_{r,u} = P_{ini,u} - L_t + G_t - \overline{PL}_u + G_r - L_r;$$

wherein $\overline{PL}_u$ denotes the measured average path loss between a femtocell eNB and an UE in the given cell; $P_{N,u}$ is the noise power for the $u_{th}$ user;

the training data of the channel quality index decision controller is generated from the simulation results of the transceiver blocking error rate for different measured average path loss (30 dB~70 dB), the resource block (1~100) and initial minimum transmit power (−75 dBm~20 dBm).

6. The frequency division duplexing-orthogonal frequency division multiplexing access based adaptive neural fuzzy inference system intelligent deployment cascade control device for indoor small cell operated in the multi-user and interference environments of claim 1, wherein the self-optimizing power controller unit consists of three parts, namely a transmit power adjustment estimator, a transmission power assignment and an self-optimization power controller protection mechanism;

wherein the adaptive neural fuzzy inference system based transmit power adjustment estimator in the interference environment primarily adapts the transmit power to the requested throughput at the cell edge (corresponding to the cell edge channel quality index), the best channel quality index and measured average signal-to-interference-plus-noise ratio and estimates the amount of minimum transmit power adjustment needs for each user;

wherein the transmission power assignment adjusts the power for each indoor user when the sum of total transmission power to all indoor users doesn't exceed the maximum transmit power limit of the eNB;

wherein a protection mechanism for self-optimizing power controller is used to prevent the co-channel interference from the moving users of adjacent cells.

7. The frequency division duplexing-orthogonal frequency division multiplexing access based adaptive neural fuzzy inference system intelligent deployment cascade control device for indoor small cell operated in the multi-user and interference environments of claim 6, wherein the adaptive neural fuzzy inference system based transmit power adjustment estimator in the self-optimizing power controller unit contains five tiers;

wherein the transmit power adjustment estimator unit accepts three inputs and generates the optimizing minimum transmit power;

wherein three inputs for the $u_{th}$ user including cell edge channel quality index ($CQI_{min,u}$), best channel quality index ($CQI_{best,u}$) and average measured signal-to-interference-plus-noise ratio ($\overline{SINR}_u$) and one power adjustment output for the $u_{th}$ user; the generalized bell shape membership function of each input parameter is divided into three levels; there are 27 fuzzy inference rules; an optimization problem of transmit power adjustment estimator the minimum transmit power of the adaptive neural fuzzy inference system based transmit power adjustment estimator in the self-optimizing power controller unit is formally formulated as follows:

in the interference environment, $BLER \leq 0.1$, optimize $\Delta P_u = f(\vec{x})$ at the $u_{th}$ user, $f(\vec{x})$ is the objective function:

$\vec{x} \in \{CQI_{min,u}, CQI_{best,u} \text{ and } \overline{SINR}_u\}$ $1 \leq CQI_{min,u} \leq 15$ $1 \leq CQI_{best,u} \leq 15$ $-25$ dB $\leq \overline{SINR}_u \leq 45$ dB $$\sum_{u}^{nUE} P_u + \Delta P_u \in \{\leq 20 \text{ dBm}\},$$

$P_u$ is the transmit power (dBm)

at the last instant.

8. The frequency division duplexing-orthogonal frequency division multiplexing access based adaptive neural fuzzy inference system intelligent deployment cascade control device for indoor small cell operated in the multi-user and interference environments of claim 7, wherein, for the transmit power adjustment estimator, the training data is generated to train the premise and consequent parameters of the transmit power adjustment estimator;

for the purpose of satisfying the requirements of blocking error rate ≤10% and the $SR_u$, the target threshold of the signal to interference plus noise ratio ($SINR_{th,u}$) at the $u_{th}$ user is defined as;

$$SINR_{th,u} = \max\{SNR_{th}(CQI_{min,u}) + FM(SR_u), SNR_{th}(CQI_{best,u})\}(dB);$$

The output power adjustment ($\Delta P_u$) at the $u_{th}$ user is given by subtracting the $SINR_{th,u}$ from the measured average signal-to-interference-plus-noise ratio at the $u_{th}$ user; using the defined $SINR_{th,u}$ the training data of the transmit power adjustment value $\Delta P_u$ is generated for service reliability (90%), cell edge channel quality index (1~15), measured average signal-to-interference-plus-noise ratio (−25 dB~45 dB) and the best channel quality index (1~15).

9. The frequency division duplexing-orthogonal frequency division multiplexing access based adaptive neural fuzzy inference system intelligent deployment cascade control device for indoor small cell operated in the multi-user and interference environments of claim 7, wherein, for the protection mechanism of the self-optimizing power controller, the intelligent deployment cascade control device inputs the average path loss measured from the user equipment, and then by the indoor path loss model to estimate the distance (d) between the user equipment and the eNB; if the moving user equipment is inside the coverage range of the radius, then the transmission power assignment of the self-optimizing power controller unit is initiated to transmit the minimum power to the moving user equipment of the adjacent cells; otherwise, the transmission power assignment of the self-optimizing power controller unit is disabled to the moving user equipment of the adjacent cells.

10. The frequency division duplexing-orthogonal frequency division multiplexing access based adaptive neural fuzzy inference system intelligent deployment cascade control device for indoor small cell operated in the multi-user and interference environments of claim 1, wherein the device is based on the frequency division duplexing-orthogonal frequency division multiplexing access method, and uses the adaptive neural fuzzy inference system architecture to adapt the initial power setting to the requested resource block, throughput at the cell edge and coverage radius in the interference free environment; to adapt the best channel quality index to the initial setting power, number of the resource blocks and average path loss measured by user equipment in the interference free environment; to adapt the transmit power assignment to the requested throughput at the cell edge, the best channel quality index and measured average signal-to-interference-plus-noise ratio in the interference environment; the present intelligent deployment cascade control device is designed to self-optimize the signal-to-interference-plus-noise ratio and throughput service reliability of the indoor small cell in the multi-user and interference environments, while maintaining the blocking error rate less than $10^{-1}$ and minimizing the transmit power and interference power to achieve the aims of energy saving and interference reducing.

\* \* \* \* \*